(12) United States Patent
     Abraham

(10) Patent No.: US 10,077,893 B1
(45) Date of Patent: *Sep. 18, 2018

(54) REMOVABLE ANCHORING SYSTEM AND USES THEREOF

(71) Applicant: Philip Abraham, Allen, TX (US)

(72) Inventor: Philip Abraham, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,305

(22) Filed: Aug. 29, 2016

Related U.S. Application Data

(63) Continuation-in-part of application No. 14/832,757, filed on Aug. 21, 2015, now Pat. No. 9,464,397, which is a continuation-in-part of application No. 14/011,571, filed on Aug. 27, 2013.

(60) Provisional application No. 61/803,089, filed on Mar. 18, 2013, provisional application No. 61/763,459, filed on Feb. 11, 2013.

(51) Int. Cl.
| | |
|---|---|
| *E02D 5/80* | (2006.01) |
| *E04H 12/22* | (2006.01) |
| *F21V 21/10* | (2006.01) |
| *A45F 3/44* | (2006.01) |
| *F16M 13/02* | (2006.01) |
| *F16B 7/10* | (2006.01) |
| *F16B 7/14* | (2006.01) |
| *F21V 21/08* | (2006.01) |
| *F21S 9/03* | (2006.01) |
| *F21V 33/00* | (2006.01) |
| *G03B 17/56* | (2006.01) |
| *H02S 20/10* | (2014.01) |
| *E02D 5/56* | (2006.01) |

(52) U.S. Cl.
     CPC ............... *F21V 21/10* (2013.01); *A45F 3/44* (2013.01); *F16B 7/105* (2013.01); *F16B 7/1418* (2013.01); *F16M 13/02* (2013.01); *F21S 9/035* (2013.01); *F21V 21/0824* (2013.01); *F21V 33/008* (2013.01); *F21V 33/0052* (2013.01); *F21V 33/0056* (2013.01); *G03B 17/561* (2013.01); *H02S 20/10* (2014.12); *E02D 5/56* (2013.01); *E02D 5/801* (2013.01); *E04H 12/2223* (2013.01)

(58) Field of Classification Search
     CPC ............ E04H 12/2223; E04H 12/2269; E04H 12/2253; E04H 17/08
     See application file for complete search history.

(56) References Cited

U.S. PATENT DOCUMENTS

| | | | | |
|---|---|---|---|---|
| 108,814 | A * | 11/1870 | Moseley | E02D 27/20 405/222 |
| 513,115 | A * | 1/1894 | Kiler | E02D 5/801 52/157 |
| 598,003 | A * | 1/1898 | Oliver | E04H 12/2223 52/154 |
| 891,448 | A * | 6/1908 | Snider | E02D 5/801 52/157 |

(Continued)

*Primary Examiner* — Joshua J Michener
*Assistant Examiner* — Kyle J. Walraed-Sullivan
(74) *Attorney, Agent, or Firm* — Ferguson Braswell Fraser Kubasta PC; Elizabeth Philip Dahm; Kelly J. Kubasta

(57) ABSTRACT

In various implementations, an anchoring system may include one or more anchors. An anchor may include a first coupling member, a second coupling member, and a plate. The anchor may be coupleable to other anchors and/or objects. The anchoring system may be used to secure an object to a location.

19 Claims, 28 Drawing Sheets

(56) References Cited

U.S. PATENT DOCUMENTS

| | | | | |
|---|---|---|---|---|
| 1,193,725 A * | 8/1916 | Smith | E02D 5/801 | 52/127.5 |
| 1,549,356 A * | 8/1925 | Goldbeck | E02D 5/80 | 52/156 |
| 2,084,239 A * | 6/1937 | Bradford | E02D 5/801 | 119/788 |
| 2,209,504 A * | 7/1940 | Beiter | E04H 12/2223 | 135/118 |
| 2,211,283 A * | 8/1940 | Mercer | E04H 12/2223 | 135/15.1 |
| 2,234,907 A * | 3/1941 | Williams | E02D 5/801 | 52/157 |
| 2,603,319 A * | 7/1952 | Dyche | E02D 5/801 | 175/394 |
| 2,647,593 A * | 8/1953 | Holman | E04H 12/2215 | 52/114 |
| 2,870,884 A * | 1/1959 | Mazur | E02D 5/80 | 52/158 |
| 3,011,597 A * | 12/1961 | Galloway | E04H 12/2223 | 52/154 |
| 3,148,739 A * | 9/1964 | Mattingly | E21B 7/021 | 173/145 |
| 3,318,560 A * | 5/1967 | Garrette, Jr. | E04H 12/182 | 248/156 |
| 3,517,470 A * | 6/1970 | Luebkeman | E02D 27/42 | 248/156 |
| 3,645,055 A * | 2/1972 | Roza | E02D 5/801 | 52/157 |
| 3,662,436 A * | 5/1972 | Roza | E02D 5/801 | 24/115 R |
| 3,736,711 A * | 6/1973 | Thornbrugh | E02D 5/801 | 52/149 |
| 3,841,032 A * | 10/1974 | Grannis, III | E02D 5/80 | 174/38 |
| 4,105,039 A * | 8/1978 | Schultes | A45B 19/10 | 135/25.33 |
| 4,290,245 A * | 9/1981 | Pardue, Jr. | E02D 5/801 | 52/157 |
| 4,334,392 A * | 6/1982 | Dziedzic | E02D 5/801 | 175/400 |
| 4,467,575 A * | 8/1984 | Dziedzic | E02D 5/801 | 405/259.1 |
| 4,593,872 A * | 6/1986 | Svensson | E04H 15/62 | 248/156 |
| 4,702,047 A * | 10/1987 | Stokes | E02D 5/801 | 114/294 |
| 4,714,225 A * | 12/1987 | Skinner | H01Q 1/1242 | 248/523 |
| 4,803,812 A * | 2/1989 | Alexander, Sr. | E02D 5/801 | 52/157 |
| 4,920,897 A * | 5/1990 | Reed | A47B 37/04 | 108/150 |
| 5,062,028 A * | 10/1991 | Frost | F21S 8/081 | 136/291 |
| 5,113,627 A * | 5/1992 | Jarrett, Sr. | E02D 5/801 | 248/156 |
| 5,152,495 A * | 10/1992 | Jacinto | E04H 12/2223 | 135/98 |
| 5,224,310 A * | 7/1993 | Edwards | E02D 5/80 | 248/156 |
| 5,293,889 A * | 3/1994 | Hall | A45B 3/00 | 135/16 |
| 5,295,766 A * | 3/1994 | Tiikkainen | E02D 5/34 | 405/232 |
| 5,358,209 A * | 10/1994 | Ward | E04H 12/2223 | 248/530 |
| 5,457,918 A * | 10/1995 | Plourde | E04H 12/2223 | 248/545 |
| 5,535,978 A * | 7/1996 | Rodriguez | E04H 12/2269 | 135/118 |
| 5,556,088 A * | 9/1996 | Mower | A63B 63/083 | 206/315.1 |
| 5,662,304 A * | 9/1997 | McDaniel | E04H 12/2223 | 248/499 |
| D394,544 S * | 5/1998 | Tropiano | D3/10 | |
| 5,906,077 A * | 5/1999 | Andiarena | E04H 12/2223 | 135/118 |
| 6,032,880 A * | 3/2000 | Verrills | E04H 12/2223 | 248/156 |
| 6,050,740 A * | 4/2000 | Dziedzic | E02D 5/74 | 403/305 |
| 6,058,662 A * | 5/2000 | Perko | E02D 5/801 | 405/232 |
| 6,073,642 A * | 6/2000 | Huang | A45B 9/00 | 135/114 |
| 6,082,697 A * | 7/2000 | Grunfeld | A63B 63/004 | 248/156 |
| 6,199,569 B1 * | 3/2001 | Gibson | E04H 12/2223 | 135/16 |
| 6,202,369 B1 * | 3/2001 | Partee | E04H 12/2269 | 248/523 |
| 6,321,861 B1 * | 11/2001 | Leichter | E04H 12/2223 | 135/99 |
| 6,416,431 B1 * | 7/2002 | Keehn, Sr. | A63B 69/0071 | 473/451 |
| 6,487,977 B1 * | 12/2002 | Williams | A45B 23/00 | 108/150 |
| 6,629,389 B1 * | 10/2003 | Rust | G09F 7/18 | 248/551 |
| 6,641,332 B1 * | 11/2003 | Alvarado | E02D 5/28 | 175/323 |
| 6,655,648 B2 * | 12/2003 | Harris | E02D 27/14 | 220/475 |
| 6,702,239 B2 * | 3/2004 | Boucher | A01G 9/122 | 248/125.8 |
| 6,722,821 B1 * | 4/2004 | Perko | E02D 5/801 | 405/249 |
| 6,776,734 B2 * | 8/2004 | van Nimwegen | A63B 63/08 | 248/346.2 |
| 7,007,703 B2 * | 3/2006 | Brooks, III. | A45B 3/00 | 135/16 |
| D518,286 S * | 4/2006 | Santos | D3/17 | |
| 7,021,866 B2 * | 4/2006 | Keefe | E04H 12/2223 | 135/99 |
| 7,073,296 B2 * | 7/2006 | Gregory | E02D 27/02 | 403/292 |
| 7,191,996 B2 * | 3/2007 | Patsalaridis | E04H 12/2223 | 135/16 |
| 7,497,225 B1 * | 3/2009 | Klein, Jr. | A45B 3/00 | 135/118 |
| 7,565,909 B2 * | 7/2009 | Reis | E04H 15/001 | 135/115 |
| 7,736,250 B2 * | 6/2010 | O'Neill | A63B 63/083 | 473/479 |
| 7,766,299 B2 * | 8/2010 | Titus, II | E04H 12/2284 | 248/577 |
| D630,834 S * | 1/2011 | Cohen | D3/10 | |
| 7,942,377 B2 * | 5/2011 | Harold | A45B 25/00 | 135/16 |
| 7,980,185 B1 * | 7/2011 | Teague, Jr. | E05G 1/02 | 109/50 |
| 8,181,661 B2 * | 5/2012 | Livacich | E04H 15/001 | 135/115 |
| 8,191,561 B2 * | 6/2012 | Brooks, III | E04H 12/2223 | 135/16 |
| 8,230,648 B2 * | 7/2012 | Bulloch | B63B 21/40 | 114/230.1 |
| 8,656,651 B1 * | 2/2014 | Scarano, Jr. | E04H 12/2223 | 52/157 |
| 8,875,451 B1 * | 11/2014 | Parduhn | E01F 9/685 | 52/157 |
| 9,004,439 B2 * | 4/2015 | Gross | E04H 12/2269 | 248/507 |
| 9,464,397 B1 | 10/2016 | Abraham | E02D 5/801 | |
| 9,631,392 B2 * | 4/2017 | Bergman | E04H 12/2223 | |
| 9,657,926 B2 * | 5/2017 | Steele | F21V 21/0824 | |
| 2001/0017150 A1 * | 8/2001 | Doreste | A45B 17/00 | 135/15.1 |

(56) References Cited

U.S. PATENT DOCUMENTS

| | | | | |
|---|---|---|---|---|
| 2003/0041535 A1* | 3/2003 | Rupiper | ............ | E02D 5/801 52/165 |
| 2004/0173385 A1* | 9/2004 | Carta | ............ | E02D 5/801 175/394 |
| 2004/0237453 A1* | 12/2004 | Eaton | ............ | E04H 12/2215 52/698 |
| 2005/0102926 A1* | 5/2005 | Carte | ............ | E02D 17/207 52/157 |
| 2005/0274083 A1* | 12/2005 | Shearer | ............ | E02D 7/22 52/157 |
| 2006/0096184 A1* | 5/2006 | Kraaijkamp | ............ | E04H 12/2223 52/157 |
| 2007/0191148 A1* | 8/2007 | Shannon | ............ | A63B 63/083 473/476 |
| 2007/0214735 A1* | 9/2007 | Fujita | ............ | E02D 5/56 52/157 |
| 2007/0231081 A1* | 10/2007 | Gantt, Jr. | ............ | E02D 5/80 405/244 |
| 2007/0235616 A1* | 10/2007 | Gross | ............ | E04H 12/2261 248/346.5 |
| 2007/0247843 A1* | 10/2007 | Schrimmer | ............ | F21V 21/0824 362/231 |
| 2008/0008555 A1* | 1/2008 | Ardern | ............ | E04H 12/2223 411/411 |
| 2008/0099061 A1* | 5/2008 | McKnight | ............ | A45B 11/00 135/118 |
| 2010/0143048 A1* | 6/2010 | Lin | ............ | E02D 5/523 405/244 |
| 2010/0180525 A1* | 7/2010 | Reeves, Jr. | ............ | E04F 11/0255 52/183 |
| 2010/0223862 A1* | 9/2010 | Smit | ............ | E02D 5/801 52/157 |
| 2011/0005148 A1* | 1/2011 | Foster | ............ | E02D 5/56 52/157 |
| 2011/0030752 A1* | 2/2011 | Livacich | ............ | E04H 15/001 135/138 |
| 2011/0036026 A1* | 2/2011 | Lee | ............ | E04C 3/32 52/157 |
| 2011/0207377 A1* | 8/2011 | Hawthorne | ............ | B63C 9/26 441/84 |
| 2011/0253876 A1* | 10/2011 | Odell | ............ | E04H 12/2215 248/530 |
| 2012/0160139 A1* | 6/2012 | Pearce | ............ | E05B 67/383 109/52 |
| 2014/0259991 A1* | 9/2014 | Atchley | ............ | E02D 5/805 52/157 |
| 2015/0197902 A1* | 7/2015 | Yeghiayan | ............ | E01F 9/0117 248/545 |
| 2016/0186403 A1* | 6/2016 | Tomchesson | ............ | E02D 5/526 405/244 |
| 2017/0089509 A1* | 3/2017 | Bailey | ............ | F16M 11/24 |
| 2017/0130416 A1* | 5/2017 | Wilson | ............ | E02D 5/56 |
| 2017/0218590 A1* | 8/2017 | Raposo | ............ | E02D 5/00 |

* cited by examiner

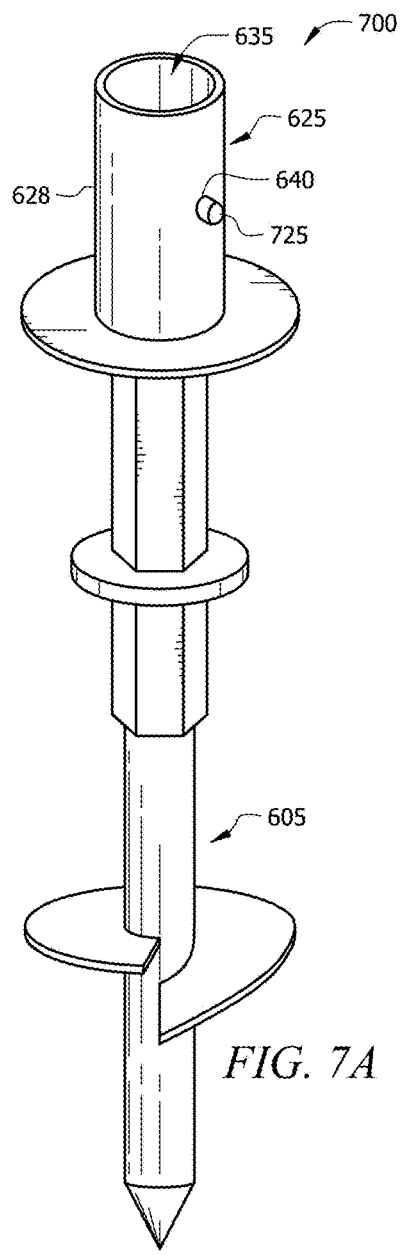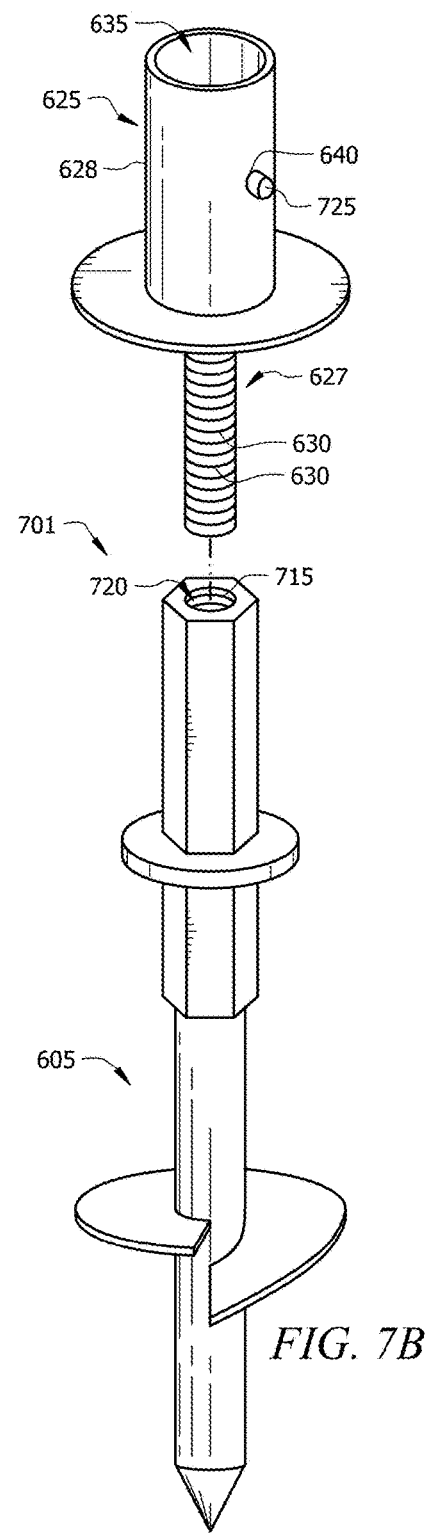
FIG. 7A
FIG. 7B

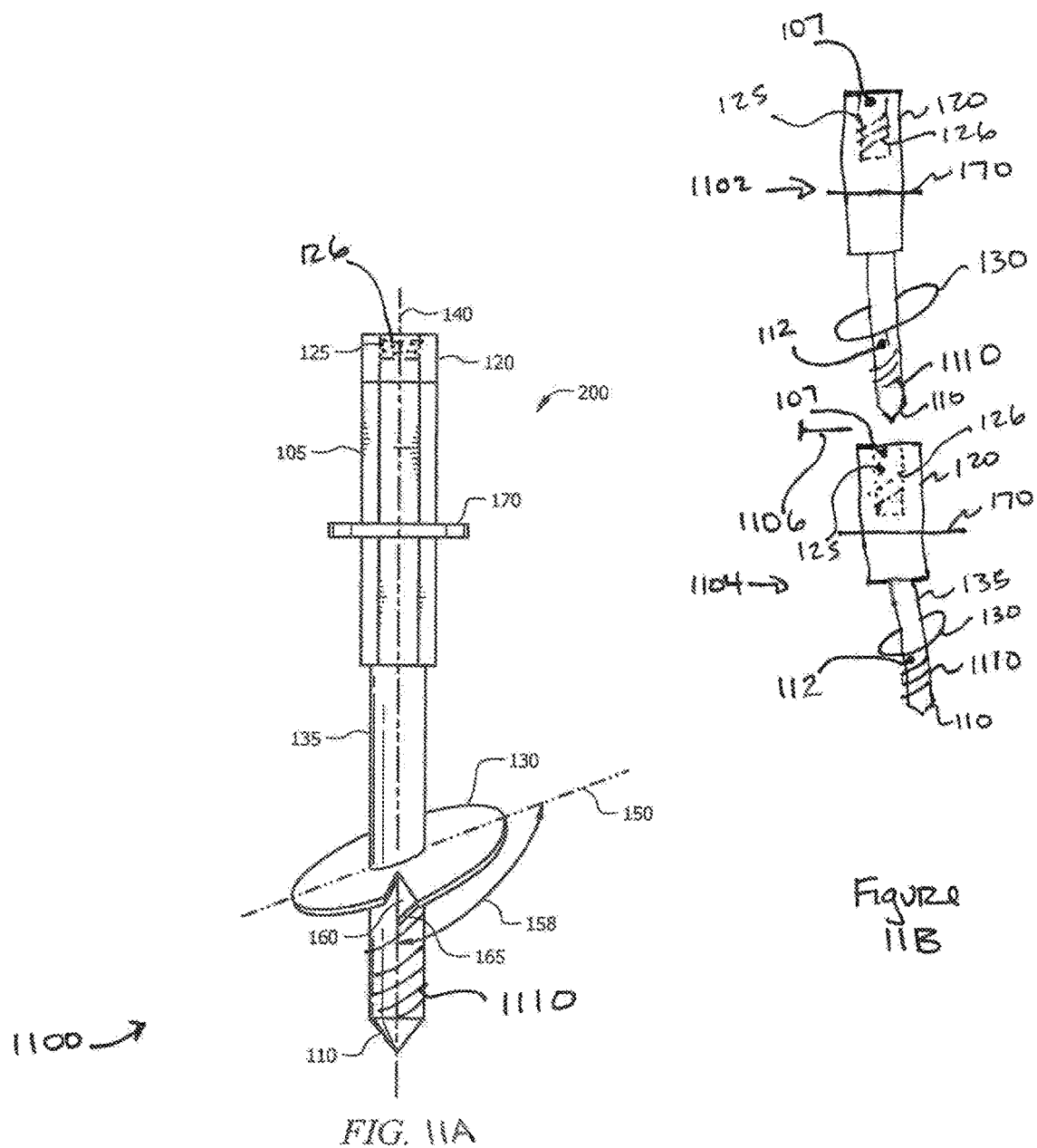

REMOVABLE ANCHORING SYSTEM AND USES THEREOF

CROSS-REFERENCE TO RELATED APPLICATIONS

This application is a continuation in part of U.S. patent application Ser. No. 14/832,757 entitled "REMOVABLE ANCHORING SYSTEM AND USES THEREOF," filed on Aug. 21, 2015, which is a continuation in part of U.S. patent application Ser. No. 14/011,571 entitled "REMOVABLE ANCHORING SYSTEM AND USES THEREOF", filed on Aug. 27, 2013, which claims priority to U.S. Provisional Patent Application No. 61/763,459 entitled "Collapsible, Transportable, Waterless, Helical Pile Secured Based Basketball Goal", filed on Feb. 11, 2013 and U.S. Provisional Patent Application No. 61/803,089 entitled "Hex Coupling Nut Helical Earth Anchor" filed on Mar. 18, 2013, all of which are hereby incorporated by reference for all purposes.

TECHNICAL FIELD

The present invention relates to anchoring systems and uses of anchoring systems.

BACKGROUND

Anchors are utilized for securing objects to a location, such as the ground. Anchors may be permanent (e.g., may be deformed upon removal), such as metal anchors in concrete, and/or temporary (e.g., may be removable, without substantially deforming the anchor, and/or reusable), such as camping stakes.

SUMMARY

In various implementations, anchoring systems may include one or more anchors. The anchoring system may be utilized to at least partially secure an object to a location. Anchors may be coupleable and/or noncoupable. A coupleable anchor may be used alone and/or linked to other anchors and coupled. An anchor system may include one or more coupleable anchors. A first anchor may be coupleable to a second anchor. The first anchor may include a body that includes a first end and a second opposing end. The first end includes an outer surface. A first coupling member may be disposed on the outer surface of the first end. The first coupling member may be adapted to couple with a driver to secure the first anchor in a location. The first end may include a recess disposed in the first end. A second coupling member may be disposed in the recess of the first end. The second coupling member may include a first threaded portion is coupleable with at least part of an object to be secured by an anchoring system and/or at least part of a second end of the second anchor. The opposing second end of the first anchor may include a tapered portion and a first threaded portion. The second end of the first anchor may be coupleable with a second coupling member of the second anchor. The first anchor may include shaft disposed between the first end and the second end. The shaft includes a length and a cross-section. The first anchor may include at least one plate comprising a slanted portion. The plate at least partially circumscribes the cross-section of the shaft.

Implementations may include one or more of the following features. The second anchor may include one or more of the same features as the first anchor. In some implementations, the body of the first anchor further comprises a first opening proximate the first end. The first opening may extend from the outer surface to the recess of the first end. The first opening may receive a first fastener (e.g., the size and/or shape of the opening may allow the first fastener to be disposed at least partially in the opening, the first opening may engage with at least a portion of the first fastener such as via threads, etc.). The first opening may couple the first anchor to the second anchor by disposing the first fastener at least partially in the first opening of the first anchor and at least partially in a second opening proximate a second end of the second anchor. For example, the second end of the anchor may include a second opening that extends at least partially through the second end. In some implementations, the second opening may extend through the second end and a first fastener may be disposed through the first opening in the first anchor, the second opening in the second anchor, and/or through a third opening in the first anchor (e.g., disposed on an opposing side of the recess such that a fastener can extend through the first end via the first opening and the second opening). In some implementations, the body of the first anchor may include a second opening disposed proximate the second end; wherein when the second end of the first anchor is disposed in a recess in a first end of the second anchor, the first anchor and the second anchor are coupled via a fastener disposed at least partially through a first opening in the first end of the second anchor and the second opening of the first anchor. In some implementations, the first anchor and the second anchor are coupled by disposing a second end of the second anchor in the recess of the first end of the first anchor such that threads of the second end of the second anchor are engaged with the threads of second coupling member of the first anchor; and/or disposing a second end of the first anchor in the recess of the first end of the second anchor such that threads of the second end of the first anchor are engaged with threads of the second coupling member of the second anchor. In some implementations, two or more anchors may be coupled to each other (e.g., by linking an end of an anchor and a recess of another anchor). The anchoring system may include one or more additional anchor. Additional anchors may include a first end that includes an outer surface and a recess disposed in the first end, and may include an opposing second end. The second end may include a tapered portion and a first threaded portion that may couple with the second threaded portion of the second coupling member of the first anchor. The additional anchors may include a shaft disposed between the first end and the second end, and the shaft may include a length and a cross-section. The additional anchors may include at least one plate comprising a slanted portion, and one or more of the plates at least partially circumscribes the cross-section of the shaft. The additional anchors may include a first coupling member, proximate the first end, and disposed on the outer surface of the first end. The first coupling member may couple with a driver to secure the first anchor in a location. The additional anchors may include a second coupling member proximate the first end, and disposed in the recess of the first end. The second coupling member includes a second threaded portion adapted to couple with the threaded portion of at least one of the first anchor, the second anchor, one of the other additional anchors, and/or a part of an object to be secured by an anchoring system. In some implementations, the first anchor includes at least two plates and a first plate is disposed at a first distance from the second plate.

In various implementations, anchors may be utilized to secure a basketball goal in a location. Two or more anchors may be driven into a location. The body of the anchor may include a first end and a second end. The first end may include a first coupling member adapted to couple with a driver; a recess disposed in the first end and extending at least partially along a length of the body; and a second coupling member adapted to couple with a first fastener. The second coupling member may be discrete from the first coupling member. The opposing second end, wherein the second end may be tapered. An anchor may include a shaft disposed between the first end and the second end and a plate proximate the second end of the anchor. The plate may at least partially circumscribe the cross-section of the shaft, and include a slanted portion (e.g., relative to a length of the shaft). Driving each of the anchors includes coupling a driver to the first coupling member of the anchor; actuating the driver such that the anchor rotates and is driven at least partially into the location; and uncoupling the driver from the first coupling when the anchor resides approximately at or below a top surface of the location; and coupling a base plate to each of the anchors. Coupling the base plate to each of the anchors may include disposing a first fastener at least partially in each of at least two of the openings in base plate; and coupling each of the first fasteners disposed in openings in the base plate to the second coupling member of each of the anchors driven into the location. A first end of a post may be coupled to the base plate, and a backboard may be coupled to an opposing second end of the post by positioning one or more second fasteners at least partially in one or more post openings proximate the second end of the post and one or more backboard openings of a backboard.

In various implementations, the driver includes a socket wrench (e.g., automatic and/or manual). The second coupling member may include a threaded portion, and the first fastener may include a threaded portion to couple with the threaded portion of the second coupling member. Coupling each of the first fasteners to the second coupling member of each of the anchors comprises screwing a first fastener at least partially into the second coupling member. The post may include at least two sections, and one or more of the sections may be coupled to at least one other section to form the post. In some implementations, securing a basketball goal may include coupling at least two of the sections of the post together to create a post comprising a first length, and/or coupling at least three of the sections of the post together to create a post comprising a second length. Coupling a first end of a post to the base plate may include coupling a first end of a first section of the post to the base plate. In some implementations, a second section of the post may be coupled to the first section of the post, and coupling a backboard to an opposing second end of the post includes coupling the backboard to a second end of the second section of the post.

In various implementations, an anchoring system may include at least two anchors. A body of the first anchor may include a first end and an opposing second end. The first end may include a first coupling member adapted to couple with a driver; a recess disposed in the first end and extending at least partially along a length of the body; and a second coupling member adapted to couple with a first fastener. The second coupling member may be discrete from the first coupling member. The second end may be tapered. The first anchor may include shaft disposed between the first end and the second end. The first anchor may include a plate proximate the second end of the anchor. The plate may at least partially circumscribes the cross-section of the shaft, and may include a slanted portion (e.g., slanted relative to a length of the shaft). The anchoring system may include a frame that is capable of being coupled to one or more objects. The frame may include a lateral member. The lateral member may include at least one first opening adapted to receive at least a portion of the anchor. Fastener(s) may couple with the second coupling member of at least one of the anchors through at least one of the openings of the lateral member of the frame to couple the lateral member to at least one of the anchors.

Implementations may include one or more of the following features. The second end of the first anchor may include a first threaded portion adapted to coupled with a second threaded portion of a second anchor, and the second threaded portion may include a second coupling member of the second anchor. The second coupling member of the first anchor may further couple with a first threaded portion disposed proximate a second end of another anchor and/or part of an object to be secured by an anchoring system. The frame may include one or more longitudinal members adapted to couple to one or more objects, and a first end of at least one of the longitudinal members may be coupled to the lateral member. At least one of the objects comprises a sign, an umbrella, a carport, a house, auxiliary dwelling units, a housing unit, a playhouse, a storage unit, subfloor, structure, and/or a flag post. The frame may couple with objects, such as one or more signs. For example, at least one of the signs may couple to at least one of the longitudinal members of the frame. In some implementations, at least two of the openings of the lateral member of the frame are disposed on opposing ends.

In various implementations, an anchor may include a first end and an opposing second end. The second end may be tapered. The anchor may include a shaft disposed between the first end and the second end. The shaft may include a cross-section and a length. The anchor may include a first coupling member and a second coupling member. The first coupling member may be proximate the first end of the anchor. The first coupling member may be adapted to couple with a driver. The second coupling member may be proximate the first end of the anchor. The second coupling member may be discrete from the first coupling member, and may couple with at least a portion of an object to be secured by the anchor. The anchor may include one or more plates proximate the second end of the anchor, wherein the plate may be coupled to the shaft and at least partially circumscribes the cross-section of the shaft. The plate may include a slanted portion that is slanted relative to the shaft.

Implementations may include one or more of the following features. The anchor may be driven into the ground and stabilize an object. The anchor may include one or more protrusions disposed on the shaft between the first coupling member and the plate. The first coupling member may be disposed on an outer surface of the anchor, and the second coupling member may be disposed on an inner surface of the anchor. The first coupling member may be disposed on an inner surface of the anchor, and the second coupling member may be disposed on an outer surface of the anchor, in some implementations. The first coupling member may be disposed on an outer surface of the anchor, and the first coupling member includes a male connector. The male connector may couple with a female connector of the driver. In some implementations, the first coupling member may be disposed on an inner surface of the anchor, and may include a female connector. The female connector may couple with a male connector of the driver. The second coupling member may include threads, and the threads may couple with threads of the object to couple the object and the anchor. The plate may include an inner edge coupled to the shaft of the anchor. A top surface and a bottom surface of the inner edge may be coupled to the shaft of the anchor. The plate may include an inner edge coupled to the shaft of the anchor. The plate may include a first end, and a second end. The second end of the plate may be disposed such that it is more proximate the tapered second end of the anchor than the first end of the plate. The second end of the plate may include a slanted edge. The anchor may include at least one additional plate. The additional plate(s) may be disposed on the shaft between the first end of the shaft and the plate proximate the second end.

In various implementations, a system may include an object to be secured and at least one anchor. The object may include an object coupling member. The anchor(s) may include a first end and an opposing second end. The second end may be tapered. The shaft of the anchor may be disposed between the first end and the second end, and includes a cross-section and a length. The anchor may include a first coupling member and a second coupling member. The first coupling member may be proximate the first end of the anchor and may couple with a driver. The second coupling member may be proximate the first end of the anchor, and may be discrete from the first coupling member. The second coupling member may couple with the object coupling member. The anchor may include a plate proximate the second end of the anchor. The plate may be coupled to the shaft and may at least partially circumscribe the cross-section of the shaft. At least a portion of the plate may be disposed at an angle to the shaft. One or more of the anchors may be adapted to secure the object to a ground during use.

Implementations may include one or more of the following features. The ground may include a portion of the earth, asphalt, and/or concrete. The object includes a canopy. The canopy includes a post, which includes the object coupling member. The object coupling member of the post may include threads adapted to couple with the second coupling member of at least one of the anchors. The object may include a basketball goal. The basketball goal may include a post and a backboard. The post may include at least two sections, and one or more of the sections may be adapted to be coupled to at least one other section to form the post. The backboard may include a boom adapted to be coupled to a first end of the post. The basketball goal may include a base that includes a first base coupling member and at least two openings. The first base coupling member may couple with a second end of the post. Opening(s) may be adapted to receive at least a portion of an anchor. The system may include bolt(s). One or more of the bolts may couple with the second coupling member of one or more of the anchors. The object may include a covered structure. The covered structure may include one or more posts adapted to couple with one or more second coupling members of one or more of the anchors. The object may include a carport, a temporary shelter, a canopy, an umbrella, a tent, and/or a screen. The object may include one or more first posts, one or more second posts, and/or one or more fasteners. One or more of the first posts may include a plurality of first openings disposed along a length of the first post. At least one of the first posts may include the coupling member adapted to couple with the second coupling member of the anchor. One or more of the second posts may include a plurality of openings disposed along a length of the second post. An outer diameter of the second post may be less than an inner diameter of a first post. Fastener(s) may couple with at least one first opening of at least one of the first posts and at least one second opening of at least one of the second posts to couple the first post to the second post.

In various implementations, the anchor may include a removable first coupling member and a body. The removable first coupling member may include a fastener adapted to couple with a driver. The body may include a second coupling member disposed proximate the first end of the body. The second coupling member may couple with an object to be secured using the anchor. The removable first coupling member may removably engage with least a portion of the second coupling member to allow the driver to actuate the anchor. The anchor may include a first plate disposed between the first end of the body and a second opposing end of the body. The first plate may partially circumscribe a shaft of the body. The first plate may include a slanted portion.

Implementations may include one or more features. The anchor may include one or more additional plates. The anchor may include a second plate disposed between the first end of the body and the first plate. The second plate may partially circumscribe the shaft of the body, and the second plate may include a slanted portion.

In various implementations, an anchored post system may include one or more first anchors; a base coupled to a location via the first anchor(s); and a post, which allows objects to be coupled to the post, coupled to the base. A first anchor may be a single anchor and/or may be an anchor capable of coupling to a second anchor (e.g., a linking anchor). For example, the first anchor may be capable of coupling to a second anchor(s) and/or third anchor(s). A first anchor may include a first end and a second end. The second end of the first anchor may be disposed in the first end of a second anchor to couple the anchors. A second end of a third anchor may be coupled to a first end of a third anchor to couple the anchors. The first anchor may be coupled at a first end to a first fastener (e.g., disposed at least partially in the base). The second end of the first fastener may or may not be coupled to a second anchor. A first anchors comprises a body that includes a first end and a second opposing end. The first end of the anchor may include an outer surface and a first coupling member disposed on the outer surface of the first end. The first coupling member may couple with a first driver to secure the first anchor in a location. The first end of the first anchor may include a recess disposed in the first end, and a second coupling member disposed in the recess of the first end. The second coupling member may include a first threaded portion. The first threaded portion may couple with at least part of an object (e.g., to be secured by an anchoring system) and/or with a first fastener. The first threaded portion may be capable of coupling with at least part of a second end of the second anchor. The second end of the first anchor may include a tapered portion and a second threaded portion. The second end of the first anchor may be coupleable with a second coupling member of the second anchor via the second threaded portion of the first anchor. The first anchor may include a shaft disposed between the first end and the second end, and may have a length and a cross-section. The first anchor may include at least one plate that includes a slanted portion. The plate may at least partially circumscribe the cross-section of the shaft. The anchored post system may include one or more first fasteners with a first end and a second opposing end. The first end may couple with a second driver to allow the second driver to couple a first fastener and a first anchor, and the second end may include a threaded portion capable of coupling with the threaded portion of a first anchor. The anchored post system may include a base that includes one or more first openings. The first openings may receive at least a portion of a first fastener, and allow the base to be coupled to the location by coupling at least one first fastener disposed at least partially in a first opening of the base to couple with at least one first anchor secured to the location. The anchored post system may include a post that is coupleable with one or more objects. The post may include a first end and an opposing second end. The post may be coupled coupled to the base proximate a first end of the post.

Implementations may include one or more of the following implementations. The post may include more than one section and the sections may be coupled together to form the post. The post may be collapsible. For example, the post may include at least one first section, and a second section. A first section may include a first end, which is coupled to the base proximate the first end of the first section, and an opposing second end. The post may include a collar extending from a second end of the first section. The collar may include at least two collar openings. At least one of the second sections may be disposed in the collar of the first section. A first collar fastener may be disposed through at least one of the collar openings and at least a portion of the second section. The first collar fastener may allow rotation of the second section about the first collar fastener such that the post is collapsible. A second collar fastener may be disposable through at least one of the collar openings and at least a portion of the second section. The second collar fastener may inhibit rotation of the second section about the first collar fastener when the second collar fastener is disposed in at least one of the collar openings (e.g., with the first collar fastener disposed through at least one of the collar openings). In some implementations, the post may at least partially perforated with apertures, and an object may be coupled to the post via at least one of the apertures. Object(s) coupled to the post may include a light source, a solar panel, a camera, an alarm, communication access point, a canopy, and/or a sign. The first anchor may include a second opening disposed proximate the second end. In some implementations, when the second end of the first anchor is disposed in a recess in a first end of the second anchor, the first anchor and the second anchor may be coupled via a fastener disposed at least partially through a first opening in the first end of the second anchor and the second opening of the first anchor. The anchored post system may include one or more lateral support members coupled to the post.

In various implementations, a lighting system may include one or more lighting members. A lighting member may include first anchors; a base that includes one or more first openings; a post that includes a first end and an opposing second end, where the post may be coupled to the base proximate a first end of the post; and light source(s), which may coupled proximate a second end of the post. The first openings of the base may receive at least a portion of a first fastener, and the base may be coupled to the location by coupling at least one first fastener disposed at least partially in a first opening of the base to at least one first anchor secured to the location. The first anchor may be capable of coupling to a second anchor(s) and/or third anchor(s). For example, a first anchor may include a first end and a second end. The second end of the first anchor may be disposed in the first end of a second anchor to couple the anchors. A second end of a third anchor may be coupled to a first end of a third anchor to couple the anchors. The first anchor may be coupled at a first end to a first fastener (e.g., disposed at least partially in the base). The second end of the first fastener may or may not be coupled to a second anchor. The first end of the anchor may include an outer surface and a first coupling member may be disposed on the outer surface of the first end. The first coupling member may couple with a first driver to allow the first driver to drive the first anchor in a location (e.g., the first driver may couple with the first coupling member, the first driver may be actuated to drive the anchor into a location, and then the first driver may be uncoupled from the first anchor). The first anchor may include a recess disposed in the first end, and a second coupling member disposed in the recess of the first end. The second coupling member may include a first threaded portion that is capable of coupling with at least part of an object to be secured by an anchoring system, a first fastener, and/or with other anchors (e.g., third anchor and/or second anchor). The second end of the first anchor may include a tapered portion, and a second threaded portion. The second end of the first anchor may be coupled with a second coupling member of the second anchor via the second threaded portion of the first anchor (e.g., by allowing the second threaded portion to at least partially engage with a first threaded portion in a recess that is disposed in the first end of the second anchor). The first anchor may include a shaft disposed between the first end and the second end of the first anchor. The shaft may have a length and a cross-section. The first anchor may include one or more plates that include a slanted portion. The plate may at least partially circumscribes the cross-section of the shaft. The lighting system may include one or more first fasteners that include a first end adapted to couple with a second driver to allow the second driver to couple a first fastener and a first anchor. The opposing second end of the first fastener(s) may include a threaded portion capable of coupling with the threaded portion of a first anchor.

Implementations may include one or more of the following features. The post may couple with one or more objects. Object(s) may include, for example but not limited to, a solar panel, a camera, an alarm, a speaker, communication access point, and/or a backboard of a basketball goal. The post may be at least partially perforated with apertures, and at least one object is coupled to the post via at least one of the apertures. The lighting system may include at least one power supply capable of providing power to one or more of the light sources. A power supply may be coupled to the post. A light source may include an LED light source, a metal halide light source, a high pressure sodium light source, and/or a mercury vapor light source. The lighting system may include a plurality of lighting members, and at least one object coupled to at least two of the lighting members. For example, the object may include a canopy and/or a sign. The post may be collapsible. The collapsible post may include first section(s) and at least one second section disposed in the collar extending from a second end of the first section. The first section may include first end coupled to the base proximate the first end of the first section, and an opposing second end. The collar may include at least two collar openings. A first collar fastener may be disposed through at least one of the collar openings and at least a portion of the second section, wherein the first collar fastener allows rotation of the second section about the first collar fastener such that the post is collapsible. A second collar fastener may be capable of being disposable through at least one of the collar openings and at least a portion of the second section. When the second collar fastener is disposed in at least one of the collar openings, the second collar fastener may inhibit rotation of the second section about the first collar fastener. In some implementations, first anchor(s) may include at least one second plate coupled to the shaft. A first anchor may include a second opening disposed proximate the second end. When the second end of the first anchor is disposed in a recess in a first end of the second anchor, the first anchor and the second anchor are coupled via a fastener disposed at least partially through a first opening in the first end of the second anchor and the second opening of the first anchor.

In various implementations, an anchor may include a unibody member with a unibody member length. The unibody member of the anchor may include a first end and a second opposing end. The first end may include a first coupling member that includes at least a portion of an outer surface of the anchor. The first coupling member may include a male connector, and actuating a driver engaged with the first coupling member of the anchor may cause the anchor to be driven into a location. The first coupling member may allow a driver to engage the first coupling member by allowing a female connector of the driver to at least partially surrounding at least a portion of the first coupling member such that a torque may be applied from the driver to the anchor via the first coupling member. The first end of the unibody member of the anchor may include a recess that is disposed in the first end and that extends at least partially along a length of a body of the anchor. The first end of the unibody member of the anchor may include a second coupling member that is disposed in the recess and that includes a threaded portion. The threaded portion of the second coupling member may engage with at least a portion of an object to be secured by the anchor. The second end of the unibody member of the anchor is tapered. A shaft may be disposed between the first end and the second end, and the shaft may have a cross-section and a length. The unibody member of the anchor may include may include a first plate coupled to the shaft. The first plate may be disposed on the shaft proximate the second end of the anchor, and the first plate may be coupled to the shaft and at least partially circumscribes the cross-section of the shaft. The first plate may include a slanted portion (e.g., slanted relative to the shaft). An annular flange may be coupled to the unibody member at a position approximately one eighth of the unibody member length to approximately one third the unibody member length from the first end of the unibody member. The annular flange may be disposed under a surface of the location when the anchor is disposed in a location, and the annular flange may allow removal of the anchor from the location by allowing at least a portion of the annular flange to be gripped to pull the anchor from the location.

Implementations may include one or more of the following features. The anchor may include a fastener adapted to couple with the second coupling member of the unibody member to secure an object to a location. The fastener may include a threaded portion, and at least a portion of threads of the threaded portion of the fastener may engage with at least a portion of threads of the threaded portion of the second coupling member of the unibody member to couple the fastener and the unibody member. The anchor may include one or more second plates coupled to the shaft, and one or more of the second plates may be disposed between the first plate and the annular flange.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 7A illustrates an implementation of a portion of the example multi-post system illustrated in FIG. 6.
FIG. 7B illustrates an exploded view of an implementation of example of a portion of the anchoring system, illustrated in FIG. 7A.
FIG. 11A illustrates an implementation of an example anchor.
FIG. 11B illustrates an implementation of an example anchoring system.

Like reference symbols in the various drawings indicate like elements.

DETAILED DESCRIPTION

Anchoring systems may be utilized to secure an object in a location (e.g., for a period of time, such as temporarily, semi-permanent, and/or permanent). In various implementations, the anchoring system may include at least one anchor. An object such as, a basketball goal, umbrella, covering, canopy, etc., may be coupled to the anchor of the anchoring system to secure the object to a location (e.g., such that the object may be able to sustain a predetermined force).

For example, an anchoring system may be utilized to secure a temporary shelter in a location for a defined time period (e.g., one month, one week, and/or six months). In some implementations, an anchoring system may be utilized to secure a carport for an undefined period of time (e.g., such as when a user installs an object and utilizes it until the object is deformed or unwanted). In various implementations, the anchoring system may be removable without substantially deforming the anchoring system and/or reusable. In some implementations, the anchoring system may couple an object to a location to allow use of the object without the use of additional stabilizers such as concrete footings, concrete piers, guide wires, etc. (e.g., the anchoring system may provide the stability for securing the object during use).

Figure 1A:
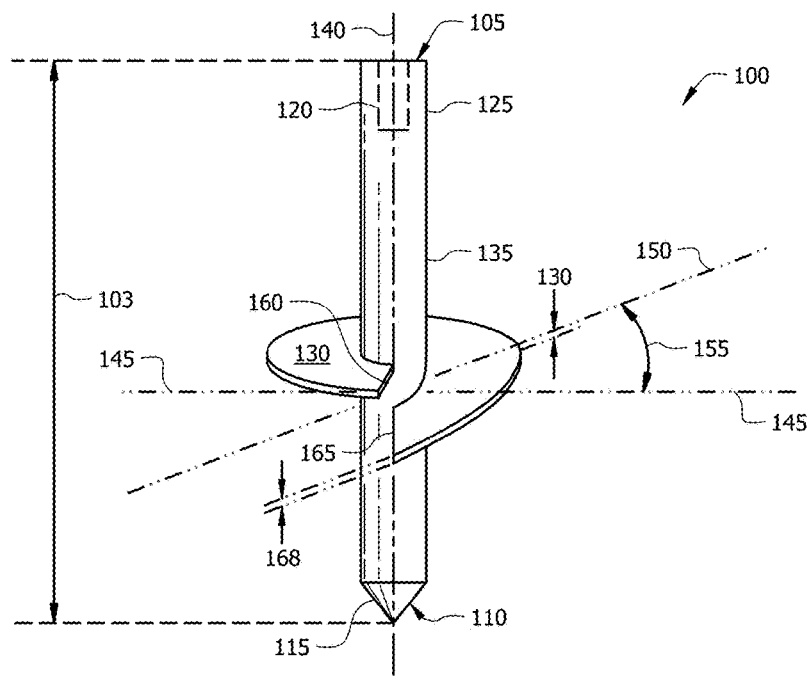
FIG. 1A illustrates a side view of an implementation of an example anchor.
Figure 1B:
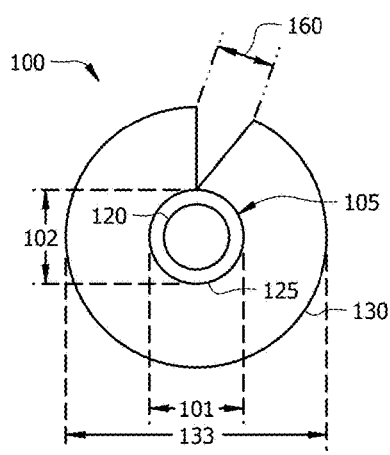
FIG. 1B illustrates a top view of an implementation of the example anchor illustrated in FIG. 1A.
Figure 1C:
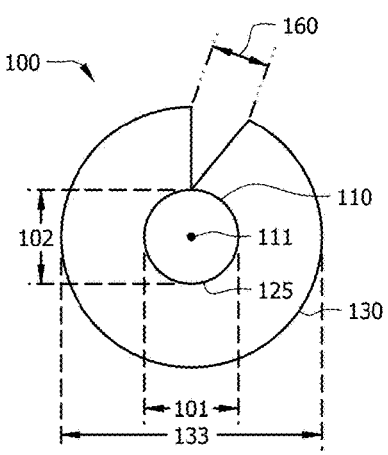
FIG. 1C illustrates a bottom view of an implementation of the example anchor illustrated in FIG. 1A.
Figure 2A:
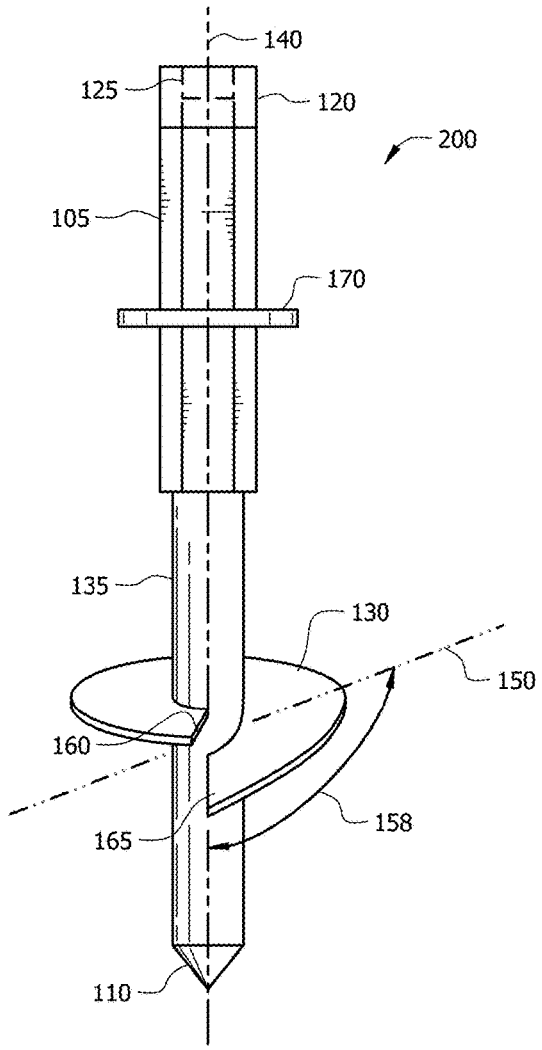
FIG. 2A illustrates a side view of an implementation of an example anchor.

FIG. 1A illustrates an example side view of an implementation of an example anchor 100. FIG. 1B illustrates an example top view of an implementation of anchor 100, illustrated in FIG. 1A. FIG. 1C illustrates an example bottom view of an implementation of anchor 100, illustrated in FIG. 1A. FIG. 2A illustrates a side view of an implementation of an example anchor 200.

The anchor 100 includes a body. At least a portion of the body of the anchor may be an elongated body. The body of the anchor may have a length 101, a width 102, and a height 103. The height 103 of the anchor may be at least approximately 12 inches. In some implementations, the height of the anchor may be at least approximately 16 inches, at least approximately 20 inches, and/or at least approximately 36 inches. In some implementations, the height of the anchor may be selected to satisfy stability criteria (e.g., an amount of force that may be exerted on an anchor without substantially deforming the anchor and/or without substantially moving the anchor from a predetermined location). For example, a first anchor with a height of 36 inches may be able to satisfy larger stability criteria (e.g., withstand a greater amount of vertical tension) than a second anchor with a height of 12 inches. An anchor may be able to withstand approximately 300 pounds of force applied vertically (e.g., upwards when the anchor is installed in a ground) without substantially deforming.

At least a portion of the body of the anchor may have a cross-sectional shape such as a circle, an oval, a rectangle, a square, any regular polygon and/or irregular polygon, as appropriate. In some implementations, the shaft may have different dimensions (e.g., length and/or width) and/or different cross-sectional shapes along a length of the shaft. For example, a first part of the shaft of the body may have a circular cross-section shape and a second part of the shaft may have a hexagonal cross-sectional shape. The body may be at least partially cylindrical, in some implementations. In some implementations, the body and/or the shaft may be approximately uniform along a length of the body and/or shaft.

The body of the anchor includes a first end 105 and a second end 110. The first end 105 is opposed to the second end 110. The first end 105 may have a length and/or a width similar or dissimilar to at least another portion of the body (e.g., the shaft of the anchor). For example, the first end 105 and the shaft may have similar cross-sectional shapes and/or cross-sectional areas (e.g., width and length and/or diameter). At least a portion of the shaft of the body may be approximately 17 to approximately 19 mm.

The second end 110 may be at least partially tapered. One or more sides of the second end 110 may include slanted sides 115 (e.g., at least a portion of the slanted side may be at an angle relative to a side of a portion of the body proximate the second end 110). For example, the second end 110 may be a pointed second end 111, as illustrated in FIG. 1C. The configuration (e.g., angle of slanted side, number of slanted sides, width, and/or length) of the second end 110 may be selected to facilitate the positioning of the anchor and/or driving of the anchor at least partially into a location, such as the ground (e.g., a surface of the earth and/or concrete).

The body of the anchor 100 may include a first coupling member 120 and a second coupling member 125. The first coupling member 120 may be disposed proximate a first end 110. The first coupling member 120 may facilitate driving the anchor into a location. For example, the first coupling member may include a portion that is coupleable to a driver. The driver may be coupled to the first coupling member 120 and actuated (e.g., by a user manually or assisted by a device, such as a drill) to cause a force to be exerted on the anchor 100 such that the anchor is driven into a location, such as the ground. The anchor 100 may be self-driving, in some implementations.

The first coupling member 120 may include a surface adapted to couple to a driver. For example, the first coupling member 120 may include a portion that has a shape similar to a fastener head such as, a bolt head, a screw head and/or a nut head. For example, the first coupling member may include at least a portion of a male fastener head and/or a female fastener head. The first coupling member 120 (e.g., proximate a top surface of the first end 105) may have a shape that receives a screwdriver (e.g., square tip head, hex head, flat head and/or Philips head). In some implementations, the first coupling member may include a threaded surface, recessed surface, and/or other types of surfaces capable of engaging a driver. The driver may include a screwdriver, a socket wrench, an Allen wrench, etc. The driver may be actuated by a user and/or a user operating other machinery (e.g., an auger, a power drill, and/or other type of machinery).

The second coupling member 125 may be disposed proximate the first end 110 of the anchor. The second coupling member 125 may be discrete from the first coupling member 120. For example, the second coupling member 125 and the first coupling member 120 may be disposed on different portions of the body of the anchor. By allowing discrete first coupling member(s) and second coupling member(s) damage to the second coupling member(s) may be inhibited. Damaging the second coupling member may inhibit the coupling of the anchor to the object via the second coupling member, reduce the stability of the coupling between the second coupling member and the object, and/or make the coupling of the anchor and the object more difficult (e.g., when compared with coupling a substantially undamaged second coupling member and object). For example, when driving the anchor into a location, the force of the driver may at least partially deform a portion of the first coupling member (e.g., threads may be damaged). When the second coupling member is discrete from the first coupling member, since the second coupling member may not directly couple with the driver, damage to the second coupling member may be inhibited.

The second coupling member 125 may be coupleable to an object, such as a basketball goal, volleyball net, a canopy, post(s), an umbrella, etc. For example, the second coupling member 125 may be coupled (e.g., directly or indirectly) to at least a portion of the object to at least temporarily secure the object to a location (e.g., the object may be approximately stabilized, set, made stationary by the anchor, and/or capable of maintaining a position or range of positions under the application of a predetermined amount of force).

The second coupling member 125 may include a portion that has a shape similar to a fastener head such as, a bolt head, a screw head and/or a nut head. For example, the second coupling member 125 may include at least a portion of a male fastener head and/or a female fastener head. The second coupling member 125 may include a threaded surface, recessed surface, and/or other types of surfaces capable of engaging with a coupling surface of an object. In some implementations, the second coupling member 125 may be selected to engage with a predetermined coupling surface of a predetermined object. For example, a coupling surface of an object may be threaded and the second coupling member 125 of the anchor 100 may include threads to engage with the threads of the coupling surface of the object.

The second coupling member 125 may include a surface adapted to be disposed in a recess and/or opening of an object, in some implementations. The second coupling member 125 may include a recess adapted to receive at least a portion of the object. In some implementations, the second coupling member and a coupling surface of the object may be adapted to receive a fastener to further secure the anchor and the object. For example, the second coupling member may include first opening(s) and the coupling surface of the object may include second opening(s), where the first opening(s) and the second opening(s) are adapted to at least partially align to receive a fastener such as a pin.

The second coupling member 125 may include a coupling surface that is similar or dissimilar to the first coupling member 125, in some implementations.

The first coupling member 120 and the second coupling member 125 may be, relative to each other, oppositely disposed on the anchor. For example, the first coupling member 120 may be disposed on an outer surface of the anchor 100 proximate the first end 105 of the anchor and the second coupling member 125 may be disposed in an inner surface (e.g., a recess) proximate the first end of the anchor, as illustrated in anchor 200 in FIG. 2A. In some implementation, the first coupling member 120 may be disposed in an inner surface (e.g., a recess) of the anchor 100 proximate the first end 105 of the anchor and the second coupling member 125 may be disposed on an outer surface of the anchor proximate the first end of the anchor, as illustrated in FIGS. 1A and 1B.

Figure 2B:
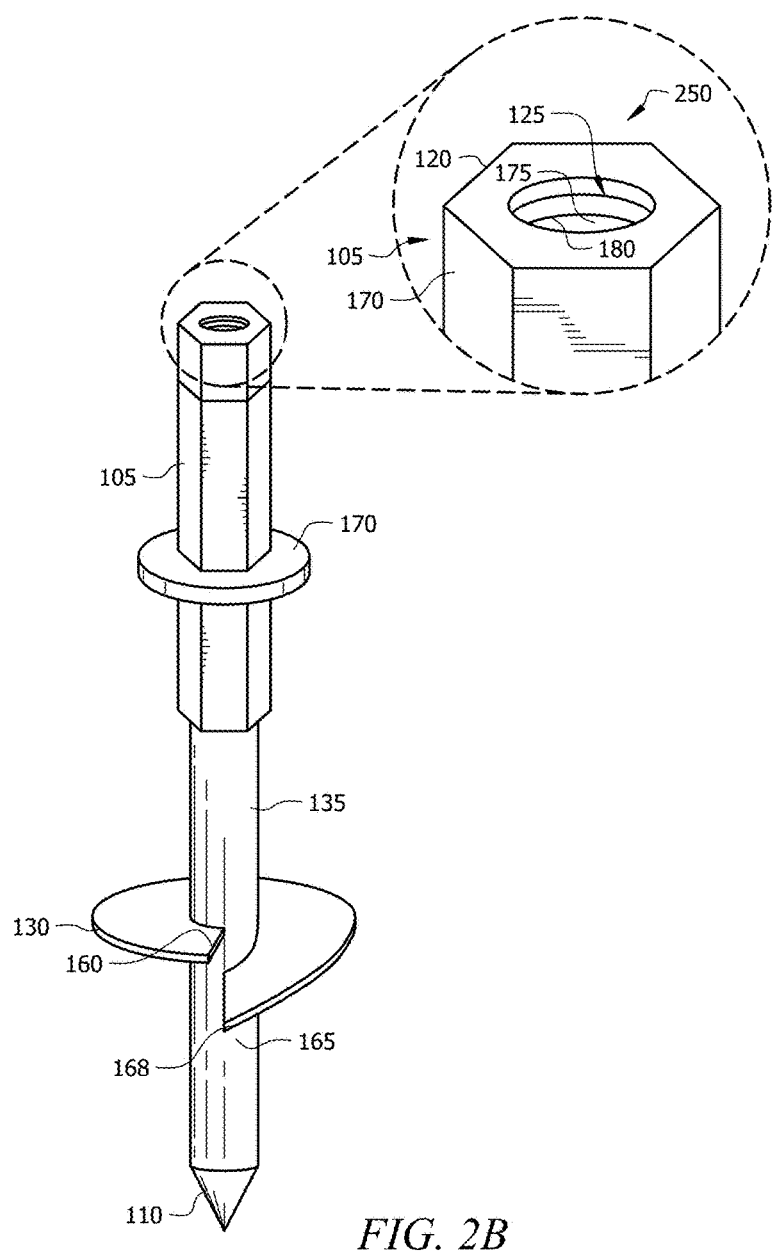
FIG. 2B illustrates a perspective view of an implementation of an example portion of the example anchor illustrated in FIG. 2A.

FIG. 2B illustrates a perspective view of an implementation of an example portion 250 of the example anchor illustrated in FIG. 2A. As illustrated, the first coupling member 120 and the second coupling member 125 are disposed proximate the first end 105 of the anchor 200. The first coupling member 120 is disposed on an outer surface 170 of the anchor proximate the first end 105. As illustrated the first end 105 of the anchor 200 includes a portion that has a shape similar to a hexagonal nut. The first coupling member 120 may include the outer surface 170 of the hexagonal nut shaped first end and the second coupling member 125 may include the threading 180 disposed on an inner surface 175 of the hexagonal nut shaped first end. The configuration (e.g., size, pitch, and/or spacing) of the threads may be selected to couple with a predetermined coupling member of an object to be at least partially secured using the anchor, in some implementations.

In some implementations, the first coupling member 120 and the second coupling member 125 may be disposed on the same surface of the anchor. For example, the first coupling member 120 and the second coupling member 125 may be disposed on the inner surface of the anchor and proximate the first end 105. In some implementation, the first coupling member 120 and the second coupling member 125 may be disposed on the outer surface of the anchor and proximate the first end 105. The first coupling member 120 may be disposed closer to the first end 105 of the anchor 100 than the second coupling member 125. In some implementations, the second coupling member 125 may be disposed closer to the first end 105 of the anchor 100 than the first coupling member 120.

In some implementations, the first coupling member 120 and/or the second coupling member 125 may be centered about axis 140, as illustrated in FIGS. 1A and 2A, and/or not centered about the axis 140.

The anchor includes one or more plates. The plate(s) may provide resistance to lateral and/or vertical forces applied on the anchor and/or object. For example, during use, the anchor may be subject to forces, such as forces pulling the anchor out of the location, forces from objects (e.g., basketballs, volleyballs, and/or people) striking the anchor and/or objects coupled to the anchor, and/or other forces. As illustrated, the anchor 100 may include a plate 130. The plate 130 may be coupled to the shaft 130 between the first end 105 and the second end 110 of the anchor. For example, the plate 130 may be disposed at a position on the shaft that is approximately 10% to approximately 35% times the height of the anchor from the second end of the anchor. The anchor may be disposed approximately 3 inches to approximately 5 inches from a second end of an anchor that is at least approximately 12 inches high, in some implementations.

In some implementations, the anchor may include more than one plate. Additional plates may be utilized to allow the anchor to provide increased stability (e.g., withstand vertical and/or lateral forces without substantial deformation of the anchor and/or to allow the anchor to approximately maintain a position in a location or range of positions), when compared with a single plate anchor. In some implementations, two smaller diameter plates may be utilized in place of a single larger plate to provide similar stability for an anchor. A user's ease of use may be increased since the ease of driving two smaller plates may be greater than driving one larger plate.

Figures 2C, 2D:
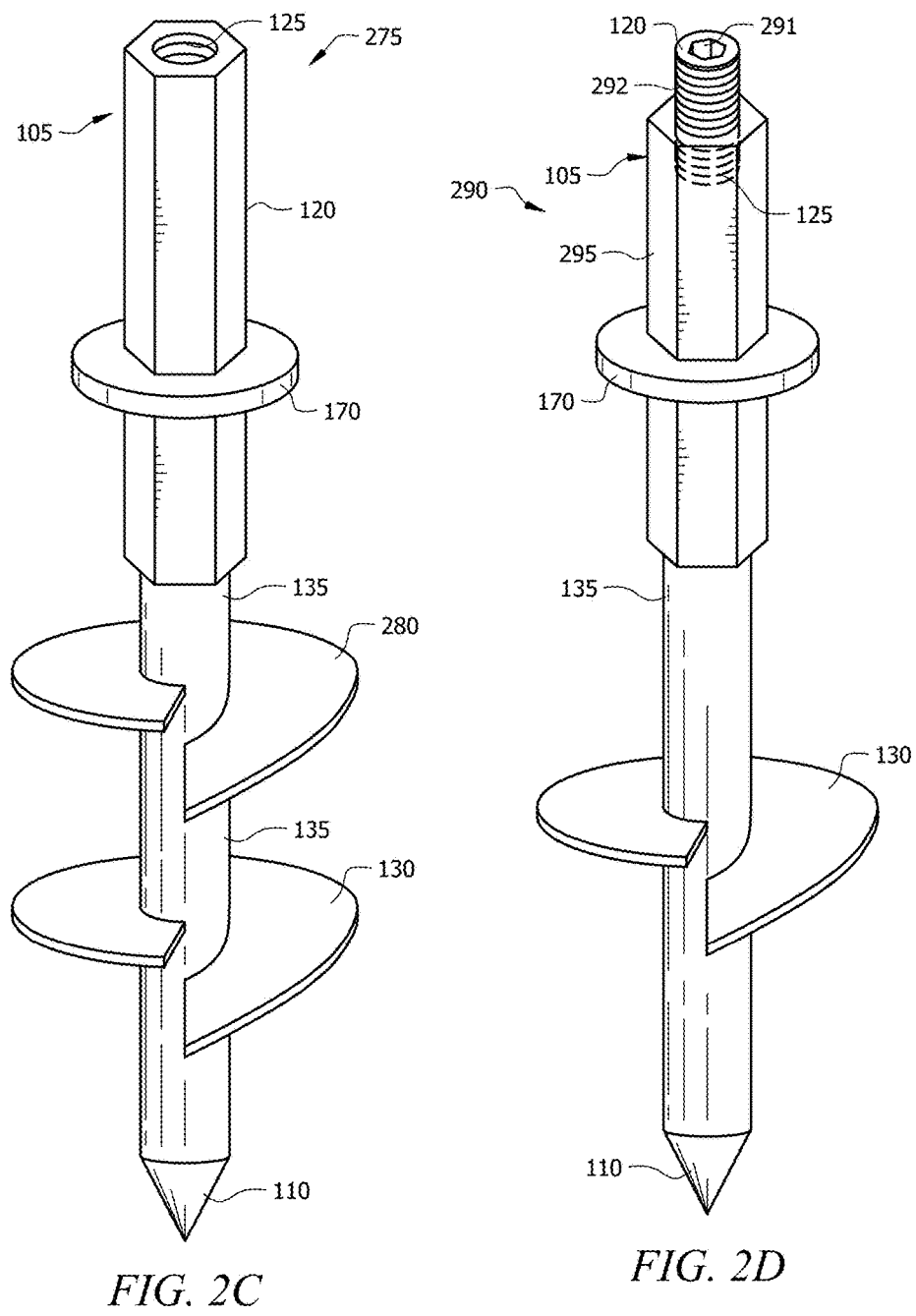
FIG. 2C illustrates an implementation of an example anchor.
FIG. 2D illustrates an implementation of an example anchor.

FIG. 2C illustrates an implementation of an example anchor 275 with two plates coupled to a shaft of the body of the anchor. As illustrated, the anchor 275 may include a first plate 130 disposed between the first end 105 and the second end 110 of the body of the anchor. The anchor 275 includes a second plate 280 disposed between the first end 105 and the first plate 130. In some implementations, the first plate 130 may be disposed at a position on the shaft that is approximately 10% to approximately 35% times the height of the anchor, from the second end of the anchor. The second plate may be disposed at a position on the shaft that is approximately 40% to approximately 60% of the height of the anchor, from the second end of the anchor. In some implementations, the first plate may be disposed at a first position that is a first height from the second end of the anchor and the second plate may be disposed a second position that is approximately the first height from the first plate. The first plate may be approximately 3 inches to approximately 5 inches from a second end of an at least 30 inch high anchor and the second plate may be approximately 14 inches to approximately 16 inches from the second end of the anchor, in some implementations.

As illustrated in FIGS. 1A-2C, a top surface of the inner surface of the plate 130 and/or a bottom surface of the inner surface of the plate(s) may be coupled (e.g., welded or otherwise affixed) to at least a portion of the shaft of the anchor 100. In some implementations, the top surface and the bottom surface of the inner surface of a plate may be coupled to at least a portion of the shaft, which may increase the amount of force that can be applied to the anchor without substantially deforming the anchor, and thus allowing the anchor to retain an object in a location (e.g., withstand a predetermined amount of lateral and/or vertical force applied to the object and/or anchor). For example, an edge of a top surface of plate(s) (e.g., a top surface of an inner surface of a plate) of the anchor may be welded to the shaft of the anchor and an edge of a bottom surface of plate(s) (e.g., a bottom surface of an inner surface of a plate) of the anchor may be welded to the shaft of the anchor.

The plate may include a cross-sectional (e.g., with a length and a width and/or a diameter) and a thickness. The shape of the cross-section of the plate may be approximately circular, approximately oval, approximately rectangular, and/or any other regular or irregular polygon, as appropriate. For example, at least a portion of the plate may be at least partially helically shaped.

The plate may have a thickness. The thickness of the plate may be selected such that deformation of the plate while driving the anchor into a location is inhibited. The thickness of the plate may be approximately uniform. In some implementations, the thickness of the plate may vary. For example, the thickness of at least a portion of the plate may decrease (e.g., the plate thickness may be greater proximate the shaft of the anchor than proximate an edge of the plate).

A plate 130 and/or plate 280 may partially circumscribe a cross-section of a shaft 135 of the body of the anchor 100. In some implementations, the plate 130 may circumscribe a cross-section of the shaft 135 of the body of the anchor 100 at least one time.

The configuration (e.g., size, shape, number of plates, and/or degree of slanting) of the plate may be selected based on the application specifications of the anchor. For example, the size of the plate and/or anchor may be increased to increase the amount of force that can be applied to an object without substantially moving the object from a location to which it is secured.

In some implementations, a plate (e.g., first plate and/or other plates) may be approximately uniform (e.g., a helical plate at least partially circumscribing the shaft of the anchor). In some implementations, a plate may include at least two portions, a first portion and at least one second portion. The first portion may be a portion of the plate that is disposed closer to the second end of the anchor than the second portion of the plate. The first portion may be a slanted portion.

For example, the slanted portion of the plate(s) may be disposed at an angle relative to the shaft. As illustrated, a first axis 140 is disposed parallel to at least a portion of the shaft 135 of the anchor 100. A second axis 145 is disposed perpendicular to at least a portion of the shaft 135 of the anchor 100 and the first axis 140. A third axis 150 is disposed parallel to at least a portion (e.g., a slanted portion) of the plate 130. A first angle 155 may be disposed between the second axis 145 and third axis 150, such that the slanted portion of the plate 130 is disposed at approximately the first angle from at least a portion of the shaft 135. The first angle 155 may be between 0 and 90 degrees. In some implementations, the first angle 155 may be between approximately 20 degrees and 70 degrees. In some implementations, the slanted portion of the plate may be slanted at a second angle 158, relative to the first axis 140.

In some implementations, at least a part of the second portion of the plate may be approximately normal to the shaft of the anchor. At least a part of the second portion of the plate may be slanted, in some implementations. For example, the second portion of the plate may be disposed in the same plane as the first portion. The second portion of the plate may be disposed at an angle relative to the shaft of the anchor that approximately 90 degrees from the third axis 150 to approximately 90 degrees from the first axis 140.

In some implementations, the plate may be at least partially helical. The first angle 155 may a helix angle (e.g., arctangent of (2×pi×average radius of the plate/lead of the plate)).

The plate 130 may include a recess 160 and an edge 165. The recess 160 and/or the edge 165 may facilitate driving the anchor at least partially into a location. The recess 160 may be a gap between a first end of the plate and a second end of the plate, as illustrated. The recess 160 may be approximately 40 mm to approximately 50 mm, in some implementations. The recess may be approximately 0.2 to approximately 2 inches in some implementations. For example, in some implementations, an anchor plate may be at least approximately 4 inches and a gap may be approximately 1.7 inches to approximately 1.8 inches. The length of the gap may be approximately 40% to approximately 50% of the diameter, width, or length of a plate. The length of the gap may be less than 50% of the diameter of the plate, in some implementations.

The edge 165 may be disposed proximate a second end of the plate. The edge 165 may be a downward slanting portion of the plate. The edge 165 may be disposed at an angle of approximately 0 degrees (e.g., parallel to axis 140) to approximately 45 degrees from the axis 140 parallel to the shaft. The edge 165 may be sharp. For example, the edge 165 may have a thickness 168 to facilitate penetration of the anchor in a location (e.g., the ground). A thickness 168 of a portion of the edge 165 may be similar to the thickness 132 of the plate. In some implementations, the thickness of the plate may be approximately 9 cm to approximately 11 cm. The thickness 168 of the edge 165 and/or the plate 130 may vary such that the thickness of the plate increases with increasing proximately to the shaft 135 of the anchor 100. In some implementations the thickness 168 of the edge may be less than the thickness 132 of the plate 130.

As illustrated in FIG. 1A, the shaft 135 of the body of the anchor 100 may have a substantially similar cross-sectional area across a portion of a height of the anchor. For example, the width 101 and the length 102 of the anchor may be approximately similar proximate the first end 105 of the anchor and proximate the second end 110 of the anchor (e.g., prior to a tapered portion of the second end). The plate 130 may have a width 133 that is at least approximately 2 times the width of at least a portion of the shaft 135.

In some implementations, the width of the plate 130 may be approximately 3 inches to approximately 9 inches and the length of the plate 130 may be approximately 3 inches to approximately 9 inches. In some implementations, a plate may be approximately 3.5 inches to approximately 4.5 inches. In some implementations, a plate may be approximately 7.5 to approximately 8.5 inches. Anchors with more than one plate may include plates of similar and/or dissimilar sizes.

The height of the anchor may be based on the application of the anchor (e.g., use and/or location of use). In some implementations, the height of the anchor may be approximately 10 inches to approximately 38 inches.

A configuration of an anchor (e.g., width, length, height, plate number, plate size, plate angles, and/or configuration of components) may be selected such that a predetermined force may be applied to the anchor without substantially deforming the anchor and/or without uncoupling the object from a location to which it is secured. Approximately 200 pounds of force may be applied to the anchor without substantially deforming the anchor. In some implementations, approximately 300 pounds of force may be applied to the anchor and/or anchoring system without substantially deforming the anchor.

As illustrated in FIG. 2A, the width and/or length of the shaft 130 of the body of the anchor 100 may vary across the height of the shaft. For example, the shaft 135 may have a first width and a first length proximate the first end 105 of the anchor 100 and a second width and a second length proximate the second end 110 of the anchor. As illustrated, the first width is greater than the second width.

The anchor 100 may include a flange 170 disposed between the first end 105 and the plate 130. The flange 170 may include an annular ring, in which at least a portion of the inner surface of the annular ring is coupled to at least a portion of the shaft. The flange 170 may include protrusion(s). For example, the flange 170 may include at least two opposing protrusions coupled to at least a portion of the shaft proximate an end of each protrusion. The flange 170 may include a series of more than one protrusions disposed radially about the shaft of the anchor.

The flange 170 of the anchor may be utilized to facilitate removal of the anchor from a location. In some implementations, when an anchor is driven into a location, the top surface of the first end may be disposed approximately flush with a top surface of the ground and/or below a top surface of the ground. Thus, when the anchor is not coupled with an object, the anchor may be kept in the ground and be inhibited from acting as a trip hazard. A cap may couple with the first coupling member and/or the second coupling member. The cap may inhibit earth, dust, debris, etc. from the location from entering recesses proximate the first end of the anchor. When an anchor is to be removed, a user may engage a driver with the first coupling member to provide a force to lift the anchor out of the ground and/or may pull (e.g., by hand and/or with a wrench) the flange 170 to remove the anchor from the location. In some implementations, the anchor may be installed such that the flange is disposed proximate a top surface of the location (e.g., the ground). To remove the anchor, a user may grip the flange (e.g., by hand and/or with a tool, such as a wrench) and pull the anchor out of the location.

Although FIGS. 1A-11B depict implementations of anchors, other configurations may be utilized. For example, the anchor may be a unibody construction (e.g., instead of coupling the plate and/or flange to the shaft, the anchor may be molded or formed as a single piece). The anchor may include materials such as steel (e.g., galvanized steel and/or stainless steel), aluminum, fiber-reinforced plastics, or any appropriate material. The materials included in the anchor may be based on the amount of stability (e.g., the amount of vertical and/or lateral forces that the anchor may be specified to be able to maintain an approximate location of an object and/or that an anchor may be able to withstand without substantial deformation). For example, anchors that include galvanized steel may be able to provide greater stability than anchors that include aluminum.

In some implementations, the height portion of the shaft that is above the plate may be greater than the height of the first and/or second coupling member. For example, the height of the portion of the shaft above the plate and/or flange of the anchor may be approximately 4 inches and a threaded portion of the second coupling member may be approximately 1 inch. By allowing a greater shaft height than coupling member height (e.g., height of the first coupling member and/or the second coupling member), objects with thicknesses greater than a coupling member of the anchor may be at least partially secured using the anchor (e.g., by providing a height that allows an anchor to pass at least partially through an opening in a plate of an object). In some implementations, a predetermined force may be applied to the anchor (e.g., via the driver and/or by the object to be at least partially secured) without substantially deforming the anchor. In some implementations, the recess and edge of the anchor may have a knife edge or similarly tapered edge that facilitates penetration of the soil at a location. The edges of the plate may be tapered to facilitate penetration of soil by the anchor at a location.

In some implementations, the anchor may include a removable first coupling member. FIG. 2D illustrates an implementation of an example anchor 290. As illustrated the anchor 290 includes a first end 105 and a second end 110. The first coupling member 120 comprises a fastener (e.g., bolt and/or screw). The fastener includes a first fastener coupling member 291 that is adapted to engage with a driver and a second fastener coupling member 292. As illustrated, the first fastener coupling member 291 is disposed on at least a portion of an inner surface of the fastener and the second fastener coupling member 292 is disposed at least partially on an outer surface of the fastener. The first fastener coupling member 291 may include any appropriate coupling member such as a recess to receive a socket wrench, threads, a protrusion to engage with a wrench, etc. The second fastener coupling member 292 may include any coupling member appropriate to engage with the second coupling member of the anchor, such as threads, a recess to receive a socket wrench, etc.

The anchor may include other features, such as one or more plates 130, a flange, a tapered end, and/or an additional coupling member 295. The additional coupling member may be utilized to couple with a driver to facilitate driving and/or removing an anchor from a location. The additional coupling member may engage with an object, in some implementations. For example, an object may include a post with a recess proximate an end. The recess may include a first portion adapted to engage with the additional coupling member and a second portion adapted to engage with the fastener. For example, the post may include a sleeve with two different inner diameters. A first diameter may engage with the outer surface of the anchor and the additional coupling member. The second diameter may be less than the first diameter and capable of coupling with the threads of the fastener.

To drive the anchor into a location and/or remove the anchor from a location, the second fastener coupling member of the first coupling member (e.g., fastener) may engage with the second coupling member. The driver may be engaged with the first fastener coupling member of the first coupling member. The driver may be actuated such that the force from the driver is translated to the first coupling member and the shaft anchor to drive the anchor at least partially into the location. The force from the driver may not substantially damage at least a portion of the second coupling member of the anchor. For example, the force applied to the first coupling member by the driver may not substantially damage the threads of the second coupling member. The first coupling member may then be disengaged from the second coupling member of the anchor. An object may then be coupled to the anchor via the second coupling member of the anchor. For example, a post of the object may be screwed into the threads of the second coupling member. In some implementations, during removal of the anchor from a location, the object may be removed from the second coupling member and the first coupling member may be reengaged with the second coupling member. A driver may then be utilized to at least partially remove the anchor from the location.

Although FIG. 2D illustrates an implementation of an anchor with a removable first coupling member, other implementations may be utilized as appropriate. For example, the first fastener coupling member 291 is disposed on at least a portion of an outer surface of the fastener and the second fastener coupling member 292 is disposed at least partially on an inner surface of the fastener. Although the anchor is illustrated as including an additional coupling surface 295, in some implementations, the anchor may not include the additional coupling surface 295.

During use of an anchor (e.g., anchor 100, anchor 200, anchor 275, and/or anchor 290), a user may dispose an anchor at a location to which an object may be secured. The anchor may be oriented such that the second end of the anchor may be driven at least partially into the ground prior to other portions of the anchor. The slanted edge of the second end of the anchor may be pushed into the location (e.g., the ground) by the application of force to the anchor (e.g., the first end of the anchor) by the user. The user may couple the driver and the first coupling member of the anchor (e.g., by engaging a portion of the driver with the first coupling member of the anchor). For example, the user may engage a first coupling member that includes a surface similar to a bolt head with a socket wrench that is capable of coupling to the first coupling member. The user may actuate the driver to apply a force to the anchor and drive the anchor at least partially into the location. For example, the actuation of the socket wrench may rotate the anchor and drive the anchor at least partially into the location. As the anchor is driven into the location, such as the ground, the plate may contact a surface of the location. The anchor may be driven into the location until at least the plate of the anchor is below a top surface of the location (e.g., the plate is underground). In some implementations, the anchor may be driven into the location until the plate is below the top surface of the location and the flange is above the top surface of the location. In some implementations, at least a portion of the flange may contact at least a portion of the top surface of the location. The anchor may be driven into a location such that the top surface of the first end of the anchor is below or approximately even with a top surface of the location. Then, the user may uncoupled (e.g., disengage) the driver, such as a socket wrench, from the first coupling member.

The anchor may be removed from the location in a variety of ways. For example, a user may grip (e.g., with the user's hands or with a tool) at least a portion of the flange and pull the anchor out of the location. In some implementations, the user may couple a driver and the first coupling member and actuate the driver such that a force in the reverse direction (e.g., when compared with the direction of the force to drive the anchor at least partially in the location) is applied to the anchor. The actuation of the driver may pull the anchor at least partially out of the location (e.g., the ground). A user may utilize both removal operations, in some implementations. For example, a user may couple the driver to the first coupling member and actuate the driver to pull the anchor at least partially out of the location. In some implementations, the anchor may spin (e.g., driving the anchor may rotate the anchor but not substantially decrease the depth at which the anchor is disposed in the location). Thus, the user may grip the flange to further remove the anchor from the location. In some implementations, since the top surface of the anchor is approximately level with and/or below the top surface of the ground, a user may utilize the driver to partially remove the anchor from the location and when the flange is proximate the top surface of the location, then grip the flange to further remove the anchor.

In various implementations, the anchoring system including an anchor may be used to secure an object to a location. The anchoring system may be utilized to directly and/or indirectly couple an object to a location. For example, at least a portion of the object may be coupled to at least a portion of the anchoring system (e.g., the second coupling member of the anchor) to directly couple the object to a location. In some implementations, the anchoring system may indirectly secure an object to a location by securing a member (e.g., a plate, a post, and/or a bracket) to at least a portion of the object and the anchoring system (e.g., the second coupling member of the anchor).

Figure 3A:
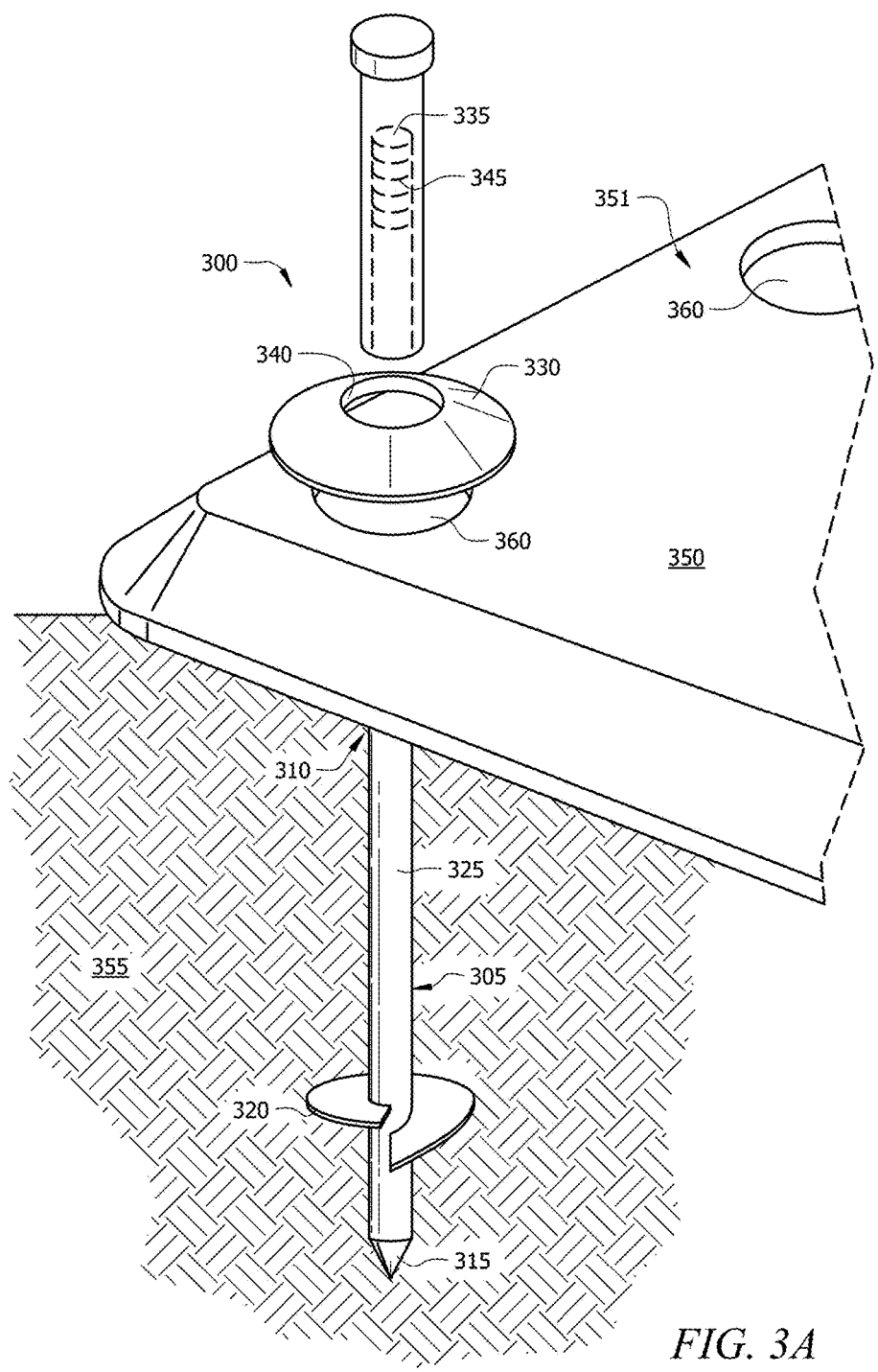
FIG. 3A illustrates an implementation of an example anchoring system.
Figure 3B:
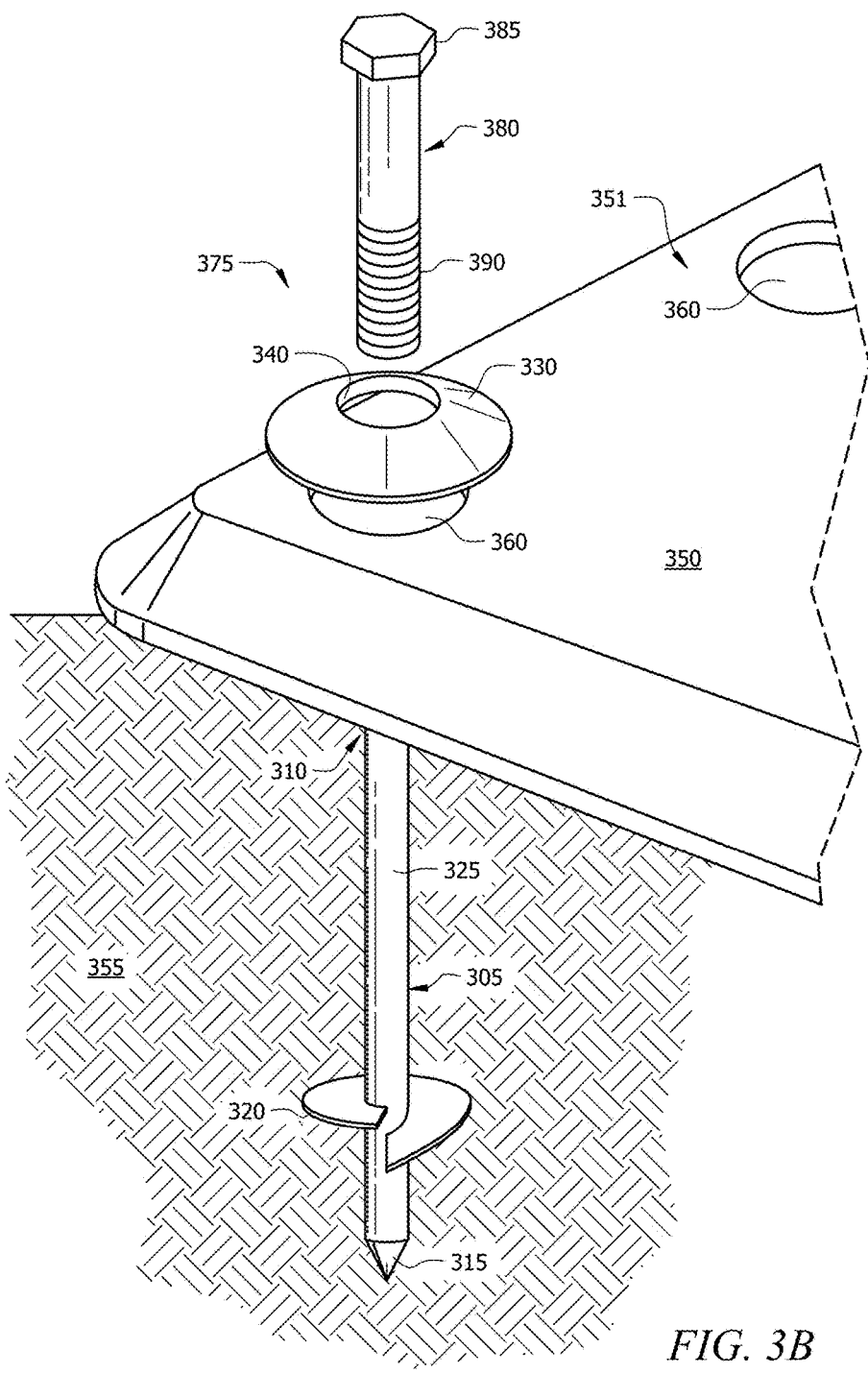
FIG. 3B illustrates an implementation of an example anchoring system.

FIG. 3A illustrates an exploded view of an implementation of an example anchoring system 300 indirectly anchoring an object. FIG. 3B illustrates an implementation of an example anchoring system 375 indirectly anchoring an object. As illustrated in FIGS. 3A and 3B, the anchoring system 300, 375 may include an anchor 305. The anchor 305 may include a first coupling member and a second coupling member proximate a first end 310 of the anchor. The anchor 305 may include a tapered second end 315. The anchor 305 may include a plate 320 disposed between the first end and the second end of the anchor. The plate 320 may be coupled to the shaft 325 of the anchor 305. The shaft 325 may be an elongated member and may have a shape similar to a cylinder.

In some implementations, a washer 330 and the fastener 335, 380 may be included in an object to at least partially secure the object 350 to a location 355. As illustrated in FIG. 3A, the fastener 335 may include a body with a recess that includes threads 345. The threads may be adapted to couple with a second coupling member of the anchor 305, which may be similar to the anchor illustrated in FIG. 1A, in some implementations. As illustrated in FIG. 3B, the fastener 380 may include a body with a fastener head 385 (e.g., hex bolt head, fastener head to receive an Allen wrench, and/or fastener to receive a screwdriver) and a threaded portion 390. The threads of the threaded portion 390 of the fastener 390 may couple with a second coupling member of an anchor 305, such as the anchor illustrated in FIG. 2A, in some implementations.

To secure an object 350 in a location 355, the anchor 305 may be positioned in the ground, as illustrated in FIG. 3. For example, a user may drive the anchor into the location 355 by engaging a driver with a first coupling member of the anchor. The user may actuate the driver to position the anchor in the location (e.g., such that the plate is disposed in the ground). The object 350 may include one or more openings 360 (e.g., the coupling members of the object may include openings), adapted to engage with the second coupling member of the anchor 305. The openings of the object 350 may have a cross-sectional size and/or shape such that at least a portion of the anchor may be disposed at least partially through the opening of the object.

To at least partially secure the object 350 to the location 355, the object may be positioned such that the first end of the anchor may be disposed at least partially in the opening 360 of the object. The object 350 may include a washer 330 and a fastener (e.g., fastener 335 and/or fastener 380) to facilitate coupling the object to the anchoring system. The washer 330 may be disposed proximate a top surface 351 of the object 350. At least a portion of the anchor (e.g., at least a portion of the first end) and/or the fastener 335, 385 may be disposed at least partially through the washer 330. The threaded portion 345 of the fastener 335, 385 may engage with the second coupling member of the anchor. A user may actuate the fastener 305 (e.g., by hand or using a tool, such as a socket wrench) to engage the threads 345, 390 of the fastener with the second coupling member (e.g., threads) of the anchor 305. The fastener 335, 380 may be tightened against the washer, in some implementations, to at least partially secure the object to the anchor and thus the location. One or more additional anchors, washers, and/or fasteners may be utilized with one or more of the other openings in the object to further secure the object to the location, in some implementations.

Although FIGS. 3A and 3B illustrate implementations of an anchoring system and an object, other implementations may be utilized. For example, the anchoring system may include a washer and a fastener. The washer may have an opening to receive at least a portion of the fastener and/or at least a portion of the anchor. For example, the opening of the washer may have a cross-sectional area greater than a cross-sectional area of the fastener and/or the anchor (e.g., the shaft of the anchor, the first coupling member, and/or the second coupling member). The fastener may include a portion to engage with the second coupling member. For example, a portion of the fastener may be threaded.

In some implementations, the first coupling member may be disposed on an inner surface of the anchor and the second coupling member may be disposed on an outer surface of the anchor. The first coupling member may be coupled with a driver to dispose the anchor at least partially in a location. The second coupling member of the anchor may include a portion to engage with a coupling member of the object. For example, the second coupling member of the anchor may include a threaded portion adapted to engage with a threaded portion of the object. A washer may be disposed about at least a portion of outer surface of the first end of the anchor. A fastener may include a coupling portion to engage with the first coupling member of the anchor and a fastener head. The fastener head may be sized to retain the washer between the fastener head and the object and/or to retain a portion of the object (e.g., a plate) to a portion of the anchor (e.g., the flange). Thus, the fastener may couple the object and/or the washer to the anchor.

In some implementations, a second washer (e.g., in addition to and/or instead of the washer disposed between the object and the fastener) may be disposed between the location and the object. For example, the washer may be disposed about the shaft of the anchor above the flange of the anchor.

In various implementations, the anchoring system may be utilized with an object to secure the object at a location. The object may include one or more posts. The posts of the object may include a coupling member (e.g., a threaded surface) to couple with the second coupling member of the anchor. Thus, by coupling one or more posts of the object to the second coupling member(s) of the anchor(s), the object may be at least partially secured to a location (e.g., the object may be retained at a location when a predetermined design force is applied to the object, such as 300 pounds).

In some implementations, the anchoring system may be utilized to secure a sporting goal, such as a basketball goal assembly. Rather than permanently securing a basketball goal to a location using concrete or filling a basketball goal base with sand or water to secure a basketball goal to a location, a basketball goal may be secured to a location using the anchoring system. Utilizing the anchoring system to secure a basketball goal may allow ease of transport, flexibility, access to basketball goals in a variety of locations, conserve resources (e.g., since water may not be wasted by filling and/or emptying a base of a basketball goal), ease installation, and/or ease removal. For example, affixing a basketball goal with concrete may require digging a hole and transporting concrete to a location, and removal may be cumbersome since removal involves removing the concrete surrounding a post of the goal. When basketball goals are filled with water and sand, they are heavy (e.g., 200 pounds) and difficult to transport, and may cause waste of the resources used to fill the base. Thus, the anchoring system may allow ease of installation, ease of removal, and/or may not require resources such as sand and/or water to be utilized (e.g., which may save resources and money) in some implementations.

In some implementations, temporary basketball courts may be constructed utilizing the anchoring system. For example, in a location such as a park, the anchors may be utilized to secure the basketball goal to the ground of the park. A temporary flooring system may be utilized to create a floor appropriate for the basketball court (e.g., temporary wooden floors, etc.)

Figure 4A:
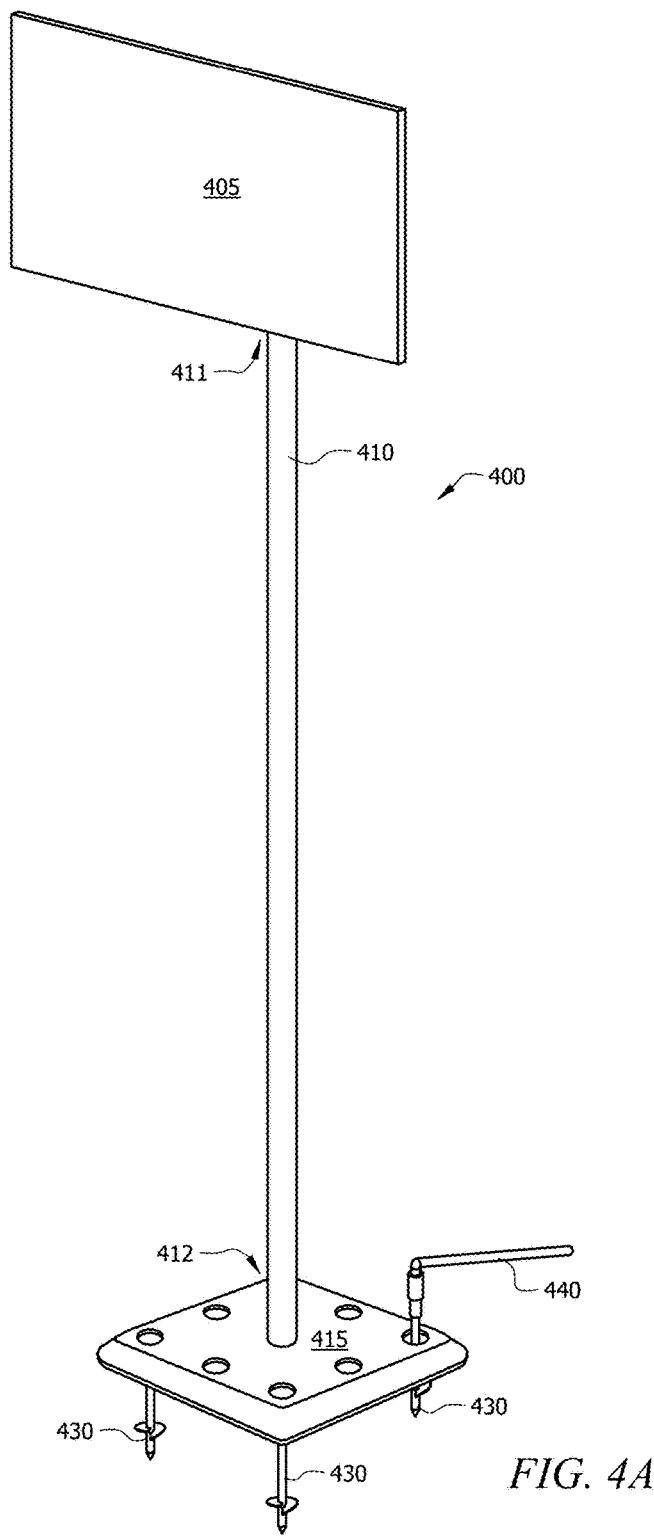
FIG. 4A illustrates an implementation of an example basketball goal assembly.

FIG. 4A illustrates an implementation of an example basketball assembly 400 with an anchoring system. The basketball assembly 400 may include a backboard 405, a post 410, and a base 415. The backboard 405 may include a basketball hoop (e.g., a rim and a net). The backboard 405 may be coupled to a post 410 directly (via one or more coupling members, such as brackets and/or fasteners) or indirectly (e.g., via a boom).

The post 410 may be coupled proximate a first end 411 to the backboard (e.g., via the boom or directly). The post 410 may include coupleable sections, in some implementations. For example, the post may include two or more sections, in which an end of a section may be coupled to an end of another section to form the post 410. The number of sections may be selected to ease transport of the basketball goal assembly when disassembled. The size of each section may be different or approximately the same. For example, when assembled the post may be more than approximately 9 feet tall. The post 410 may include 3 sections that are at least approximately 3 feet high each. Transporting 3 feet high sections may be easier than transporting a single at least 9 feet high post, and so transport of the basketball assembly may be eased.

Figure 4B:
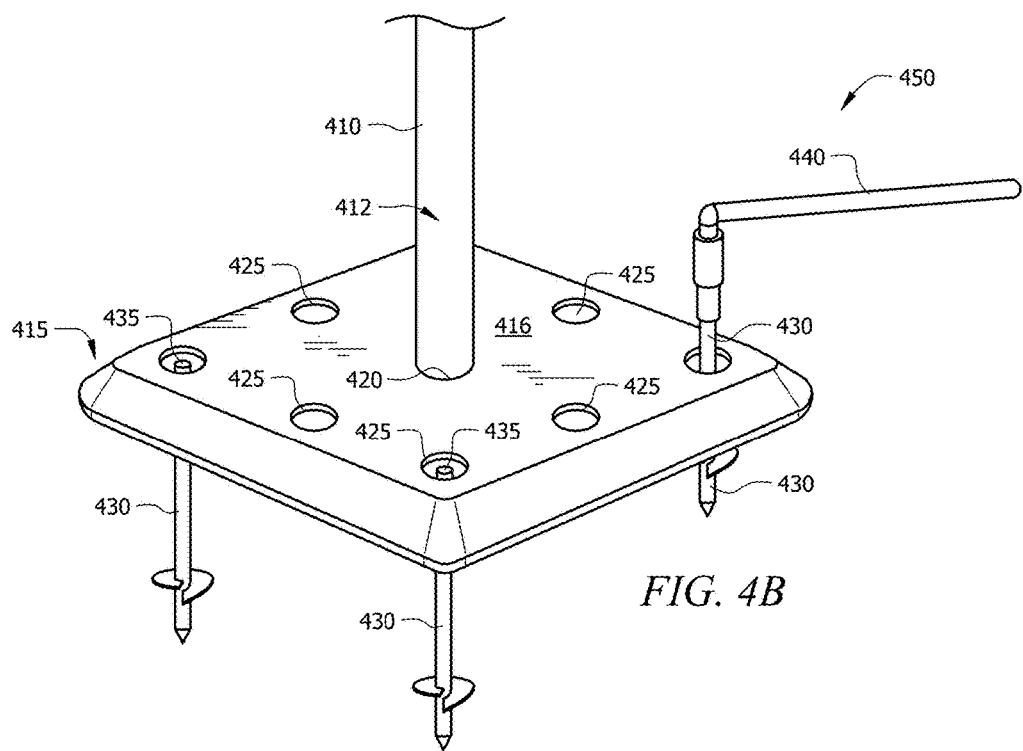
FIG. 4B illustrates an implementation of an example portion of a basketball goal assembly.

The post 410 may be coupled proximate the second end 412 to a base 415, as illustrated in the portion 450 of the basketball assembly in FIG. 4B. The post may be disposed proximate a center of the base 415, in some implementations. The second end 412 of the post 410 may include a coupling member that engages with a post coupling member 420 of the base 415. For example, an outer surface proximate the second end 412 of the post 415 may include threads and a post coupling member 420 may include threads to engage the threads of the post.

As illustrated, the base 415 may include anchor coupling members 425. The anchor coupling members 425 may include openings in the base 415. The anchor coupling members 425 may be disposed at a plurality of positions in the base 415. Including a plurality of possibly anchor coupling members in which the anchors may at least partially reside may facilitate installation (e.g., if an obstruction inhibits anchor position in an opening of the base, then a different opening may be used). The number of anchor coupling members 425 provided and/or utilized by the user may depend on the amount of stability to be obtained. For example, if the basketball assembly is being used with children a first number of anchors may be utilized with the anchor coupling members and if the basketball assembly is being used in a for a long duration of time and/or in inclement weather (e.g., winds and/or freezing conditions), then a second number of anchors may be utilized.

The anchor(s) 430 of the anchoring system may be disposed at least partially through the anchor coupling members 425 during use. A fastener 435 may be coupled to an anchor 430 to at least partially secure the base 415, and thus the basketball assembly 400, to a location.

Figure 4C:
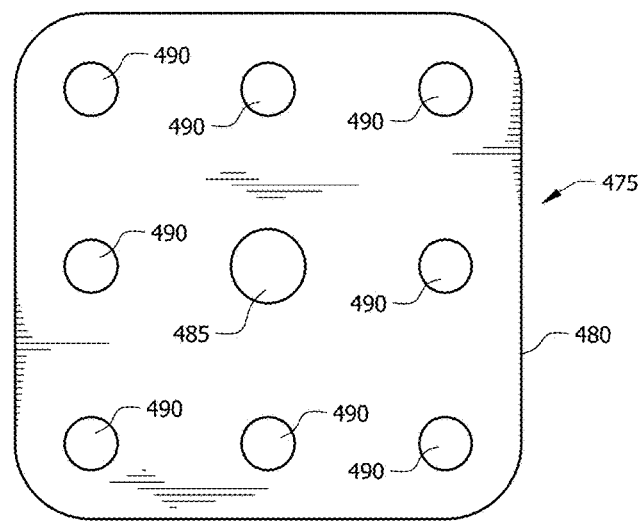
FIG. 4C illustrates an implementation of an example portion of a basketball goal assembly.
Figure 4D:
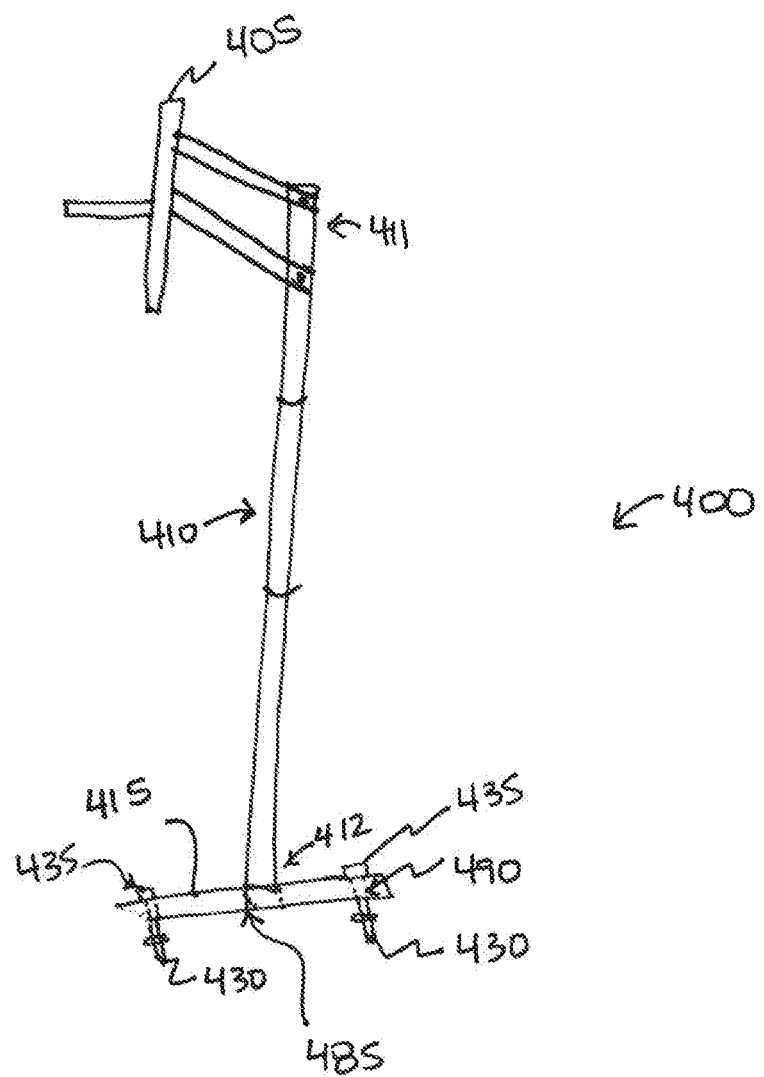
FIG. 4D illustrates a side view of an implementation of the example basketball goal assembly illustrated in FIG. 4A.

In some implementations, a template may be utilized to assist in positioning the anchors. FIG. 4C illustrates an implementation of an example template 475. The template 475 may include a post opening 485 which may indicate the position of the post relative to the base and one or more anchor openings 490. The anchor openings 490 may be disposed at a plurality of positions about the template 475. The positioning of the anchor openings 490 may be similar to the position of the anchor coupling members 425 in the base 415. The anchor openings 490 may have a cross-sectional size and/or shape that allows the anchor (e.g., the plate of the anchor) to pass through the anchor opening. The user may position the template in a location and drive the anchors through the anchor openings in the template. When the user has driven the anchors into the location, the template may be removed and the base 415 of the basketball assembly may be positioned such that each of the anchors in the location are disposed at least partially in at least a portion of the coupling members 425 of the base 415. In some implementations, the template may be a portion (e.g., a top face or a bottom face) of the base of the basketball assembly.

Although FIGS. 4A-4C illustrate an implementation of a basketball assembly, other implementations may be utilized. For example, the post may not include removable sections. In various implementations, the configuration (e.g., size, relative size, shape, and/or orientation) and composition (e.g., materials included and/or not included) of the basketball assembly and components thereof (e.g., backboard, basketball hoop, and/or post) may be based on standards, such as industry standards (e.g., National Basketball Association standards, Olympic standards, National Collegiate Athletic Association standards, and/or school standards) and/or government standards (e.g., safety standards).

In some implementations, the post or portions thereof may be positioned at an angle relative to the base. For example, the post may be positioned from approximately 0 degrees to approximately 90 degrees with respect to the base (e.g., an axis parallel to the top surface 416 of the base) and/or a top surface of the location. For example, the post may be positioned at approximately 60 degrees, approximately 70 degrees, and/or approximately 90 degrees with respect to the top surface of the base and/or the top surface of a location. Allowing the post to be coupled to the base and disposed at various angles relative to the base may facilitate installation and/or storage. For example, the basketball assembly may be assembled the post approximately parallel to the top surface of the base and/or the location and then rotated to a position approximately perpendicular to the top surface of the base and/or a top surface of the location (e.g., the top surface of the ground). The post may be coupled to the base via an opening or recess in the base and a fastener (e.g., bolt and pin) and allowed to rotate to approximately 45 degrees, approximately 75 degrees, and/or approximately 90 degrees relative to a top surface of the base and/or the top surface of the location, in some implementations. For example, when a top surface of a location is at an angle, the angle of the post relative to the base and/or location may be less than 90 degrees allow a post perpendicular to a playing surface and at an angle to the base and/or location.

In some implementations, adjusting the number of sections coupled to form the post may vary a height of the backboard, relative to a base. For example, to create a backboard height for a toddler a single section of the post may be used as the post. To create a backboard height appropriate for a child, two sections of the post may be coupled to create the post. To create a NBA regulation height basketball goal assembly, three posts may be coupled to create the post to which the backboard is coupled.

In some implementations, the height of the backboard may be varied by coupled the backboard to various positions across a height of the post. In some implementations, coupling the boom to various positions along the height of the post may vary the height of the backboard. In some implementations, the height of the backboard may be adjusted in discrete positions (e.g., the post may have openings at various positions across the height of the post) and/or may be adjusted to any position along the height of the post (e.g., by sliding a u-shaped bracket that at least partially surrounds the post and couples to the backboard proximate the ends of the u-bracket to a position on the post and then tightening the ends of the bracket to the backboard such that the position is maintained).

In some implementation, the basketball assembly 400 may be a kit that includes a basketball post and goal and an anchoring system comprising one or more anchors. The kit may include fasteners and/or washers.

In various implementations, installation of a basketball goal assembly at a location may be performed without concrete footings and/or weighted footings (e.g., water or sand filled bases). The anchoring system may satisfy stability criteria (e.g., based on company guidelines, industry guidelines, etc.) for basketball goal assembly installation. The anchoring system may include anchors with first and second coupling members and plate(s). The anchors may be coupleable anchors (e.g., the anchors may be coupled to each other), in some implementations.

A user may select a location for installation of a basketball goal assembly. The location may be the ground, a paved area, asphalt, etc. When the user selects an unpaved ground, the force for driving anchors may be less than when a paved area is selected for installation.

Two or more anchors 430 maybe driven into the selected location. An anchor may include a first end and a second opposing end, which includes a tapered portion. The tapered portion may be placed in contact with the top surface of the location to drive the anchor into the location. In some implementations, a guide for the orientation of the anchors relative to each other may be used to mark or otherwise designate a position for the anchor(s). For example, the openings in the base of the basketball assembly may be used as a guide.

To drive an anchor 430 at least partially into the location, a driver, such as a socket wrench (e.g., manually driven and/or mechanically driven, such as when using a socket coupled to a drill), may be coupled to a first coupling member of an anchor. The first coupling member may be disposed proximate a first end of the anchor. The driver may be actuated such that the anchor rotates and drives the anchor at least partially into the location. The anchor may be driven into the location such that one or more of the plates of the anchor is disposed in the location (e.g., under the top surface of the location). The driver (e.g., a socket wrench) may be uncoupled from the first coupling member. In some implementations, each of anchors of the anchoring system may be driven into the location. In some implementations, one or more anchors residing in the location may be used or reused for the basketball assembly and thus may have previously been driven into the location.

The base 415 of the basketball assembly may be coupled to the anchors 430 via one or more fasteners. For example, the base 415 may be positioned above the anchors 430 such that fasteners 435 may be disposed at least partially in the openings 490 of the base and coupled to the anchors 430 In some implementations, the anchors 430 may be disposed at least partially in the opening(s) 490 of the base 415. The fasteners 435 may be coupled to the anchors via the openings 490 in the base 415.

The post 410 may be coupled to the base 415. The post may include a first end 411 and a second opposing end 412. The base may include a post opening 485. The second end 412 of the post 410 may be coupled to the post via the post opening 485. For example, the post opening 485 may include a threaded portion to couple with a threaded portion proximate the second end 412 of the post 410.

In some implementations, the post may include one or more sections, as illustrated. The sections may be coupled to each other (e.g., a first section may be coupled to a second section, which is coupled to the first section and the third section). The height of the basketball goal assembly may be adjustable by removing and/or adding sections to the post, in some implementations. In some implementations, a first end of a first section may be coupled to a base via a post opening.

The backboard 405 may be coupled to the post 410. As illustrated, the second end 412 of the post may be coupled to the backboard 405. Fastener(s) may be utilized to couple the backboard to the post. For example, fasteners may be disposed at least partially in openings proximate the second end of the post and at least partially in openings in the backboard (e.g., arms or boom of the backboard).

In some implementations, a user may remove the basketball goal after a period of time. For example, the basketball assembly may be installed for tournament play, weekend play, in a park, in a backyard, etc. To uninstall the basketball assembly, the base, post, and backboard may be removed in pieces or as a single unit from the location. The base, post, and backboard may be removed as a single unit by uncoupling the fasteners coupled to the anchors and removing the single unit from the location. In some implementations, the base, post and/or backboard may be uncoupled from each other by uncoupling fastener(s) coupling one or more of these components. The anchors may be removed from the location and/or left in the location (e.g., with a cap coupled to an anchor or without a cap coupled to an anchor). Since the anchors may be installed, in some implementations, such that the top surface of the anchor is proximate the top surface of the location, the anchors may not be uncoupled from the location (e.g., since with the anchors in this installation, the anchors may not pose a substantial trip hazard). By maintaining the anchors in the location, the basket ball goal assembly base, post, and backboard may be coupled to and/or uncoupled from the anchors based on user preferences (e.g., compliance with codes, such as park rules, homeowners association rules, etc.). Repeat installation ease may be maintained when the anchors are maintained in the location after use. In some implementations, the anchors may then be used to secure other objects, such as umbrellas, other sport goals, structures such as carports, etc.

In various implementations, the anchoring system may be utilized to secure nets, such as sporting nets (e.g., tennis nets, badminton nets, volleyball nets, and/or soccer goals). The nets may include a frame that includes posts. For example, a tennis net, badminton net, and/or volleyball net may include a net coupled proximate each end to a post. A soccer goal may include a frame with posts that are to be secured to a location and a net coupled to the posts. By utilizing anchors with nets, such as a soccer goal, a lightweight frame (e.g., when compared with unanchored soccer goal frames) may be utilized the anchoring system may secure the soccer goal in a location. Each post of the nets may be coupleable to a second coupling member of an anchor, in some implementations. For example, a post of the net may include an anchor coupling member, such as threading, that allows the anchor coupling member to be coupled to the second coupling member of the anchor of the anchoring system. A post may be indirectly coupled to an anchor, for example by using a connector, such as the connector described in FIG. 7A, in some implementations.

In some implementations, additional securing devices, such as wires (e.g., guide wires or other cross-bracing) to provide lateral stability, may not be used but rather the anchoring system may provide the lateral stability to satisfy stability criteria (e.g., lateral and/or vertical force that an anchor may be able to sustain without substantially deforming and/or without substantially changing a position of an anchor) for a use, such as volleyball nets. The removal of wires may increase the safety of the structure, such as a volleyball net. For example, during use, the guide wires of a volleyball net may be a trip hazard to players and/or spectators. Thus, providing lateral stability through anchor(s) may allow removal of the guide wires of a volleyball net, while providing appropriate lateral stability (e.g., such that the net does not fall down when a ball and/or player contacts the net) and/or may increase the safety of the application.

In some implementations, the nets may be secured to a location and may be removed, if desired. In tournament locations, sporting nets may be set up using the anchoring system and removed at the end of tournament play, for example. In locations such as parks and beaches, sporting nets may be set up for play and disassembled and removed (e.g., when packing up to go home, when inclement weather approaches, etc.).

The plate size and/or number of anchors may be based at least partially on the amount of lateral force the anchor is to be subject to in an application. For example, for a basketball ball goal, anchors with a plate that is approximately 4 inches may be utilized. For a volleyball net, anchors with a plate that is approximately 6 to approximately 8 inches may be utilized.

In some implementations, the anchoring system may be utilized to secure an umbrella. For example, the umbrella may include rib assembly (e.g., ribs and stretchers) coupled to a post. The covering (e.g., cloth and/or plastic) of the umbrella may be coupled to the ribs of the umbrella. The ribs of the umbrella may be coupled to stretchers that are coupled to a post of the umbrella. The post of the umbrella may be coupled to a location using an anchoring system. For example, the post may be coupled to the stretchers proximate a first end of the post and may be coupled to an anchor, during use, proximate an opposing second end. The second end may include a coupling member to couple with the second coupling member of the anchor of the anchoring system. Thus, the umbrella may be secured to a location temporarily or for a long period of time using the anchoring system. The use of the anchoring system with the umbrella may allow portability (e.g., when compared to umbrellas with weighted bases), ease of transport (e.g., since the anchors may be removed from a location and reused), flexibility, and/or increased stability (e.g., when compared to umbrellas with pointed stake like posts).

In some implementations, an umbrella retrofit kit may include an anchoring system with at least one anchor. The anchor may include a second coupling member adapted to couple to a coupling member of an existing weighted base umbrella. For example, weighted base patio umbrellas include a post with a threaded coupling member at an end opposed to the covering of the umbrella. The configuration of the second coupling member may be selected such that it engages with the threaded coupling member of the post. Thus, the anchor may be positioned in a location and then coupled to an existing umbrella via the second coupling member of the anchor. In some implementations, a plurality of anchors may be provided with a kit such that the user may select the anchor that couples with the existing umbrella.

In some implementations, an umbrella kit may include one or more umbrellas (e.g., umbrellas of the same or different sizes) and an anchoring system with one or more anchors.

In some implementations, the anchoring system may be utilized to secure flag. For example, a flag post may include one or more sections. The sections of the post may be coupleable to create a flag post of a predetermined height. For example, 3 segments may be utilized to create a 10 feet high flag pole. In some implementations, 1 segment of the post may be utilized to create a 5 feet high flag pole. The flag pole may include a first portion (e.g., proximate a first end) coupleable to a flag (e.g., flag coupling members such as nylon flag snaps and/or metal rings). The flag pole may include a second opposing end. An anchor coupling member disposed proximate the second opposing end of the flag pole may be coupleable to a second coupling member of an anchor of the anchoring system. Thus, the anchor may be positioning at a location and then the flag pole (e.g., with a flag) may be coupled to the anchor. Then the flag pole may be removed and the anchor may be removed, when the flag is to be taken down and/or removed. For example, when tailgating, a secure and removable flag may be provided by using the anchoring system.

In some implementations, the anchoring system may be utilized to secure a sign. For example, one or more anchors may be disposed at least partially in a ground and one or more posts may be coupled to the one or more anchors. A sign may be coupled to the post(s). For example, the post may include openings through which a fastener (e.g., spring clip, pins, and/or zip ties) may be disposed and through which the post may be coupled to the sign (e.g., via openings in the sign). The sign may be removed, changed, and/or replaced, as appropriate and the same anchors and/or posts may be utilized, in some implementations.

In some implementations, the anchoring system may be utilized to secure fencing. For example, fencing may be installed at construction sites, events, and/or other locations. The anchors may be disposed in the ground and coupled to posts. The posts may be coupled to fencing material such as chain link and/or other fencing material. For example, the posts may include openings. A fastener may be utilized to couple a wire of a fencing material (e.g., chicken wire and/or chain link) to post(s) via openings in the post(s).

In some implementations, the anchoring system may be utilized to secure a zipline. For example, anchors may be disposed in a location and posts may be secured to the anchors. A zipline may be coupled to the posts. For example, a wire of a zipline may be tied to posts via openings in the posts. In some implementations, a wire of a zipline may be coupled to posts via a fastener. Thus, a zipline may be secured in a location that may not have suitable trees. The zipline and/or posts may be removed (e.g., when zipline use is temporary, for maintenance, and/or for replacement) and the anchor may be allowed to remain in a location or removed, in some implementations.

Figure 5A:
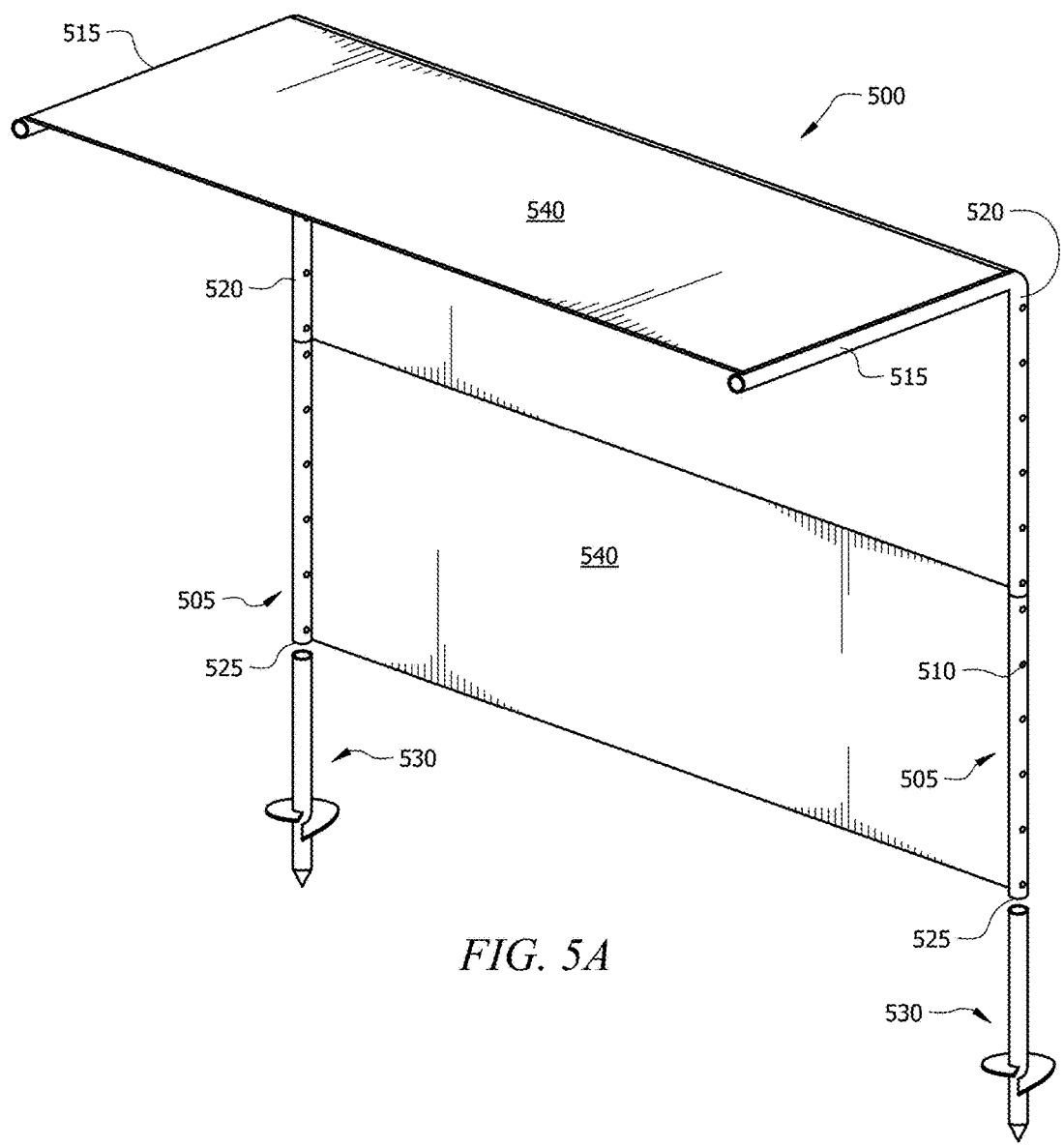
FIG. 5A illustrates an implementation of an example canopy.

In some implementations, the anchoring system may be utilized to secure a canopy. The canopy may be a cantilevered canopy and/or a canopy secured by four or more posts. FIG. 5A illustrates an implementation of an example cantilever canopy 500. As illustrated, the canopy 500 includes two posts 505. Each post includes a first portion 510 coupled to a second portion 515. The first portion may be perpendicular or at an angle (e.g., between approximately 0 and 180 degrees) to the second portion, in some implementations. In some implementations, the first portion and/or the second portion may include one or more segments (e.g., 4 foot high cylindrical segments)

The first portion 510 of the post may include a first end 520 coupled to a second portion 515 and a second end 525 to which an anchor 530 may be coupled. The second end 525 may include an anchor coupling member to which the second coupling member of the anchor may be coupled. Thus, the anchor of the anchoring system may be positioned (e.g., in the ground of a location) and then the second end 525 of the post(s) may be coupled to the anchor (e.g., via the anchor coupling member of the post and the second coupling member of the anchor).

A covering 540 (e.g., cloth, mesh, and/or plastic) may be coupled to the posts of the canopy. For example, the covering 540 may include a sleeve through which the posts may be at least partially disposed. The posts may include covering coupling members, such as rings and/or hooks to which the covering (e.g., coupling members of the canopy) may be coupled. The covering may be coupled to the first portion 510, the second portion 515, and/or portions thereof.

Figure 5B:
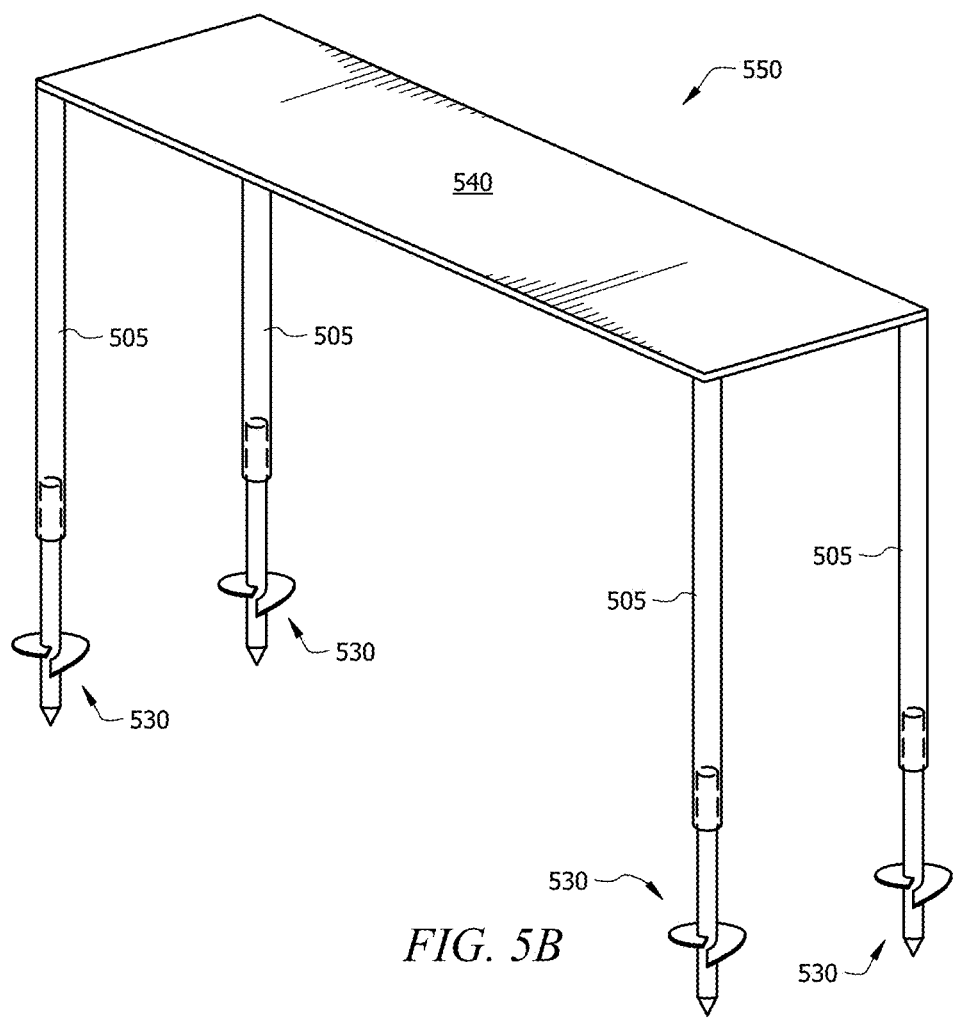
FIG. 5B illustrates an implementation of an example shelter.

In some implementations, the canopy may include more than two posts. FIG. 5B illustrates an implementation of an example canopy 550 that includes four posts 505. The posts 505 of the canopy may include one or more segments that are coupleable together. Anchors 530 of the anchoring system may couple to an anchoring coupling member proximate a first end of the post 530 and secure the posts to a location, when the anchors are appropriately positioned (e.g., such that the plates are disposed below the surface of the location). The covering of the canopy may be coupled (e.g., removably and/or for a specified or unspecified period of time) to the posts.

In some implementations, the posts of the canopy may include an anchoring coupling member on an inner surface of the post and the second coupling member of the anchor may be on an outer surface, such that an outer surface of the post and an outer surface of at least a portion of the shaft of the anchor may be approximately planar. In some implementations, the anchor coupling member of the post may include a protrusion receivable by the second coupling member of the anchor (e.g., where the second coupling member of the anchor may be disposed on an inner surface of the anchor), and when the post and the anchor are coupled the outer surface of the post and the outer surface of at least a portion of the shaft of the anchor may be approximately planar. When the outer surface of at least a portion of the post and at least a portion of the outer surface of the anchor are planar, safety may be increased (e.g., in playground installations edges on which children may get hurt may be reduced and/or trip hazards may be reduced, since concrete is not used, hard surfaces injuries proximate play areas may be minimized).

Although FIGS. 5A and 5B describe various implementations of canopies, other implementations may be utilized. For example, the posts may include approximately planar sections or curved sections. When the posts are installed, the posts may be include portions that are perpendicular, parallel, or slanted relative to the axis parallel to the top surface of the location. In some implementations, more than four posts may be utilized. One or more posts may be coupled to each other (e.g., using cross-bracing), in some implementations.

In some implementations, the canopy may be a screen. For example, the covering of the canopy may be a mesh screen. The screen may be secured to a location using the posts and the anchoring system.

In various implementations, the anchoring system may be utilized to secure a shelter. For example, a shelter may include a covering and one or more posts. The covering may be coupled to one or more of the posts. The covering may be coupled to each post to create, for example, a temporary roof. The covering may be coupled proximate an end of a post such that an object similar to the canopy in FIG. 5B is created. In some implementations, the covering may create a roof and one or more sides (e.g., where the covering extends approximately to the top surface of the location and/or extends along a height of a post).

The posts may include one or more segments coupleable to each other. For example, the height of the post may be adjusted based on the number of segments coupled to each other. A post may include an anchoring coupling member proximate an end of the post. In some implementations, the anchor coupling member may be a similar coupling member to the coupling member utilized to couple segments to each other. The anchor coupling member and a second coupling member of an anchor may be engaged to secure a post to an anchor. The post may include an opposing end to which a covering may be coupled, in some implementations. The shelter may allow long-term and/or temporary shelter to be provided (e.g., for disaster recovery, for entertainment events, for temporary work locations, and/or other appropriate events). Thus, to install a shelter, one or more anchors may be positioned in a location (e.g., using a template to facilitate determining the appropriate positioning of the anchors or not using a template). The user may couple a driver to a first coupling member of an anchor and actuate the driver to cause the anchor to be driven into the ground at a location, for example. Once the plate of the anchor is disposed below the top surface of the anchor and/or when the flange of the anchor is disposed proximate the top surface of the location, the driver may be disengaged. One or more posts may be coupled to the second coupling member of the anchor (e.g., via an anchor coupling member of the post(s)). The covering may be coupled to the posts. In some implementations, the covering may be coupled to the posts prior to coupling the posts to the anchors. When the shelter is to be removed, the process may be reversed. For example, the posts may be uncoupled from the anchors and the anchors may be removed from the ground. In some implementations, since the anchors are reusable, the configuration of the shelter may be modified using the same anchors (e.g., positioned in the location). For example, one or more posts may be removed and new shelter posts may be attached (e.g., if damage occurs to a post, if a larger or smaller shelter is to be created, and/or if a different shaped shelter is to be created).

In some implementations, the shelter may be a tent. For example, the posts of the shelter may be tent poles. The tent may be secured to and/or removed from a location using the anchors and a driver.

In some implementations, the shelter may be a carport. For example, a covering may be coupled such that a roof under which cars may be parked is created. The covering may extend at least partially along a height of a post, in some implementations.

In various implementations, the anchoring system may include fastener(s). The fastener may be selected to engage with the second coupling member, for example, to facilitate securing an object to a location with the anchoring system. For example, the anchoring system may include a plate with openings in which the anchors may be at least partially disposed. An object (e.g., a post of an object) may be coupled to the plate and the anchors may be coupled to the plate via fastener(s). A fastener may couple with a second coupling member of the anchor and retain the plate to the anchor and thus secure the object via the anchor. Washer(s) may be disposed between the fastener head and the plate and/or the plate and the anchor (e.g., the flange of the anchor), in some implementations.

Figure 6:
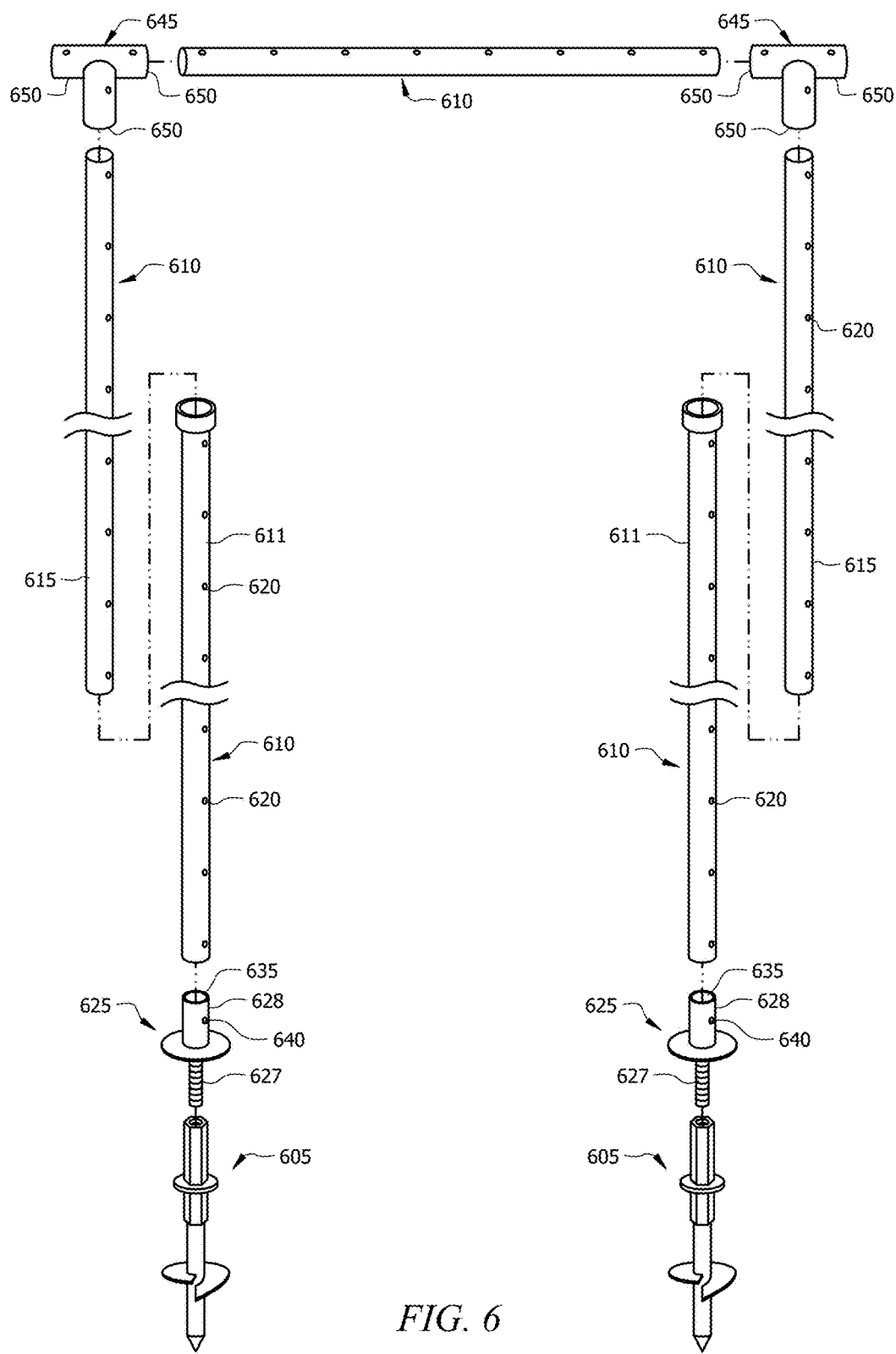
FIG. 6 illustrates an implementation of an example multi-post system.

In some implementations, the anchor may be utilized with a multi-post system. The multi-post system may allow the anchor(s), post(s), and/or connectors to be utilized to create a frame for a variety of uses such as, sporting goals and/or nets, canopies, shelters, tents, etc. FIG. 6 illustrates an exploded view of an implementation of a multi-post system application 600. FIG. 7A illustrates an implementation of an example portion 700 of a multi-post system. FIG. 7B illustrates an exploded view of the implementation of the example portion 701 of the multi-post system, illustrated in FIG. 7A. As illustrated, the multi-post system includes one or more anchors 605 and one or more posts 610. The anchor may be similar to the anchors described in FIGS. 1A-2D, in some implementations. The post(s) 610 may be couplable to each other. For example, a first post 611 may be capable of receiving at least a portion of a second post 615.

A post 610 may include a plurality of openings 620 disposed along at least a portion of the length of the post. The openings may be disposed in a regular or irregular pattern along a length of the openings. The openings may be disposed on at least two opposing sides of a post such that a fastener may be at least partially disposed through openings in the two opposing sides. The openings 620 may be utilized to secure a first post 611 and a second post 615. For example, a fastener (not shown) may be disposed at least partially in at least one opening of the first post 611 and at least one opening of the second post 615 to couple the first post and the second post. The openings may be utilized to secure objects, such as canopies, tents, sporting goals, sporting nets (e.g., volleyball net), etc.

In some implementations, an outer size (e.g., diameter) of a second post may be less than an inner size (e.g., diameter) of a first post. For example, the first post may include an inner diameter of approximately 48 mm and the second post may include a diameter of approximately 45 mm. Thus, a second post may be at least partially disposed in the first post. Thus the height of the first post and the second post when coupled may be based on the amount of the second post disposed in the first post. For example, since the first post and the second post include a plurality of openings disposed along a length of the posts, and since the first post and the second post may be coupled by disposing a fastener at least partially through at least one opening in the first post and at least one opening in the second post, the height of the coupled first post and second post may be based on which holes in each post are coupled using the fastener.

In some implementations, the multi-post system 600 may include a first connector 625 to couple a post 610 and an anchor 605. As illustrated in FIGS. 7A and 7B, the connector 605 may couple at a first end 627 to an anchor 605 and may couple at a second end 628 to a post 615. The post may include a first post coupling member 705 proximate the first end 627 of the first connector 625 and a second post coupling member 710 proximate the second end 628 of the first connector. The first post coupling member 705 of the first connector 625 may engage with the second coupling member 715 of the anchor 605. The second post coupling member 710 of the first connector 625 may couple with a post, in some implementations.

The first post coupling member 705 and/or the second post coupling member 710 may be any appropriate coupling member, such as threads, bolt heads, recesses, protrusions, openings, etc. As illustrated, the first post coupling member 705 may include threads 630 adapted to at least partially couple with the threads 720 in a second coupling member 715 of an anchor 605. The second post coupling member 710 may include a recess 635 in which at least a portion of a post 610 may be disposed. For example, a length and a width of the second post coupling member 710 may be greater than a length and a width of an end of a post such that at least a portion of the end of the post may be disposed in the recess of the first connector.

The recess 635 of the first connector 625 may include one or more openings 640. A fastener 725 may be disposed at least partially in at least one of the openings 640 of the first connector 625 and at least partially in at least one of the openings 620 of a post 610 to couple the first connector and the post.

In some implementations, the multi-post system 600 may include a second connector 645. The second connector 645 may be utilized to couple two or more posts 610. The second connector 645 may include at least two first openings 650 and at least a portion of a post 610 may be disposed in first openings. The first opening may be create an orifice such that at least a portion of a post 610 may be disposed at least partially or through the sleeve. The first opening 650 may be coupled to an end of the sleeve such that a post may not be disposed through the sleeve, in some implementations. The second connector 645 may be a sleeve, in some implementations.

A cross-sectional shape of a second connector 645 may be circular, oval, hexagonal, and/or any other appropriate regular or irregular shape. For example, the second connector may have a similar cross-sectional shape to a cross-sectional shape of a post. The second connector may have a shape to facilitate formation of a frame in a shape for a particular application. For example, to form a canopy, the second connector may have a shape similar to an "L" or a "T". The second connector may have a curved shape (e.g., to create a curved roof canopy).

Although FIGS. 6-7B illustrate implementations of a multi-post system, other implementations may be utilized as appropriate. For example, the anchor may include a double plate anchor. The second post may include at least a portion capable of receiving at least a portion of a first post. Connectors may not be utilized in some implementations of the multi-post system. In some implementations, the post may directly couple with an object (e.g., the post may include a coupling member to couple with a second coupling member of an anchor) and/or indirectly couple with an object (e.g., the post may couple with an anchor via a first connector. In some implementations, a second connector may be utilized to couple posts in a linear and/or nonlinear manner. For example, a second connector may be a linear sleeve. The ends of two posts may be disposed in opposing openings of the sleeve such that the posts are coupled such that they reside in a plane.

During use of the multi-post system, the anchor may be driven into the ground (e.g., earth and/or concrete). For example, a user may couple a driver, such as a socket wrench, to a first coupling member of the anchor and drive the anchor at least partially into the ground. In some implementations, the anchor may be driven into the ground such that a top surface of an anchor is approximately level with and/or below a top surface of a ground. Each anchor to be utilized to provide stability to the multi-post system may be driven into the ground in similar or different manners (e.g., one anchor may be driven into concrete and three may be driven into earth).

A first connector may be coupled to each anchor. For example, a first post coupling member may be coupled with a second coupling member of an anchor. The first coupling member of the first connector and the second coupling member of the anchor may engage to couple the first connector and the anchor.

A post may be coupled to each first connector. For example, an end of the post may be disposed at least partially in a recess of the first connector. A fastener may be disposed at least partially in opening(s) of the post and opening(s) of the first connector. The fastener may couple the post and a first connector.

The post(s) may then be coupled (e.g., fasteners in openings in the posts and/or indirectly via second connectors) to each other. The post(s) may be coupled to form a frame, in some implementations. For example, the posts may be coupled to form a frame to create a canopy in a custom size (e.g., since the number of posts coupled together may be selected based on height criteria for an application) and/or configuration. The canopy may be coupled to the posts via the openings in the posts (e.g., the canopy may include openings such as grommets and spring clips or other fasteners may couple the openings in the canopy and openings in the post). The posts may be coupled together to form a frame for a volleyball net. The anchors may be able to provide lateral strength such that guide wires and/or other cross-bracing may not be utilized in the volleyball net frame. Posts may be coupled to form a long pole suitable for a flag. The posts may be coupled together to form a frame a variety of shapes and/or sizes.

In some implementations, the frame may be configured prior to coupling the posts of the frame to connectors and/or anchors.

The multi-post system may also be disassembled and/or partially disassembled. Disassembling the multi-post system may allow more compact storage (e.g., when compared with storage of the assembled frame) and/or transportation. Thus, for example, a set of multi-post systems may be utilized to create temporary sporting tournament courts, such as volleyball and/or soccer. After the tournament the multi-post systems may be at least partially disassembled. The anchor may be left in position, since the anchor may be below or flush with a top surface of a ground, and/or removed. The multi-post systems may then be transported to the next tournament for use. In some implementations, the multi-post system may facilitate the creation of temporary structures for repeated use. For example, a structure such as a canopy may be assembled for use for several weekends and removed during the week to ease pedestrian and/or other traffic flow during the week (e.g., such as canopies for tailgating on campuses, volleyball nets in parks for tournament and/or practices). Since the anchor may remain in position (e.g., since tripping on the anchor may be minimized by disposing the anchor approximately even with or below a top surface of the ground), the posts may be more easily assembled and/or disassembled for repeat use. In some implementations, since one or more of the posts may be interchangeable, damaged posts may be replaced with other posts, changing the structure sizes and/or shapes of the frame created by the posts may be facilitated, and/or installation and/or disassembly may be simplified since the same installation and/or disassembly techniques may be utilized for each post.

In some implementations, the multi-post system may be a kit. The kit may include one or more anchors, one or more posts, one or more connectors (e.g., first connectors and/or second connectors), and/or one or more fasteners. The kit may include a driver.

For example, a kit for canopy may include posts, connectors (first connectors and/or second connectors), one or more approximately 12 inch high anchors, and/or one or more canopy coverings. The posts may include first posts and/or second posts. The kit may include second connectors in one or more shapes. For example, the kit may include 90 degree elbow, curved, and/or "t" shaped second connectors. The posts and the second connectors may be selected by a user to create a frame based on the user's specifications. In some implementations, when a kit includes a variety of connectors and a plurality of posts, a user may be able to utilize the kit to create frames in a variety of shapes and/or sizes for a variety of uses.

In some implementations, a kit for a volleyball net may include anchors (e.g., at least partially aluminum and/or approximately 12 inches in height), posts, and a volleyball net. The posts may be coupled to form a net frame that satisfies criteria (e.g., volleyball association criteria).

In some implementations, a kit for a carport may include anchors (e.g., at least partially galvanized steel and/or anchors with two plates), posts, connectors (e.g., first and/or second connectors), and/or covering. In some implementations, the kit may include connectors such that a gabled roof frame may be created.

In some implementations, the anchor may be utilized with existing products. For example, one or more couplers may be utilized with an anchor. The coupler may include a first member to couple with the second coupling member of the anchor and a second member to couple with the existing product. For example, a tent may include a grommet. The coupler may include a second member that is capable of coupling with a grommet (e.g., directly and/or indirectly). An existing product such as a soccer goal may be coupled to an anchor via a coupler. For example, a coupler may couple to hollow tubing and/or an exterior surface of a frame of the goal. For example, the coupler may include a first portion at least partially circumscribe a lower portion of the frame and a second portion that couples with the second coupling member of the anchor.

In some implementations, the anchor may be indirectly coupled to an object to secure the object to a location. For example, objects such as sports goals, volleyball nets, tents, etc. may not include a post that is capable of coupling to a second coupling member of an anchor. However, the objects may be indirectly coupled to the anchor using an adapter. In some implementations, the object may be indirectly coupled to an anchor via a ring adapter. The ring adapter may be coupled to the anchor and an object may be coupled to the ring adapter to secure the object to a location.

Figure 8A:
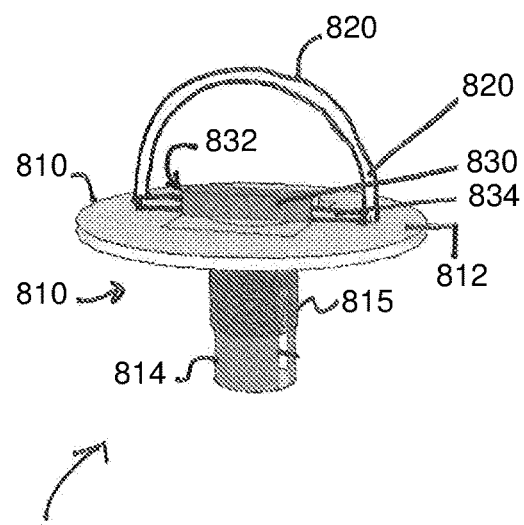
FIG. 8A illustrates an implementation of an example ring adapter.
Figure 8B:
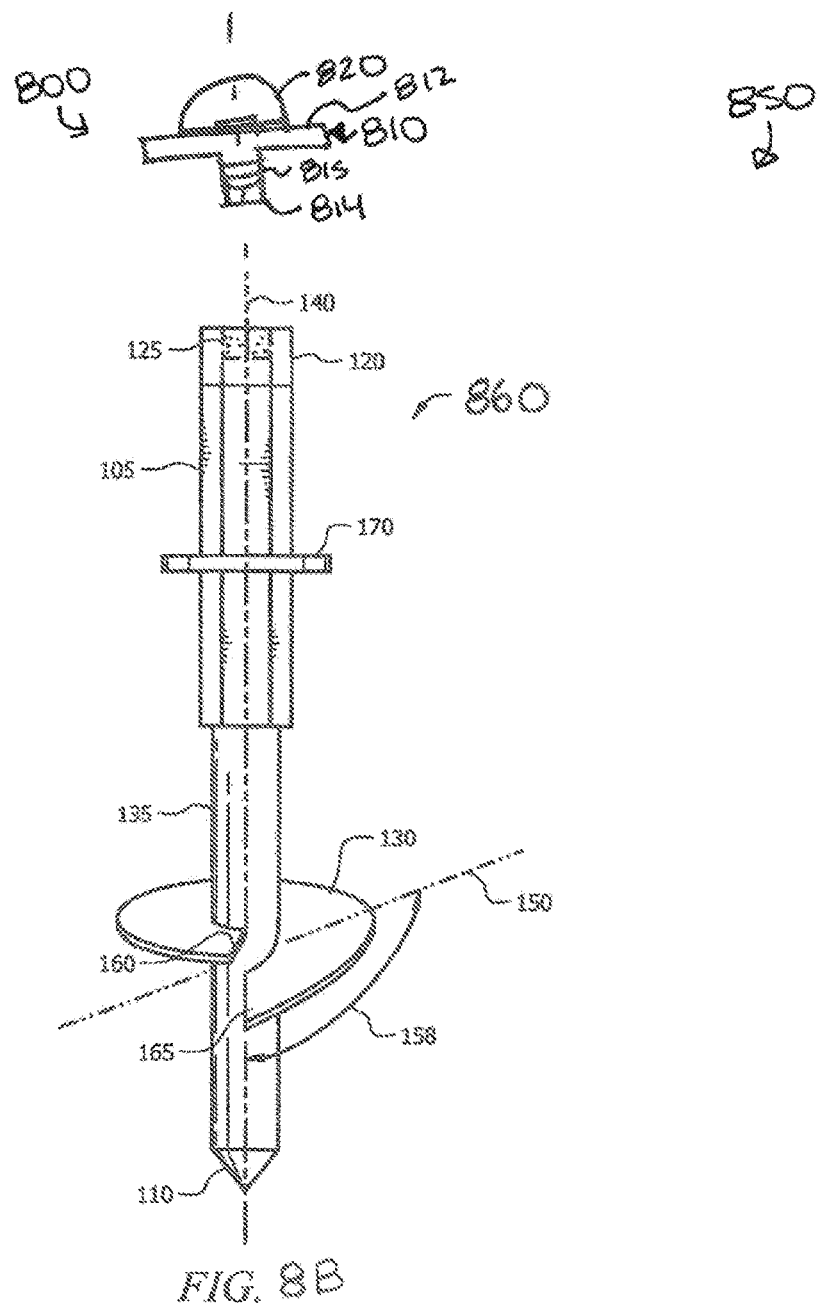
FIG. 8B illustrates an implementation of an example anchoring system that includes the example ring adapter illustrated in FIG. 8A.

FIG. 8A illustrates an implementation of an example ring adapter 800. FIG. 8B illustrates an implementation of an example anchoring system 850 that includes a ring adapter. As illustrated, the ring adapter 800 includes a body 810 and a ring 820. The object may be coupled to an anchor via the ring 820 of the ring adapter 800. The ring 820 may be coupled to the body 810 of the ring adapter 800. The ring 820 may be coupled to the body 810 in any appropriate manner, such as by affixing, bonding, linking, and/or otherwise coupling the ring to the body. For example, the body 810 may include a member 830 (e.g., hinge cover) with an opening 832 through the member. As illustrated, the ring 820 may be disposed at least partially in the opening 832 of the member 830 of the body 810. The ring 820 may be a D-ring, as illustrated and include a hinge 834 that allows the hinge to move (e.g., so that the hinge can fold).

The body 810 may have any appropriate shape. For example, the body 810 may include a plate 812 with a protrusion 814 (e.g., cylindrical, tapered, and/or any other appropriate shape). The plate may include at least one planar portion. The plate 812 may include a first surface (e.g., a top surface) and a second opposing surface (e.g., bottom surface). The ring 820 may be coupled to the first surface of the plate, as illustrated. The plate may be a 70 mm outer diameter plate. The protrusion 814 may be coupled to the second surface of the plate 812. The protrusion 814 may include a bolt part. The bolt part of protrusion 814 may include threads (e.g., 5/8-11 UNC) to fit anchors. The protrusion 814 may be approximately 2 inches long.

The ring, the member 830 (e.g., hinge cover), the hinge, the plate, and/or protrusion 814 may be and/or include finish that is galvanized or nickel plated.

The ring may have any appropriate shape. For example, the ring may be circular, partially circular, D-shaped, C-shaped, etc. The body of the ring adapter may include an opening (e.g., loop and/or channel) through which the ring is at least partially disposed, in some implementations. In some implementations, the ring may be approximately 60 mm in width.

The body 810 may include an adapter coupling member 815 to couple the ring adapter to an anchor 850. The adapter coupling 815 member may include any appropriate coupling member, such as a threaded portion, adapted to couple with a second coupling member of an anchor. The adapter coupling member 815 may be a portion of the protrusion 814, in some implementations. As illustrated, the adapter coupling member 815 may include a threaded portion of the protrusion 814. The diameter of the adapter coupling member 815 and/or at least a portion of the protrusion 814 may be less than a diameter of the second coupling member of the anchor 860. Thus, at least a portion of the protrusion and/or adapter coupling member may be disposed at least partially in the second coupling member 125 of the anchor 860.

To secure an object (e.g., a volleyball net) to a location, an indirect coupling process via the ring adapter may be utilized. Based on the object (e.g., stability criteria for the use and/or object), a first number of anchors may be selected. Each of the anchors may be driven into a location. Anchors, such as anchor 860 may be utilized. A second end 110 of an anchor 860 may be disposed at a location. A driver may be coupled to the first coupling member 120 of the anchor 860. As illustrated, the first coupling member 120 and the second coupling member may be disposed proximate the first end 105 of the anchor 860. The first coupling member may include a hex-shape and the driver may be a socket wrench (e.g., a manually operated socket wrench and/or power operated socket wrench such as a socket attached to an drill), in some implementations.

The driver may be actuated and the first coupling member 120 and thus the anchor 860 may be rotated. Rotating the anchor may drive the anchor 860 into a location, such as a ground, an asphalt surface, a wooden surface, etc. The plate 130 of the anchor 860 may partially circumscribe the shaft 135 of the anchor and/or may include a slanted portion. The slanted portion may be at an angle 158 (e.g., the angle between axis 150, which is parallel to the slant of the slanted portion and the axis 140) relative to an axis 140 parallel to the shaft 135 of the anchor 860.

The anchor may be driven into the ground such that one or more plates of the anchor are disposed in the location. For example, the anchor 860 may be driven such that the plate 130 may be disposed below a top surface of a location. In some implementations, the anchor 860 may be driven such that the protrusion(s) 170 on the shaft of the anchor 860 are disposed proximate the top surface of the location. For example, the anchor may be driven into the ground such that top surface of the protrusion(s) 170 may be location proximate (e.g., above and/or below) the top surface of the ground.

The driver may be uncoupled from the first coupling member 120 of the anchor 860. The ring adapter 800 may be coupled to the anchor 860. For example, the protrusion 814 of the body 810 of the ring adapter 800 may be inserted into an opening in the first end 105 of the anchor 860 to engage the second coupling member 120 of the anchor. The adapter coupling member 815 may couple with the second coupling member 125 of the anchor. For example, the threaded portion of the adapter coupling member 815 may engage a threaded portion of the second coupling member of the anchor 860.

The object may be secured to the ring 820 of the ring adapter 800 to secure the object indirectly to the anchor. For example, a rope, wire, and/or other connector of the object may be coupled (e.g., tied, secured, affixed, etc.) to the ring 820. Thus, the object may be secured to a location by indirectly coupling the object to the anchor via the ring adapter.

In some implementations, the anchoring system may include a frame to secure objects to a location. For example, objects such as sign(s), umbrella(s), foundation, carport(s), house(s), auxiliary dwelling unit(s), housing unit(s), playhouse(s), storage unit(s), and/or flag post(s) may be secured to the frame of the anchoring system to secure the object to a location.

Figure 9A:
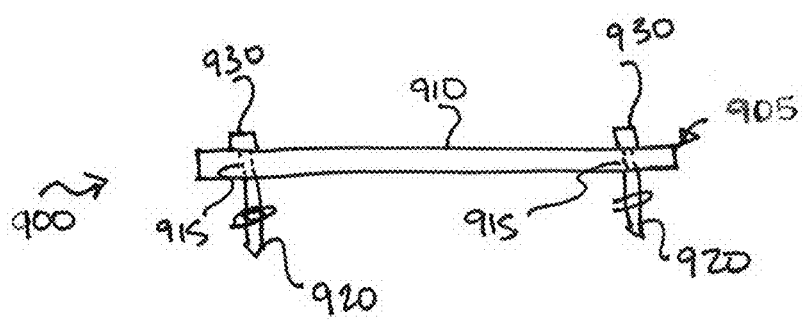
FIG. 9A illustrates a side view of an implementation of an example anchoring system 900.
Figure 9B:
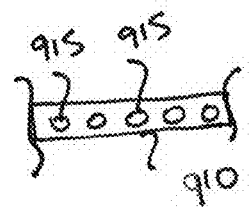
FIG. 9B illustrates a top view of an implementation of a portion of the example lateral member illustrated in FIG. 9A.
Figure 9C:
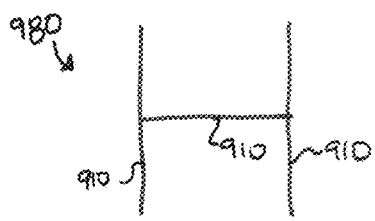
FIG. 9C illustrates a bottom view of an implementation of an example frame.
Figure 9D:
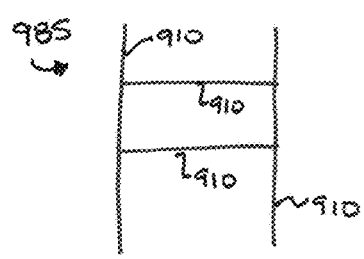
FIG. 9D illustrates a bottom view of an implementation of an example frame.

FIG. 9A illustrates a side view of an implementation of an example anchoring system 900 with a frame. FIG. 9B illustrates a top view of an implementation of a portion of the example lateral member illustrated in FIG. 9A. The frame 905 of the anchoring system 900 may include one or more lateral members 910. The lateral member(s) of the frame 905 may be oriented in any appropriate shape. For example, a frame may include lateral member(s) that have a shape similar to and/or when coupled together have a shape similar to an X, H, L, I, triangle, circle, oval, rectangle, and/or any other appropriate irregular and/or regular shape. FIG. 9C illustrates a bottom view of an implementation of a frame 980. As illustrated, the lateral members 910 are oriented such that at least two lateral members are coupled together via one or more other lateral members. As illustrated, the lateral members 910 may have a shape similar to an H. As illustrated in FIG. 9D illustrates a bottom view of an implementation of a frame 985 in which at least two lateral members are coupled via two other lateral members.

The lateral member(s) 910 may include one or more openings 915. In some implementations, a lateral member 910 may include a plurality of openings 915 disposed along a length of the lateral member. For example, the lateral member may include Unistrut, commercially available from Atkore International (Harvey, Illinois, USA).

The openings 915 of the lateral member 910 may receive anchor(s) 920, fastener(s) 930, and/or portions thereof. For example, the lateral member may include at least two openings 915 that are disposed in opposing ends of the lateral member 910. Each anchors 920 may be disposed at least partially in an opening 915 of the lateral member. A fastener 930 (e.g., bolt, screw, and/or other types of fasteners) may be disposed at least partially in the opening 915 of the lateral member. The fastener 930 may engage and couple with the second coupling member of the anchor. Thus the fastener may couple the anchor and the frame. By coupling the frame and the anchor, the frame may be secured in a location (e.g., when the anchor is disposed in a location).

For example, to secure a frame to a location, one or more anchors may be secured to a location. As illustrated in FIG. 9A, two anchors, such as the described anchors, may be utilized to secure a frame to a location. Each anchor 920 may be secured to a location. For example, a second end of an anchor 920 may be disposed at a location. A driver may be coupled to the first coupling member of the anchor 920. The first coupling member may include a hex-shape and the driver may be a socket wrench (e.g., a manually operated socket wrench and/or power operated socket wrench such as a socket attached to an drill), in some implementations.

The driver may be actuated and the first coupling member and thus the anchor 920 may be rotated. Rotating the anchor 920 may drive the anchor into a location, such as a ground, an asphalt surface, a wooden surface, etc. The anchor 920 may be driven into the ground such that one or more plates of the anchor are disposed in the location. For example, the anchor 920 may be driven such that the plate may be disposed below a top surface of a location and/or protrusions on the shaft of the anchor may be disposed proximate a top surface of a location. The driver may be uncoupled from the first coupling member of the anchor. An opening of the lateral member may be aligned with each of the anchors 920. A first end of the anchor 920 may be disposed at least partially in the opening of the lateral member. In some implementations, the first end of the anchor 920 may not be disposed at least partially in the opening of the later member of the frame. A fastener may be coupled to the second coupling member of each of the anchors to secure the anchor to the frame. When the fastener is secured to the anchor at least a portion of the fastener may be disposed in the opening of the lateral member of the frame.

In some implementations, the anchor may be disposed in an opening of the lateral member and/or the fastener may be coupled to the anchor prior to disposing anchor in the location. In some implementation, a user may mark the position of one or more of the openings in the lateral member in a location prior to disposing at least one of the anchors in the location.

In some implementations, the frame may include lateral members and/or include other members coupled to the lateral members. For example, a frame with lateral members may be utilized to secure a structure, such as housing, storage unit, auxiliary dwelling structure, etc. The anchor system with the frame may act as and/or act in conjunction with a foundation of the structure. For example, anchor(s) may be secured to a location, such as the ground and the frame may be coupled to the anchors. The structure may be secured to the frame, which secures the structure indirectly to the anchors. Thus, the structure may be secured to a location via the anchors. In some implementations, a structure, such as storage shed and/or playhouse may be secured in a location and then removed from the location (e.g., moved to a different location and/or removed from the location). When the structure is removed, the anchors may be repurposed for securing another object to the location (e.g., umbrella, canopy, new structure, etc.) and/or removed from the location. For example, to remove the anchors from a location, the anchors may be gripped (e.g., by hand and/or using a tool) via the protrusions and/or the shaft of the anchor and pulled from the location. In some implementations, a driver may be coupled to the first coupling member of the anchor and the driver may be actuated to rotate the anchor (e.g., in a reverse direction from then direction used to drive the anchor) and remove the anchor at least partially from the ground.

In some implementations, the frame may include one or more longitudinal member coupled to the lateral member(s). The longitudinal member(s) may include the same or different material as the lateral member(s). For example, the longitudinal member may include a plurality of openings disposed (e.g., evenly and/or unevenly) across a length of the longitudinal member.

Figure 10B:
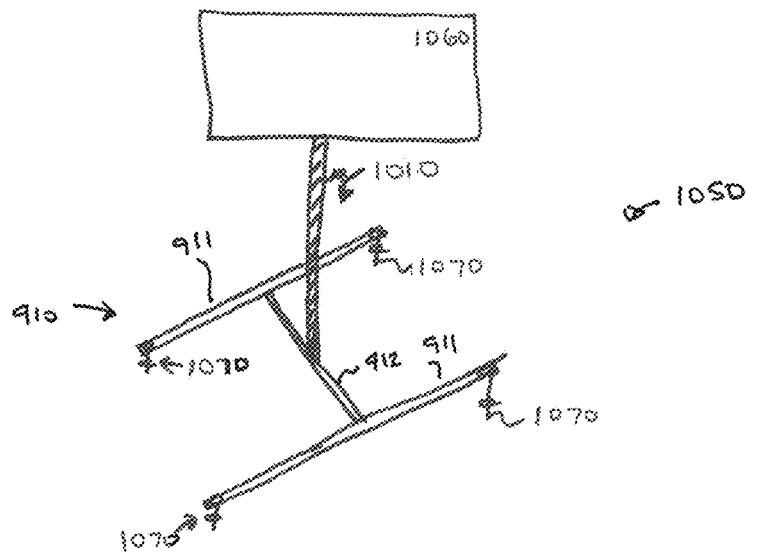
FIG. 10B illustrates an implementation of an example frame coupled to a sign.
Figure 10A:
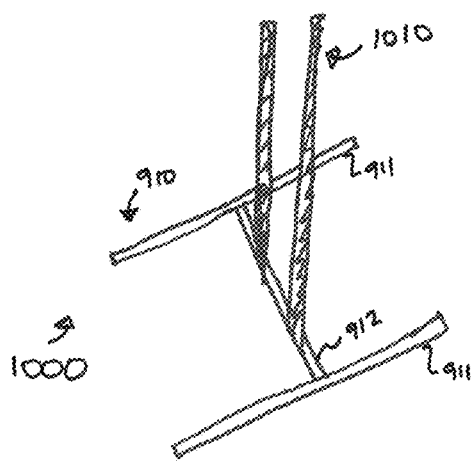
FIG. 10A illustrates an implementation of an example frame.

FIG. 10A illustrates an implementation of example frame 1000. The frame 1000 includes lateral members 910 and longitudinal members 1010. The lateral members 910 may include a first set of lateral members 911 (e.g., one or more lateral members disposed parallel or not parallel to each other) and a second set of intersecting lateral member(s) 912 (e.g., one or more intersecting lateral members). As illustrated, the first set of lateral members 911 may include two parallel lateral members and the second set of intersecting members 912 may include a lateral member than couples to the two parallel lateral members. The intersecting lateral member may be approximately parallel and/or not parallel to the lateral member(s).

One or more longitudinal members 1010 may be coupled to one or more latitudinal members 910. As illustrated, the longitudinal member(s) 1010 may be coupled to the intersecting lateral member(s) 912. In some implementations, the longitudinal member(s) may be coupled to the first set of lateral members.

In some implementations, the frame may include two or more longitudinal members, as illustrated, and the longitudinal members m may be coupled to each other and/or not coupled to each other. Coupling the longitudinal members with an intersecting longitudinal member, for example, may provide cross-support to the frame.

Figure 9E:
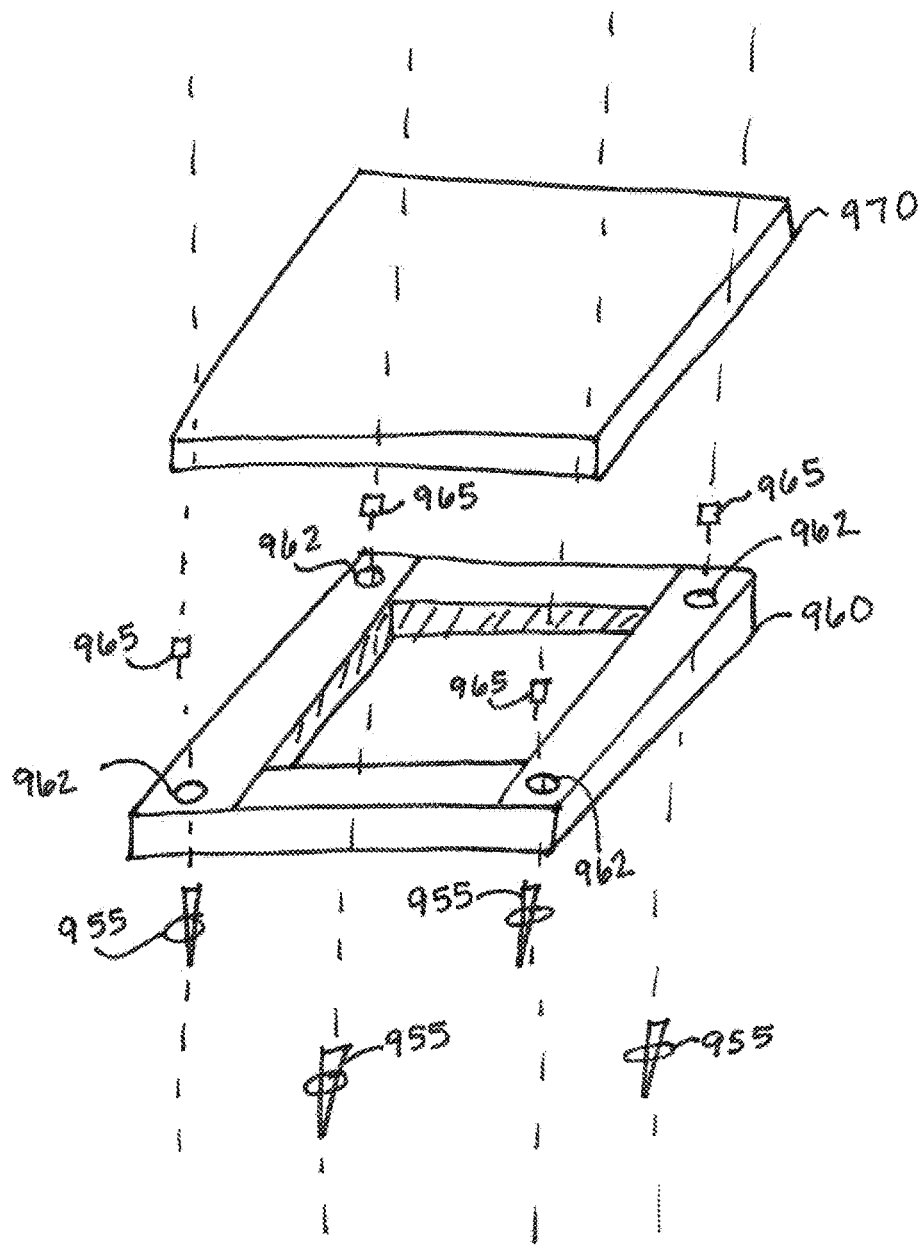
FIG. 9E illustrates an exploded view of a foundation system.

Objects may be coupled to the longitudinal member(s), in some implementations. For example, the longitudinal member(s) may include openings adapted to receive fasteners. The fasteners may couple at least a portion of the object to the frame via opening(s) in the longitudinal member(s). For example, an elevated foundation may be provided for a structure by securing the structure to the longitudinal members of the frame. In some implementations, the frame may act as a pier or support a pier in a foundation system FIG. 9E illustrates an implementation of an exploded view of an example foundation system 950. As illustrated, the foundation system 950 may include anchors 955, a frame 960, fasteners 965, and a subfloor 970. The anchors 955 may include any appropriate anchor and/or one or more of the features of the anchors, such as the anchors illustrated in FIGS. 1A-11B. The anchors may include non-linking anchors, linking anchors, and/or single linking anchors (e.g., that are not linked to another anchor). The frame 960 may include any appropriate size and/or shape. The frame may include solid members, perforated members, flexible members, rigid members, other appropriate members, and/or combinations thereof. The subfloor may include any appropriate size and/or shape. The subfloor may be similar in size and/or shape to the frame, in some implementations. The subfloor may allow a structure to be coupled to the subfloor and/or provide a bottom surface for a structure. The frame and/or subfloor may include openings (e.g., predrilled, preformed, and/or created by driving a fastener through the frame and/or subfloor) to receive fasteners. The fasteners may include any appropriate fastener such as bolts, washers, screws, adapters, other appropriate fasteners and/or any appropriate combination thereof. The fasteners may be utilized to couple the anchor and the frame; the frame and the subfloor; the anchor, the frame, and the subfloor; the subfloor and a structure, and/or combinations thereof The anchors 955 may be driven into the ground in a manner similar to other applications. For example, a driver may be coupled to the anchor and the anchor driven into the ground such that a top surface of the anchor is proximate a surface of the ground (e.g., and the flange of the anchor is disposed below a top surface of the ground). The driver may then be uncoupled from the anchor. This may be repeated for each anchor utilized in the foundation system. The number and/or placement of anchors may be based on foundation criteria (e.g., soil conditions, structure properties such as size and/or weight, and/or other appropriate criteria). The frame 960 may be disposed above the anchors such that openings 962 in the frame align with the anchor positions in the ground. Thus, one or more of the coupling members of the anchor maybe accessible via the opening 962 in the frame 960. A fastener 965 (e.g., bolt and/or washer) may be coupled to one or more of the driven anchors via the opening 962 in the frame to couple the frame and the anchor(s). A subfloor 970 may then be coupled to the frame via any appropriate method (e.g., driving screws, bolts, staples, nails, etc. into the subfloor to couple the subfloor to the frame). In some implementations, a structure may then be coupled to the foundation system.

Utilizing the foundation system may facilitate structure installation, since concrete foundations and/or footings may not need to be used, since installation can be performed with common tools (e.g., power drill, wrenches, etc.), etc. In addition, use of the foundation system may facilitate structure disassembly since the foundation can be uncoupled from the anchors and the anchors can be left in the ground or removed (e.g., as opposed to concrete foundation systems which protrude from ground level). In addition, the foundation system may be provided in modular kits to allow on site customization of foundations for particular applications using kit components (e.g., modular frame members assembled on site, multiple anchors and/or sizes provided, etc.).

In some implementations, sign(s) may be coupled to the longitudinal members. For example, signs, such as traffic signs (yield, stop, parking, event, etc.) may be erected in a location. By using an anchoring system with anchor(s) and frame(s), the signs may be secured at a location. The sign may be installed on a temporary or non-temporary basis. For example, in construction zones, signs may be installed to indicate the construction zone and/or direct traffic. Temporary signs may be secured with sandbags rather than concrete footings to facilitate removal of the signs. Rather than securing a frame with sandbags, anchors may be utilized with a frame to secure the frame at a location. Thus, the need for inspections (e.g., sandbag inspection for leakage, position, etc.) may be minimized by using anchors (e.g., since the anchors may satisfy stability criteria based on government regulations and/or codes). When signs are no longer needed, the frame may be removed by uncoupling the fasteners from the second coupling members of the anchors. The anchors may remain at the location (e.g., a cap may be coupled to the second coupling member) and/or removed from the location.

FIG. 10B illustrates an implementation of an example sign system 1050. As illustrated, a frame may include lateral members 910 and a longitudinal member 1010. The lateral members 910 may include a first set of approximately parallel lateral members 911 and an intersecting lateral member 912. A longitudinal member 1010 may be coupled to the intersecting lateral member 912. For example, a bracket may secure the longitudinal member to the lateral member(s) and/or the any other appropriate coupling (e.g., welding, fasteners disposed at least partially in openings) may be utilized to secure the longitudinal member to the lateral member(s).

One or more signs 1060 may be coupled to the longitudinal member 1010 (e.g., via fasteners). For example, sign (s) may include opening(s) and longitudinal member(s) may include openings and fastener(s) may be at least partially disposed in the opening(s) in sign(s) and the opening(s) in the longitudinal member(s) to couple the sign(s) and the longitudinal member(s).

The frame, and thus the sign(s) 1060, may be secured to a location via anchors 1070. The anchor(s) 1070 may be driven into a location (e.g., via a driver) and the frame may be secured to the anchor(s).

Although specific implementations of frames have been described in the anchoring systems, other implementations of frames may be utilized. For example, the frame may have any appropriate shape. The frame may include a series of lateral members and/or longitudinal members coupled to support a large sign and/or barrier, in some implementations. The sign may include any appropriate sign, such as a stop sign, a detour sign, a men at work sign, etc. The sign may include any regularly or irregularly shaped sign, such as rectangular, square, hexagonal, and/or any other regular or irregular polygon.

In some implementations, the sign may include one or more sign coupling members. For example, the sign may include one or more sign openings. A sign opening may be adapted to receive a fastener and couple the sign to the frame 820 (e.g., via an opening in the longitudinal member of the frame). A sign coupling member may include a bracket adapted to couple to the frame 820.

Although anchoring systems have been described in FIGS. 1A-10B, other types of anchors may be utilized in conjunction with and/or in place of these illustrated example implementations. For example, the anchoring system may include one or more anchors that may be coupled together. For example, a first anchor may include a threaded portion proximate the second end. The threaded portion of the first anchor may be coupled to the second coupling member of another anchor to couple the first and the second anchors together. One or more additional anchors may be similarly coupled (e.g., by coupled a first end of one anchor to a second end of another anchor). Thus, the coupled anchors may have a length greater than the length of the anchors individually (e.g., greater than the length of the first anchor and greater than the length of the second anchor). The coupled anchors may have a length less than the sum of the length of each of the coupled anchors (e.g., the length of the first anchor plus the length of the second anchor). The coupled anchors may satisfy a greater stability criteria (e.g., an amount of force that may be exerted on an anchor without substantially deforming the anchor and/or without substantially moving the anchor from a predetermined location) than the first anchor or the second anchor separately. For example, a greater force may be applied to the coupled anchors than the force that may be applied to either the first or second anchor separately without substantially deforming the anchor and/or without substantially moving the anchor from a location (e.g., since coupled anchors may be able to be driven further into the ground, since the coupled anchors may include more plates than the first or second anchors separately, etc.). In some implementations, using coupled anchors may satisfy a greater stability criteria than using the same number of anchors separately (e.g., two coupled anchors compared with two separately used anchors).

FIG. 11A illustrates an implementation of an example coupleable anchor 1100. FIG. 11B illustrates an implementation of an example anchor system 1150 that includes the example coupleable anchor 1100 illustrated in FIG. 11A.

The coupleable anchor 1100 includes a body. At least a portion of the body of the anchor may be an elongated body. The body of the anchor may have a length, a width, and a height. The height of the anchor may be at less than approximately 36 inches, in some implementations. A height of coupled anchors may be less than a sum of the height of each anchor individually. For example, a first anchor with a height of approximately 12 inches may be coupled to a second anchor with a height of approximately 12 inches to generate coupled anchors with a height less than 24 inches, when coupled.

In some implementations, the height of the anchor(s) may be selected (e.g., anchors may be coupled and/or an individual anchor may be utilized) to satisfy stability criteria (e.g., an amount of force that may be exerted on an anchor without substantially deforming the anchor and/or without substantially moving the anchor from a predetermined location). Thus, one or more anchors may be coupled together to satisfy stability criteria. In some implementations, each anchor may be able to withstand approximately 300 pounds of force applied vertically (e.g., upwards when the anchor is installed in a ground) without substantially deforming. A coupled anchor with two or more anchors coupled together may be able to withstand more than approximately 300 pounds of force applied vertically.

At least a portion of the body of the coupleable anchor 1100 may have any appropriate cross-sectional shape such as a circle, an oval, a rectangle, a square, any regular polygon and/or irregular polygon. In some implementations, the shaft may have different dimensions (e.g., length and/or width) and/or different cross-sectional shapes along a length of the shaft. For example, since a portion of the anchor may be disposed in a portion of another anchor to couple the anchors together, the shaft may not include a uniform cross-sectional area (e.g., cross-section perpendicular to the height of the anchor). For example, the anchor may include a smaller diameter proximate a second end (e.g., bottom) 110. In some implementations, the second end 110 of the anchor may be tapered. The second end of the anchor may be sized to fit in the recess in the top of the anchor to couple the anchors, in some implementations.

The body of the coupleable anchor 1100 includes a first end 105 and a second opposing end 110. The first end 105 may have a length and/or a width similar or dissimilar to at least another portion of the body (e.g., the shaft of the anchor). For example, the first end 105 and the shaft may have similar cross-sectional shapes and/or cross-sectional areas (e.g., width and length and/or diameter). At least a portion of the shaft of the body may be approximately 17 to approximately 19 mm.

The first end 105 of the coupleable anchor 1100 may include a recess. The recess may included a threaded portion 126. The threaded portion 126 may be disposed on an inner surface of the recess, the shaft, or portions there of. The threaded portion 126 of the first end may be adapted to coupled with a second anchor (e.g., via a second coupling member of the second anchor). The recess may be sized and/or shaped such that a second end of another coupleable anchor may be disposed at least partially in recess, as illustrated in FIG. 11B. For example, the thread portion 126 may engage with a threaded end of another coupleable anchor to link the anchors together. A first coupleable anchor and/or a second coupleable anchor may be rotated to engage the threaded portion of the recess of the first coupleable anchor with the threaded end of the second coupleable anchor. To unlink or disengage the linked anchors, the first coupleable anchor and/or the second coupleable anchor may be rotated in the opposite direction (e.g., compared to the rotation to engage the anchors).

In some implementations, a cross-sectional area of the second end 110 may be less than the cross-sectional area of the recess proximate the first end 105 of the coupleable anchor 1100. The second end 110 of the coupleable anchor 1100 may be at least partially tapered. One or more sides of the second end 110 may include slanted sides 115 (e.g., at least a portion of the slanted side may be at an angle relative to a side of a portion of the body proximate the second end 110). For example, the second end 110 may be a pointed second end 111, as illustrated in FIG. 1C. The configuration (e.g., angle of slanted side, number of slanted sides, width, and/or length) of the second end 110 may be selected to facilitate the positioning of the anchor and/or driving of the anchor at least partially into a location, such as the ground (e.g., a surface of the earth and/or concrete).

The second end 110 of the coupleable anchor 1100 may include a threaded portion 1110. The threaded portion 1110 may be disposed proximate and/or on the tapered portion 110 of the second end. The threaded portion 1110 of the second end may be disposed on an outer surface of the second end and/or the shaft. The threaded portion 1110 of the second end 110 may be adapted to couple with the threaded portion 126 of the recess of the first end.

Thus, a first anchor and a second anchor may be coupled by coupling the threaded portion of a second end of a first anchor to a threaded portion of the recess of a second anchor.

In some implementations, one or more openings in the body of the coupleable anchor 1100 may facilitate coupling and/or maintain coupling of anchors. As illustrated in FIG. 11B, the first end of a first anchor 1102 may include first end opening(s) 107 proximate the first end and/or second end opening(s) 112 disposed proximate the second end of the first anchor 1102. The first end of the second anchor 1104 may include first end opening(s) 107 proximate the first end and/or second end opening(s) 112 disposed proximate the second end of the second anchor 1104. As illustrated, the first anchor 1102 and the second anchor 1104 may be coupled by disposing at least a portion of the second end 110 of the first anchor 1102 in the second coupling member 125 (e.g., the recess) of the second anchor 1104. When the first anchor 1102 and the second anchor are coupled, one or more of the second openings 112 of the first anchor 1102 may at least partially align with one or more of the first openings 107 of the second anchor 1104. One or more fasteners 1106 (e.g., pin, screw, brad, etc.) may be disposed at least partially through one or more of the aligned opening(s) to further secure the anchors. By securing the coupled anchors using the fastener 1106 removal of the anchors from a location may be facilitated (e.g., since the anchors may remain coupled when a rotational force is applied to one or more of the coupleable anchors). In some implementations, a fastener 1106 may be utilized to link coupleable anchors instead of and/or in addition to securing coupleable anchors via engaged threaded portions (e.g., threaded recess of a first anchor engaging with a threaded end of a second anchor).

As illustrated in FIGS. 11A-11B, the body of the coupleable anchor 1100 may include a first coupling member 120 and a second coupling member 125. The first coupling member 120 and the second coupling member may be disposed proximate a first end 110, in some implementations. The first coupling member 120 may facilitate driving the anchor into a location (e.g., by including a portion that is coupleable to a driver).

As illustrated, the first coupling member 120 may include a surface adapted to couple to a driver. For example, the first coupling member 120 may include a portion that has a shape similar to a fastener head such as, a bolt head, a screw head and/or a nut head.

The second coupling member 125 may be discrete from the first coupling member 120, in some implementations. For example, the second coupling member 125 and the first coupling member 120 may be disposed on different portions and/or surfaces of the body of the anchor. By allowing discrete first coupling member(s) and second coupling member(s) damage to the second coupling member(s) may be inhibited. Damaging the second coupling member may inhibit the coupling of the anchor to another anchor and/or the object via the second coupling member; reduce the stability of the coupling between the second coupling member and the object and/or another anchor; and/or make the coupling of the anchor and the object and/or another anchor more difficult (e.g., when compared with coupling a substantially undamaged second coupling member and object). For example, when driving the anchor into a location, the force of the driver may at least partially deform a portion of the first coupling member (e.g., threads may be damaged). When the second coupling member is discrete from the first coupling member, since the second coupling member may not directly couple with the driver, damage to the second coupling member may be inhibited.

In some implementations, the first coupling member and the second coupling member may be the same coupling member.

The second coupling member 125 of the coupleable anchor 1100 may be disposed proximate the first end 110 of the coupleable anchor 1100. As illustrated, the second coupling member may be disposed in a recess of the first end 105. The second coupling member 125 may include the threaded portion of the first end (e.g., the threaded portion may act as the second coupling member, in some implementations). The threaded portion may couple with a second threaded portion of a second end of another anchor to couple the anchors together. For example, the second coupling member 125 of the anchor 1100 may include a threaded portion to engage with the threads of the second threaded portion of a second end of another anchor to couple the anchors together.

The second coupling member 125 (e.g., the threaded portion of the second coupling member) may be coupleable to an object, such as a basketball goal, volleyball net, a canopy, post(s), an umbrella, a structure, etc. For example, the second coupling member 125 may be coupled (e.g., directly or indirectly) to at least a portion of the object to at least temporarily secure the object to a location (e.g., the object may be approximately stabilized, set, made stationary by the anchor, and/or capable of maintaining a position or range of positions under the application of a predetermined amount of force). For example, a coupling surface of an object may be threaded and the second coupling member 125 of the anchor 100 may include threads to engage with the threads of the coupling surface of the object. Thus, the second coupling member of the coupleable anchor 1100 may couple with another anchor (e.g., via a second threaded portion of the second end of the other anchor) and/or an object (e.g., directly and/or indirectly).

The second coupling member 125 may include a coupling surface that is similar or dissimilar to the first coupling member 125, in some implementations.

The first coupling member 120 and the second coupling member 125 may be, relative to each other, oppositely disposed on the anchor. For example, the first coupling member 120 may be disposed on an outer surface of the coupleable anchor 1100 proximate the first end 105 of the anchor and the second coupling member 125 may be disposed in an inner surface (e.g., a recess) proximate the first end of the anchor, as illustrated in anchor 1100 in FIG. 11A.

In some implementations, the configuration (e.g., size, pitch, and/or spacing) of the threads in the threaded portion (e.g., first threaded portion of the first end and/or second threaded portion of the second end) may be selected to couple with a predetermined coupling member of an object and another anchor. Thus, two or more anchors may be coupled together without regard to which anchor in the coupled anchor is coupled to the object (e.g., since one or more of the coupled anchors may be individually coupled to either another anchor or an object).

In some implementations, the first coupling member 120 and the second coupling member 125 may be disposed on the same surface of the anchor. For example, the first coupling member 120 and the second coupling member 125 may be disposed on the inner surface of the anchor and proximate the first end 105. The first coupling member 120 may be disposed closer to the first end 105 of the anchor 100 than the second coupling member 125. In some implementations, the second coupling member 125 may be disposed closer to the first end 105 of the anchor 100 than the first coupling member 120.

In some implementations, the first coupling member 120 and/or the second coupling member 125 may be centered about axis 140 and/or not centered about the axis 140.

As illustrated, the anchor includes one or more plates. The plate(s) may provide resistance to lateral and/or vertical forces applied on the anchor and/or object. For example, during use, the anchor may be subject to forces, such as forces pulling the anchor out of the location, forces from objects (e.g., structures, basketballs, volleyballs, and/or people) striking the anchor and/or objects coupled to the anchor, and/or other forces. As illustrated, the coupleable anchor 1100 may include a plate 130. The plate 130 may be coupled to the shaft 130 between the first end 105 and the second end 110 of the anchor. For example, the plate 130 may be disposed at a position on the shaft that is approximately 10% to approximately 35% times the height of the anchor from the second end of the anchor. The anchor may be disposed approximately 3 inches to approximately 5 inches from a second end of an anchor that is at least approximately 12 inches high, in some implementations.

In some implementations, the anchor may include more than one plate. The configuration (e.g., size, shape, number of plates, and/or degree of slanting) of the plate may be selected based on the application specifications of the anchor. For example, the size of the plate and/or anchor may be increased to increase the amount of force that can be applied to an object without substantially moving the object from a location to which it is secured. In some implementations, anchors may be coupled together to increase the number of plates in a coupled anchor (e.g., when compared with a single anchor of the coupled anchor).

Additional plates may be utilized to allow the anchor to provide increased stability (e.g., withstand vertical and/or lateral forces without substantial deformation of the anchor and/or to allow the anchor to approximately maintain a position in a location or range of positions), when compared with a single plate anchor. In some implementations, two smaller diameter plates may be utilized in place of a single larger plate to provide similar stability for an anchor. A user's ease of use may be increased since the ease of driving two smaller plates may be greater than driving one larger plate. In some implementations, the first plate 130 may be disposed at a position on the shaft that is approximately 10% to approximately 35% times the height of the anchor, from the second end of the anchor. The second plate may be disposed at a position on the shaft that is approximately 40% to approximately 60% of the height of the anchor, from the second end of the anchor. In some implementations, the first plate may be disposed at a first position that is a first height from the second end of the anchor and the second plate may be disposed a second position that is approximately the first height from the first plate.

Thus, when anchors are coupled together, the coupled anchors may include more plates (e.g., when compared to the anchors individually) and may increase stability.

In some implementations, a top surface of the inner surface of the plate(s) and/or a bottom surface of the inner surface of the plate(s) may be coupled (e.g., welded or otherwise affixed) to at least a portion of the shaft of the anchor 100. In some implementations, the top surface and the bottom surface of the inner surface of a plate may be coupled to at least a portion of the shaft, which may increase the amount of force that can be applied to the anchor without substantially deforming the anchor, and thus allowing the anchor to retain an object in a location (e.g., withstand a predetermined amount of lateral and/or vertical force applied to the object and/or anchor). For example, an edge of a top surface of plate(s) (e.g., a top surface of an inner surface of a plate) of the anchor may be welded to the shaft of the anchor and an edge of a bottom surface of plate(s) (e.g., a bottom surface of an inner surface of a plate) of the anchor may be welded to the shaft of the anchor.

The plate may include a cross-sectional (e.g., with a length and a width and/or a diameter) and a thickness. The shape of the cross-section of the plate may be approximately circular, approximately oval, approximately rectangular, and/or any other regular or irregular polygon, as appropriate. The plate may have a thickness. The thickness of the plate may be selected such that deformation of the plate while driving the anchor into a location is inhibited. The thickness of the plate may be approximately uniform. In some implementations, the thickness of the plate may vary. For example, the thickness of at least a portion of the plate may decrease (e.g., the plate thickness may be greater proximate the shaft of the anchor than proximate an edge of the plate).

The plate(s) 130 may partially circumscribe a cross-section of a shaft 135 of the body of the coupleable anchor 1100, in some implementations. In some implementations, the plate(s) 130 may circumscribe a cross-section of the shaft 135 of the body of the coupleable anchor 1100 at least one time (e.g., at least partially circumscribe the shaft).

In some implementations, a plate may include a slanted portion. The plate may include other portions that are not slanted (e.g., between 5 and 85 degrees from the axis 140. As illustrated, a first axis 140 is disposed parallel to at least a portion of the shaft 135 of the anchor 100. A second axis 145 is disposed perpendicular to at least a portion of the shaft 135 of the anchor 100 and the first axis 140. A third axis 150 is disposed parallel to at least a portion (e.g., a slanted portion) of the plate 130. A first angle 155 may be disposed between the second axis 145 and third axis 150, such that the slanted portion of the plate 130 is disposed at approximately the first angle from at least a portion of the shaft 135. The first angle 155 may be between 0 and 90 degrees. In some implementations, the first angle 155 may be between approximately 20 degrees and 70 degrees. In some implementations, the slanted portion of the plate may be slanted at a second angle 158, relative to the first axis 140.

In some implementations, at least a part of the second portion of the plate may be approximately normal to the shaft of the anchor. At least a part of the second portion of the plate may be slanted, in some implementations. For example, the second portion of the plate may be disposed in the same plane as the first portion. The second portion of the plate may be disposed at an angle relative to the shaft of the anchor that approximately 90 degrees from the third axis 150 to approximately 90 degrees from the first axis 140.

The plate 130 may include a recess 160 and an edge 165. The recess 160 and/or the edge 165 may facilitate driving the anchor at least partially into a location. The recess 160 may be a gap between a first end of the plate and a second end of the plate, as illustrated. The length of the gap may be approximately 40% to approximately 50% of the diameter, width, or length of a plate. The length of the gap may be less than 50% of the diameter of the plate, in some implementations.

The edge 165 may be disposed proximate a second end of the plate. The edge 165 may be a downward slanting portion of the plate. The edge 165 may be disposed at an angle of approximately 0 degrees (e.g., parallel to axis 140) to approximately 45 degrees from the axis 140 parallel to the shaft. The edge 165 may be sharp. For example, the edge 165 may have a thickness 168 to facilitate penetration of the anchor in a location (e.g., the ground). A thickness 168 of a portion of the edge 165 may be similar to the thickness 132 of the plate.

The plate 130 may have a width 133 that is at least approximately 2 times the width of at least a portion of the shaft 135. Anchors with more than one plate may include plates of similar and/or dissimilar sizes. The height of the anchor may be based on the application of the anchor (e.g., use and/or location of use). In some implementations, the height of the anchor may increased by coupling the anchor to one or more other anchors.

A configuration of an anchor (e.g., number of anchors coupled together, width, length, height, plate number, plate size, plate angles, and/or configuration of components) may be selected such that a predetermined force may be applied to the anchor without substantially deforming the anchor and/or without uncoupling the object from a location to which it is secured.

In some implementations, the coupleable anchor 1100 may include a flange 170 disposed between the first end 105 and the plate 130. The flange 170 may include an annular ring, in which at least a portion of the inner surface of the annular ring is coupled to at least a portion of the shaft. The flange 170 may include protrusion(s). The flange 170 of the anchor may be utilized to facilitate removal of the anchor from a location.

In some implementations, when an anchor is driven into a location, the top surface of the first end may be disposed approximately flush with a top surface of the ground and/or below a top surface of the ground. Thus, when the anchor is not coupled with an object, the anchor may be kept in the ground and be inhibited from acting as a trip hazard. A cap may couple with the first coupling member and/or the second coupling member. The cap may inhibit earth, dust, debris, etc. from the location from entering recesses proximate the first end of the anchor. When an anchor is to be removed, a user may engage a driver with the first coupling member to provide a force to lift the anchor out of the ground and/or may pull (e.g., by hand and/or with a wrench) the flange 170 to remove the anchor from the location. In some implementations, the anchor may be installed such that the flange is disposed proximate a top surface of the location (e.g., the ground). To remove the anchor, a user may grip the flange (e.g., by hand and/or with a tool, such as a wrench) and pull the anchor out of the location.

During use of a coupleable anchor, a determination may be made (e.g., based on the object to be secured, use, location in which an anchor will be used, etc.) regarding how many anchors to coupled together. One or more anchors may be coupled together. Coupling an anchor to another anchor may include disposing at least a portion of a second end of a second anchor in a recess of a first end of a first anchor. The second threaded portion of the second end of the second anchor may be coupled to (e.g., engaged) the first threaded portion of the first end of the first anchor. One or more of the first openings of the first end of the first anchor may be aligned with one or more second openings of the second end of the second anchor. Fastener(s) may be disposed at least partially in the aligned openings to couple the first anchor and the second anchor. One or more other anchors may be coupled to the first and/or the second anchor. In some implementations, the first anchor may not include a second threaded portion proximate the second end of the first anchor.

The coupled anchors may then be driven into a location. A user may dispose the coupled anchor at a location to which an object may be secured. The coupled anchor may be oriented such that the second end of the coupled anchor may be positioned proximate the top surface of the location and/or driven at least partially into the ground prior to other portions of the anchor. The slanted edge of the second end of the coupled anchors may be driven (e.g., pushed) into the location (e.g., the ground) by the application of force to the anchor (e.g., the first end of the anchor) by the user. The user may couple the driver and the first coupling member of the anchor (e.g., by engaging a portion of the driver with the first coupling member of the anchor). For example, the user may engage a first coupling member that includes a surface similar to a bolt head with a socket wrench that is capable of coupling to the first coupling member.

The user may actuate the driver to apply a force to the coupled anchor and drive the anchor at least partially into the location. The fasteners coupling the first anchor and one or more other anchors may inhibit uncoupling of the anchors during the driving and/or removal of the anchor at a location. In some implementations, the actuation of a socket wrench (e.g., a driver) may rotate the coupled anchor and drive the coupled anchor at least partially into the location. As the coupled anchor is driven into the location, such as the ground, the plate may contact a surface of the location. The anchor may be driven into the location until at least one or more of the plates of the coupled anchor are below a top surface of the location (e.g., the plate is underground). In some implementations, the anchor may be driven into the location until each of the plates of the coupled anchor is below the top surface of the location and/or the flange is above the top surface of the location. In some implementations, at least a portion of the flange may contact at least a portion of the top surface of the location. Then, the user may uncouple (e.g., disengage) the driver, such as a socket wrench, from the first coupling member.

The anchor may then be coupled to an object (e.g., structure, frame, plate, post, base, bracket, ring adapter, other adapter, etc.) via the accessible second coupling member of the coupled anchor. For example, a top anchor may be the anchor closest to the top surface, partially above the top surface, or otherwise accessible to a user. The second coupling member of this accessible top anchor may be the accessible second coupling member.

The anchor may be removed from the location in a variety of ways, as described. In some implementations, the anchors may be uncoupled by removing the fastener and/or uncoupling the first threaded portion of a first anchor and a second threaded portion of another anchor.

Although FIGS. 10A-10B illustrate an implementation of a coupleable anchor, other implementations of coupleable anchors may be utilized. For example, an anchor with one or more of the features illustrated in FIGS. 1A-2D and 7A-7B may be utilized with the coupleable anchor.

The coupleable anchor may be similar (e.g., include one or more of the features) to other described anchors, in some implementations.

Figure 12A:
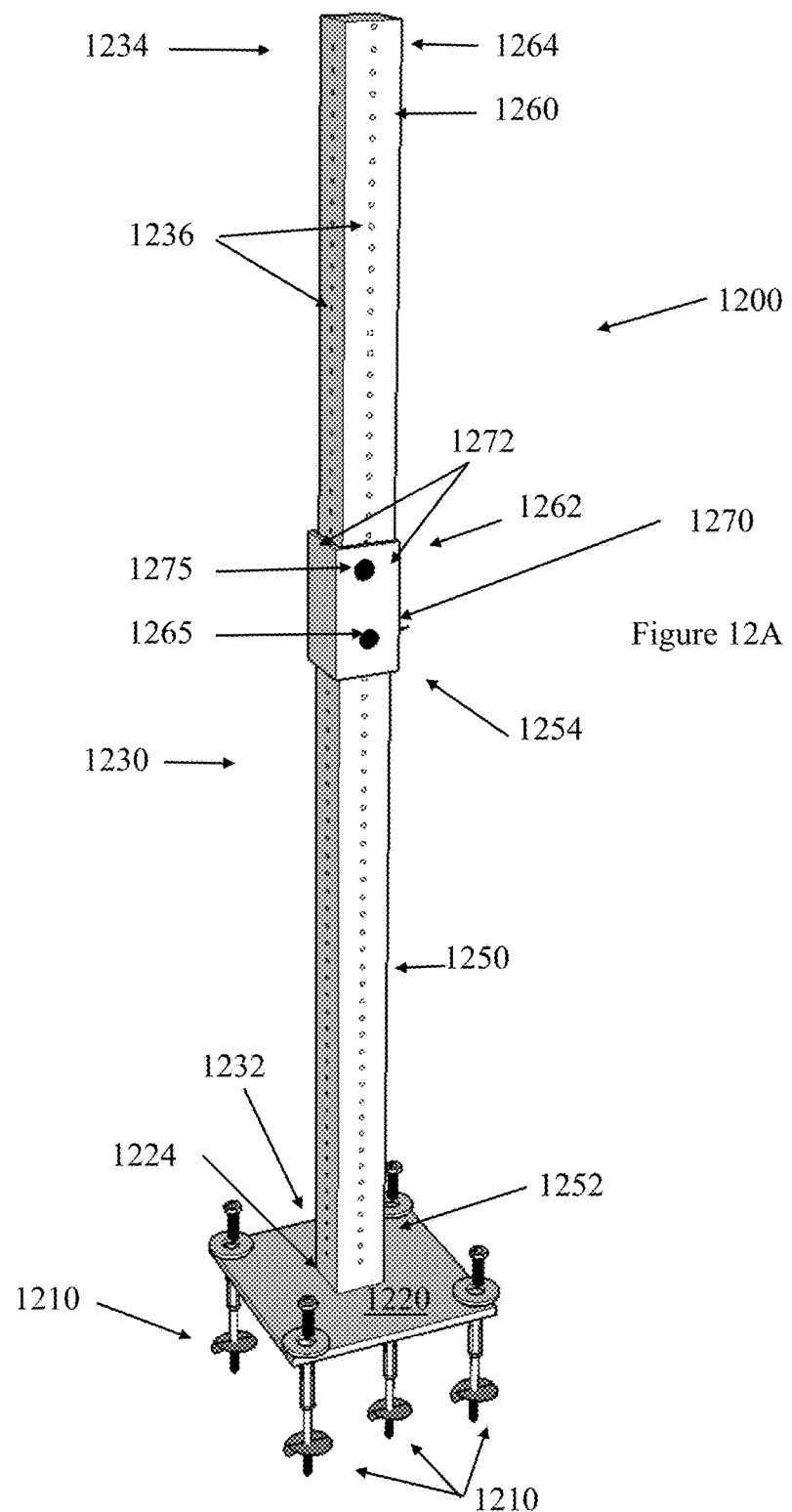
FIG. 12A illustrates a perspective view of a first side of an implementation of an example anchored post system.
Figure 12B:
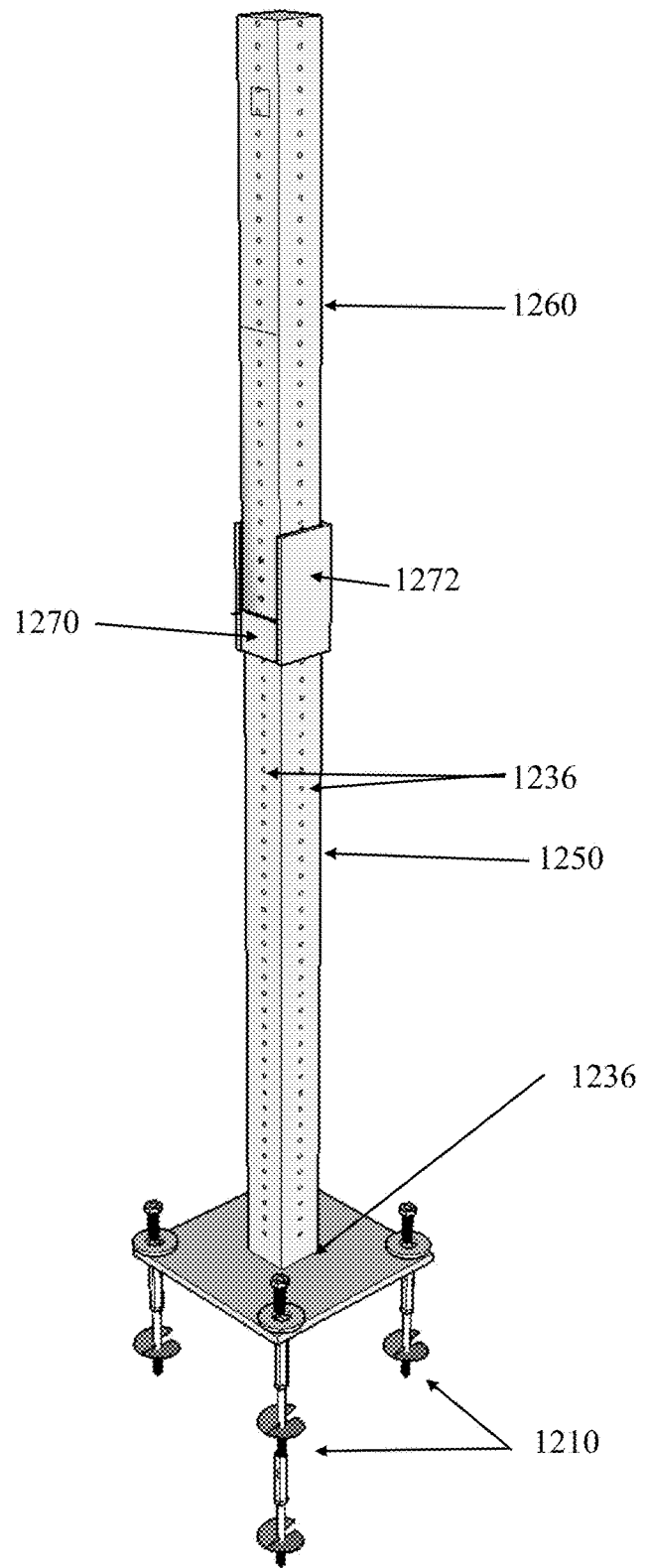
FIG. 12B illustrates a perspective view of a second side of an implementation of the example anchored post system illustrated in FIG. 12A.

In various implementations, one or more of the described anchoring systems maybe used in conjunction with an anchored post system. FIGS. 12A and 12B illustrate an implementation of an example anchored post system. The anchored post system 1200 may include one or more anchors 1210, a base 1220, and a post 1230. The anchor 1210 may include any appropriate anchor, such as the anchors 100, 200, 275, 190, 305, 430, 530, 605, 850, 920, 955, 1070, 1100, 1102, and/or 1104. The anchor(s) 1210 may be driven into a location, during use. For example, two or more anchor(s) 1210 may be driven into a location to couple (e.g., secure) the anchored post system to the location.

The number (e.g., more than one linking anchor coupled together, 4 anchors disposed around a periphery, etc.) and/or type of anchor (e.g., linking anchor or nonlinking anchor) may be selected based on the installation location and/or use. For example, a post system for a small sign may utilized fewer anchors (e.g., number of anchors disposed around periphery of base and/or number of anchors linked together) than a post system coupled to a canopy.

The base 1210 of the anchored post system may be any appropriate size and/or shape. For example, a base similar to the base of the described basketball ball goal may be utilized with the anchored post system. The base may be approximately square, approximately rectangular, approximately circular, other regular shapes, and/or other irregular shapes, as appropriate. The base may be planar, in some implementations. The base may have a top surface with slope and/or curvature (e.g., to allow drainage of water), in some implementations.

The base 1220 may include one or more first openings 1222. The first openings 1222 may be disposed (e.g., spaced at a regular or irregular interval) proximate a perimeter of the base 1220, in some implementations. The first opening (s) 1222 may be used as a template for positioning the anchor(s) 1210 in a location. For example, a base 1220 may be disposed in a location and an anchor 1210 may be positioned in a first opening 1222 of a base and driven into the location. One or more additional anchors 1210 may be disposed in other first openings 1222 of the base 1220 and driven into the location, in some implementations.

A first opening 1222 may have a size and/or shape to receive at least a portion of a first fastener 1240. A first fastener may be any appropriate fastener such as, but not limited to, a bolt or a screw. A first fastener 1240 may be coupleable with an anchor 1210. A first fastener 1240 may have a first end 1242 with a portion 1243 adapted to be couple with a driver (e.g., bolt head fastener, Philips head fastener, etc.), and an opposing second end 1244. The first fastener 1240 may include a threaded portion 1246 disposed proximate the second end 1244. At least a portion of the threads of the threaded portion 1246 of the first fastener 1240 may couple with at least a portion of the threads of the second coupling member of an anchor 1210 to couple the first fastener and the anchor. In some implementations, one or more of the first fasteners may each be similarly coupled with an anchor to couple the base to a location (e.g., secure and/or retain the base at a location during use such that the base remains coupled to the location during normal use).

The first fastener(s) 1240 may couple the base 1220 to the anchor(s) 1210 and thus to a location in which the anchors are secured. A first fastener 1240 may be disposed at least partially in the first opening 1222 of the base 1220 when coupling the first fastener with the anchor 1210. For example, at least a portion of a shaft of a first fastener may be disposed in the first opening of a base, when coupling the base to the anchor(s). When uncoupling the base from a location (e.g., to move the anchored post system from a location), the first fastener(s) may be uncoupled from the anchors and removed from being positioned in first opening(s). For example, a driver may be coupled proximate a first end of the first fastener and a torque may be applied to the first fastener by the driver to unscrew the first fastener from the first anchor. The base then may be removed from the location.

The base may include a post coupling member 1224 to facilitate coupling the base 1220 and the post 1230 of the anchored post system 1200. In some implementations, the base 1220 may allow more than one post 1230 to be coupled to the base (e.g., via post coupling members). For example, a base may couple with two posts to provide stability to a sign. As another example, a base may include a plurality of posts to provide coupling points for other objects (e.g., such that the base acts as a bike rack and bikes may be coupled to one or more posts). Linking anchors (e.g., two or more anchors coupled together) may be utilized in conjunction with a multi-post base to provide stability, to provide an appropriate resistance from movement (e.g., falling down), and/or for any other appropriate purpose, in some implementations.

The post coupling member 1224 may include an post opening 1226 (e.g., disposed through the base and/or at least partially through the base) in which at least a portion of the post 1230 may be disposed. The post opening 1224 may include a threaded portion (not shown), which couples with a threaded portion (not shown) of a post 1230. For example, at least a portion of a wall of post opening 1224 may include threads.

The anchored post system 1200 may include a post 1230 with a first end 1232 and an opposing second end 1234. The post 1200 may be coupled to the base 1220 proximate a first end 1232 of the post. For example, at least a portion of a first end 1232 of the post 1230 may be disposed in a post opening 1226 of the base 1220. A post 1230 may include a threaded portion (not shown) proximate the first end 1232. At least a portion of the threads of the threaded portion of the post may engage with at least a portion of the threads of the post coupling member (e.g., a threaded portion of the post coupling member) to couple the post and the base.

In some implementations, the post and the base may be provided as a single piece. For example, the post may be welded to the base. The post and the base may be screwed into the post opening of the base and coupled with adhesive. In some implementations, the post and the base may be a unibody member).

The post 1230 may include one section (e.g., a unibody post) or more than one section. For example, one or more of the sections may include a first end and an opposing second end, which is capable of coupling with a first end of a different post. A post may be created by coupling a second end of a first post and a first end of a second post. In some implementations, more than one section may be coupled together. The anchored post system may have an adjustable height by using different numbers of sections to create the post (e.g., similar to the adjustable height basketball goal post, frame, and/or signs).

Figure 12C:
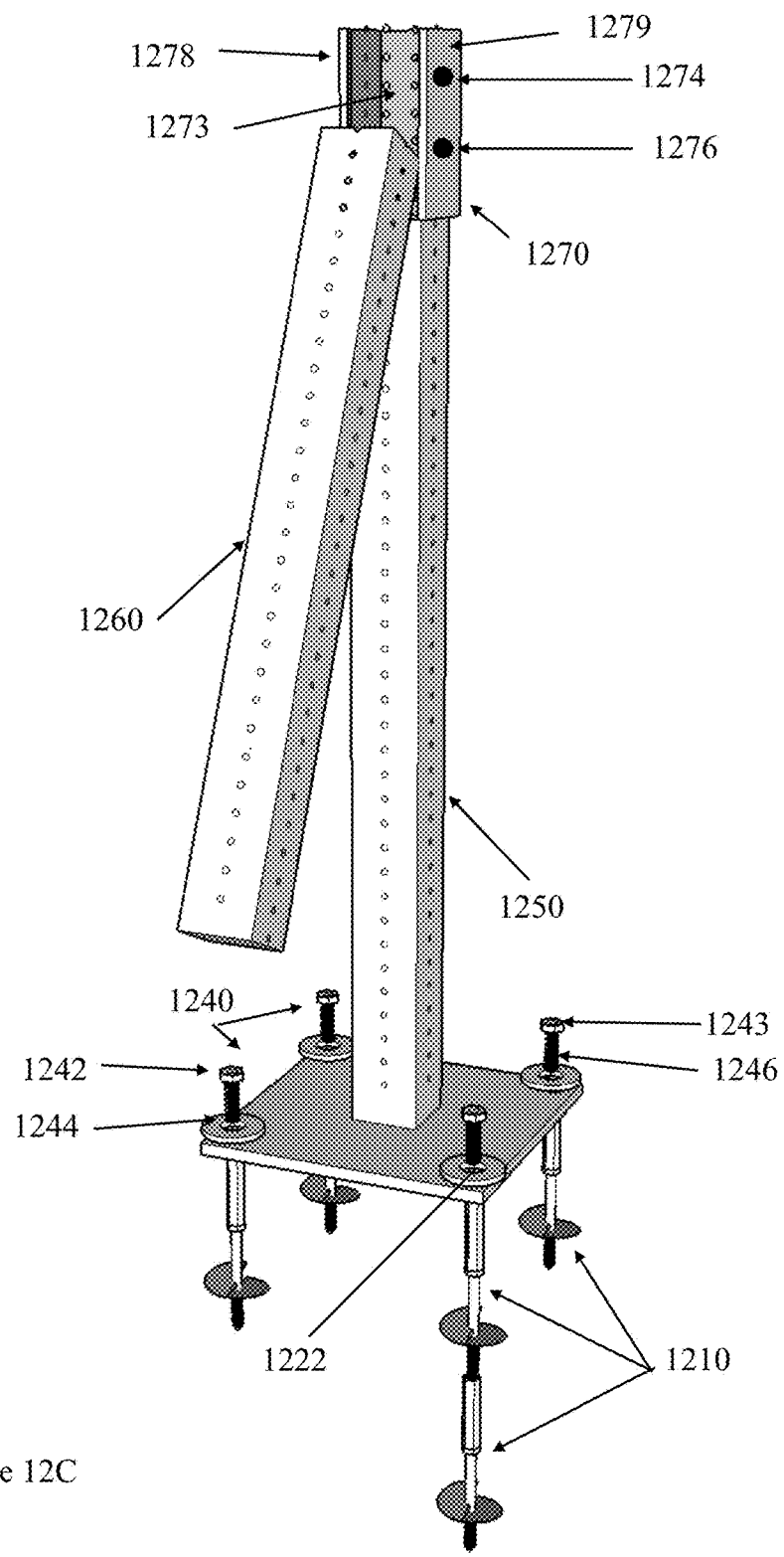
FIG. 12C illustrates an implementation of the example anchored post system illustrated in FIG. 12A in which the post is collapsed.

A sectioned post may allow the post to be collapsed (e.g., for transport and/or storage). FIG. 12C illustrates an implementation of FIG. 12A in which the post has been collapsed. As illustrated, the post 1230 includes a first section 1250 and a second section 1260. The first section 1250 of the post 1230 includes a first end 1252 and a second opposing end 1254. The first end 1252 of the first section 1250 of the post 1230 may include a portion capable of coupling with a base 1220. For example, the first end may include threads that can engage the threads of the post opening to couple the post 1230 and the base 1220. The second opposing end 1254 of the first section 1250 of the post 1230 may include a portion capable of coupling with the second section 1260 of the post.

In some implementations, a collar may be utilized to couple more than one section of a post together. For example, collars similar to the collars described in the multi-post anchoring system 600 may be utilized and/or the collars described in the lighting system 1200 may be utilized.

The collar 1270 may be a separate component and/or a portion of a section of a post. As illustrated in FIGS. 12A-12C, the collar may extend from a second end 1254 of a first section 1250 of the post 1230. For example, the collar may include one or more plates 1272 that extend from the first section 1250. The collar 1270 and/or portions thereof (e.g., plates) may have any appropriate shape, such as but not limited to, a c-shaped collar and/or U-shaped collar. The collar 1270 may have a size and/or shape to receive at least a portion of the second section 1260 of the post 1230. For example, at least a portion of a first end 1262 of a second section 1260 of a post 1230 may be disposed in the collar 1270.

The collar 1270 may include one or more openings to facilitate coupling the first section 1250 and one or more second sections 1260 of the post 1230. For example, the collar 1270 may include a first opening 1274 that may have a size and/or shape to receive at least a portion of a first fastener 1275 (e.g., pin, screw, a bolt, etc.) may be received. The first fastener 1275 may couple with the second section 1260 of the post. For example, at least a portion of the first fastener 1275 may be disposed in an opening in the second section 1260 of the post. The first fastener 1275 may pass through the second section 1260 of the post 1230 to couple with another portion of the collar 1270 (e.g., by frictionally fitting with a second wall and/or portion of a round collar; by being disposed in a recess in a second wall and/or portion of a rounded collar; and/or by passing through an opening in a second wall and/or portion of a round collar). The position of the first opening 1274 in the collar 1270 and the first fastener 1275 may allow the second section 1260 of the post to be rotatably coupled to the first section (e.g., as illustrated between FIG. 12A and FIG. 12C). Thus, the second end 1264 of the second section 1260 of the post 1230 may be rotated from a first position, in which the sections of the post are linearly arranged, to a second position, in which two or more sections of the post are disposed proximate each other (e.g., side by side). Thus, the anchored post system 1200 may be collapsible, in some implementations. By allowing the post to be collapsible, movement of the post, shipping of the post, and/or installation may be facilitated.

The rotation of the second section with respect to the first section of the post may be limited by one or more plates of the collar, in some implementations. For example, a stop plate 1273 may inhibit rotation of the second section 1260 of the post 1230 past a predetermined position (e.g., by the stop plate of the second section contacting the second section).

The collar 1270 may include a second opening 1276 to inhibit rotation of the second section 1260 with respect to the first section 1250. For example, the second opening 1276 may be disposed in the collar 1270 (e.g., in a plate of a collar) farther away from a first end 1252 of the first section 1250 than the first opening 1272 in the collar. By utilizing two fasteners disposed along a length of the second section of the post, rotation may be inhibited in some implementations. In some implementations, a position of the second opening and/or shape of a collar (e.g., c-shaped) may inhibit movement of a second section coupled to the collar with a second fastener via the second opening in the collar. A second fastener 1277 may be disposed at least partially in the second opening 1277 and couple with the second section of the post to inhibit rotation of the second section with respect to the first section. The second fastener may be removed (e.g., from the second section and/or collar) to allow rotation of the second section with respect to the first section. In some implementations, the first fastener and the second fastener may be removed (e.g., from the second section and/or collar) to uncouple the first section and the second section of the post.

In some implementations, the shape of the collar may limit the rotation of the second section. For example, a C-shaped collar may include three plates extending from second end 1254 of a first section 1250 of a post 1230. As illustrated in FIG. 12C, the collar may include a first plate 1278 and a second plate 1279, which is disposed on an opposing side of the collar. The stop plate 1273 may be disposed between the first plate and the second plate and/or couple with ends of the first plate and/or second plate. In some implementations, the plates may extend from the second end of the first section along at least a portion of a periphery of the second end. In some implementations, the first fastener 1275 may couple the second section to the first plate 1278 and the second opposing plate 1279. The stop plate may be coupled at a first end to the first plate and at a second opposing end to second plate. When the second section is allowed to rotate about the first fastener, at least a portion of the second section may contact the stop plate to limit rotation of the second section, in some implementations.

In some implementations, the collar may include a portion (e.g., a plate) to facilitate positioning a section of a post. For example, a second section may be coupled perpendicularly or at a slanted angle with respect to the first section of the post. A plate may extend to allow a portion of the second section to contact (e.g., rest on) the plate when disposed in a predetermined position. For example, a first and second plate of a collar may have a first height and a third plate may have a second different height (e.g., greater or less than the first height to create an acute angle, obtuse angle, or right angle between coupled first and second sections of the post). The second section may be coupled via a first fastener to the first and second plate and may rest on the third plate to dispose the second section in a predetermined angle with respect to the first section of the post. Thus, installation of a post of a predetermined shape may be facilitated.

In some implementations, the post may include more than two sections and one or more collars may be used to couple sections of the post together (e.g., a collar may be used between each section and/or between one or more sections). For example, a first section may be coupled to another first section, which is coupled to a second section.

The post may be coupleable to one or more objects, in various implementations. The post may include one or more apertures 1236 that may facilitate coupling object(s) with the post. For example, one or more apertures may be disposed proximate a second end of the post and/or at various other positions along a height of a post. In some implementations, the post may be perforated (e.g., apertures may be disposed along a length of the post), as illustrated in FIGS. 12A-C. The apertures may be disposed on one or more sides of the post. For example, a post may include a plurality of apertures along a height, length, and/or width of the post. In some implementations, a side of a post may include more than one row of apertures (e.g., apertures may be disposed along a width and/or length of the post).

A post with a plurality of apertures may allow customized positioning of objects (e.g., to satisfy criteria for particular applications, such as lighting, sound, etc.). For example, an object such as a light source may be coupled in a first aperture to allow light to be emitted in a first direction and may be coupled to a second aperture to allow light to be emitted in a second different direction (e.g., overlapping and/or not overlapping areas of light). The second aperture may be positioned at a different height, length or width on the post to allow the light to be emitted in a different direction. A post with a plurality of apertures may facilitate modular post kits that can be customized for particular applications, in some implementations.

One or more objects may be coupled to the post to secure the object in a location (e.g., via the anchors secured in the location). FIGS. 13A-F illustrate an implementation of an example of objects coupled to a post similar to the post in FIGS. 12A-C. Object fastener(s) may be disposed at least partially in the aperture(s) to couple the object(s) with the post (e.g., an object fastener may be a screw, bolt, and/or pin that is disposed at least partially in an aperture of the post and at least partially in the object and/or opening of the object). For example, a bolt, washer(s), and a nut may couple a light to the post. In some implementations, objects may include, but are not limited to light sources (e.g., LED, fluorescent, and/or any other appropriate light source), power sources (e.g., battery and/or solar panel), speakers (e.g., wired or wireless speakers), alarms (e.g., visual and/or audio), cameras (e.g., still image, video, enhance images such as images obtained at night or heat patterns, etc.), sensors, controllers (e.g., switches, operation buttons, etc.), basketball goals (e.g., a backboard and/or basketball goal), a scoreboard, communication equipment (e.g., communication access points such as, Wi-Fi access point, RF access point; communication antennas, such as cellular antennas and/or Wi-Fi antennas, etc.), and/or any other appropriate object. In some implementations, operations of one or more of the objects may be controlled remotely (e.g., via app on mobile device, using a remote, etc.) or directly on the anchored post system (e.g., buttons, dials, etc.). For example, lights may be turned on and/or off, speakers may be remotely connected to a wireless streaming source, cameras may transmit data to remote memory, etc.

In some implementations, objects may operate in conjunction with each other. For example, a power supply (e.g., solar panel, battery pack, hard wire to other power supply, etc.) may provide power for operation (e.g., via a connection between the objects) of other object(s), such as a light source, alarm, speaker, cameras, and/or score board. As another example, a display board (e.g., scoreboard, shot clock, etc.) may be coupled to a basketball goal and/or other sporting goal to record score. As another example, lights and/or speakers may be coupled to a goal (e.g., basketball goal) and operate in conjunction (e.g., activate lights and/or sounds when a score is made in the goal).

In some implementations, more than one post (e.g., each coupled to the same or different base) may operate in conjunction with each other. For example, a canopy may be coupled to more than one post (e.g., for support and/or to allow extension between posts). A sign, such as a banner may be coupled to more than one post (e.g., for support and/or to extend a sign between posts). A solar panel may be coupled to and extend between posts (e.g., for large solar panels), in some implementations.

The anchored post system may be a kit that includes one or more anchors, one or more bases, one or more fasteners, and/or one or more posts. The kit may include objects to be secured to the post(s) and/or a user may provide the objects to be secured to the post(s). The components selected from the kit to create the anchored post system may be based on the application of the anchored post system. For example, at least two anchors may be linked together and driven into the ground for specific applications (e.g., heavy objects, wind loads, snow loads, specific stability criteria satisfaction, etc.). In some implementations, posts may be created using post sections from the kit for specific applications (e.g., at specific heights, orientations, etc.). The kit may allow customization and/or adding on to existing anchored post systems (e.g., add new component and/or post section to existing anchored post system), in some implementations.

Figure 13A:
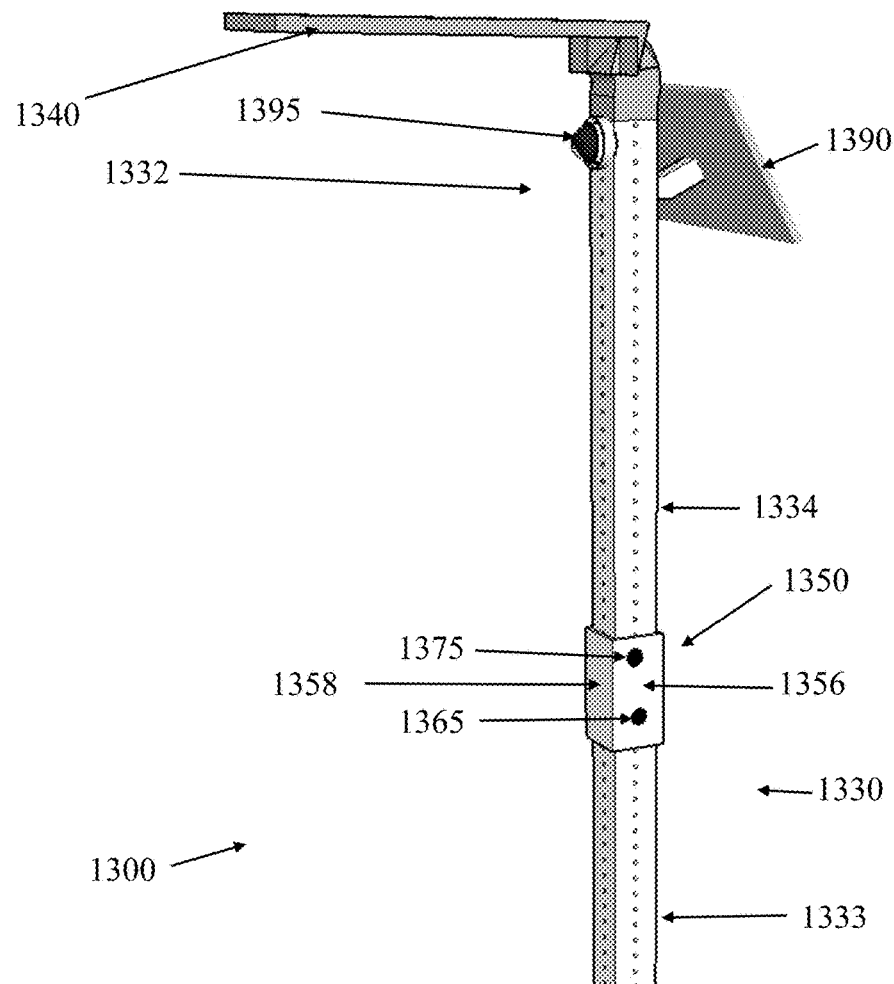
FIG. 13A illustrates a first side perspective view of an implementation of an example lighting system.
Figure 13B:
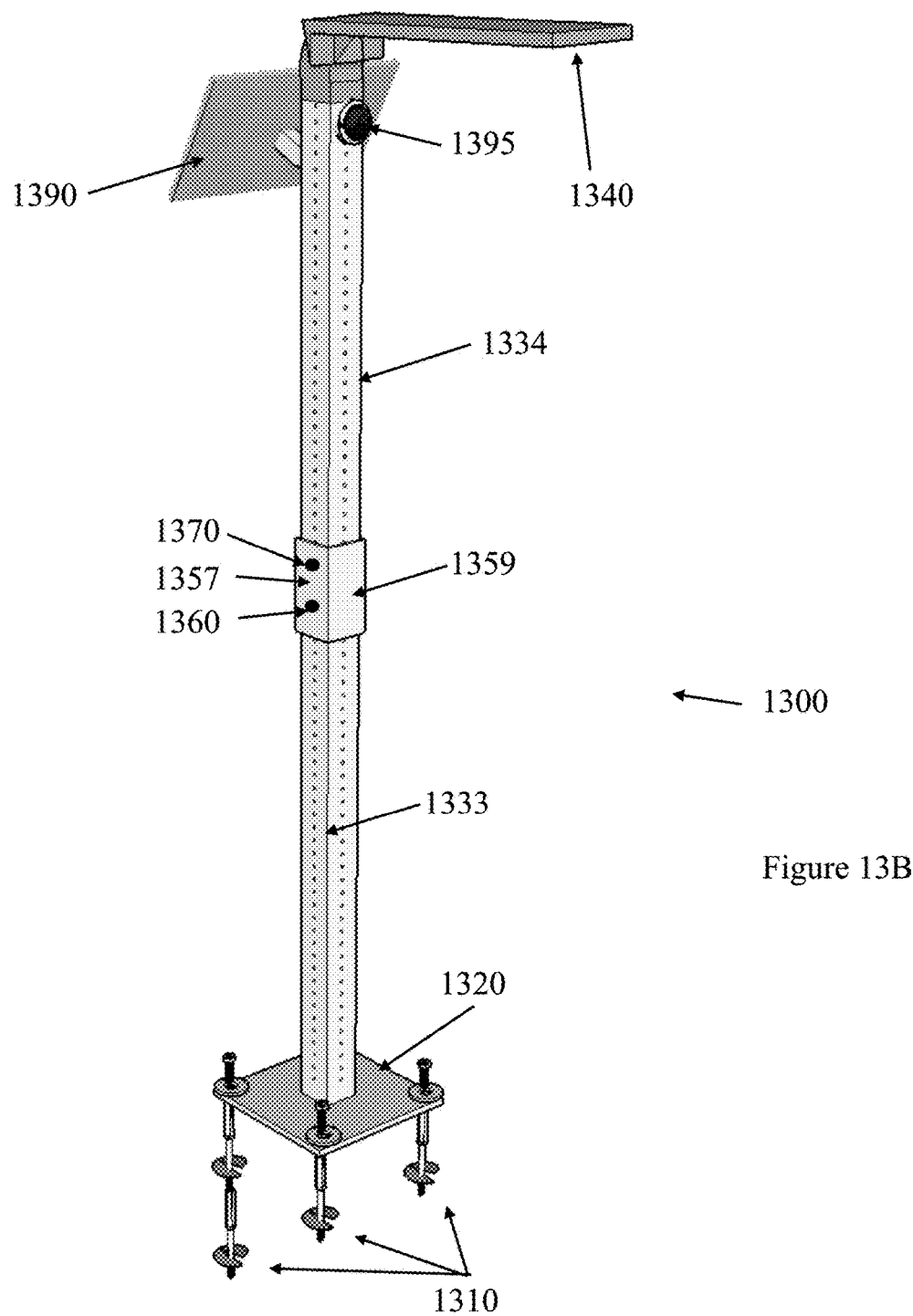
FIG. 13B illustrates a second side perspective view of an implementation of the example lighting system illustrated in FIG. 13A.
Figure 13C:
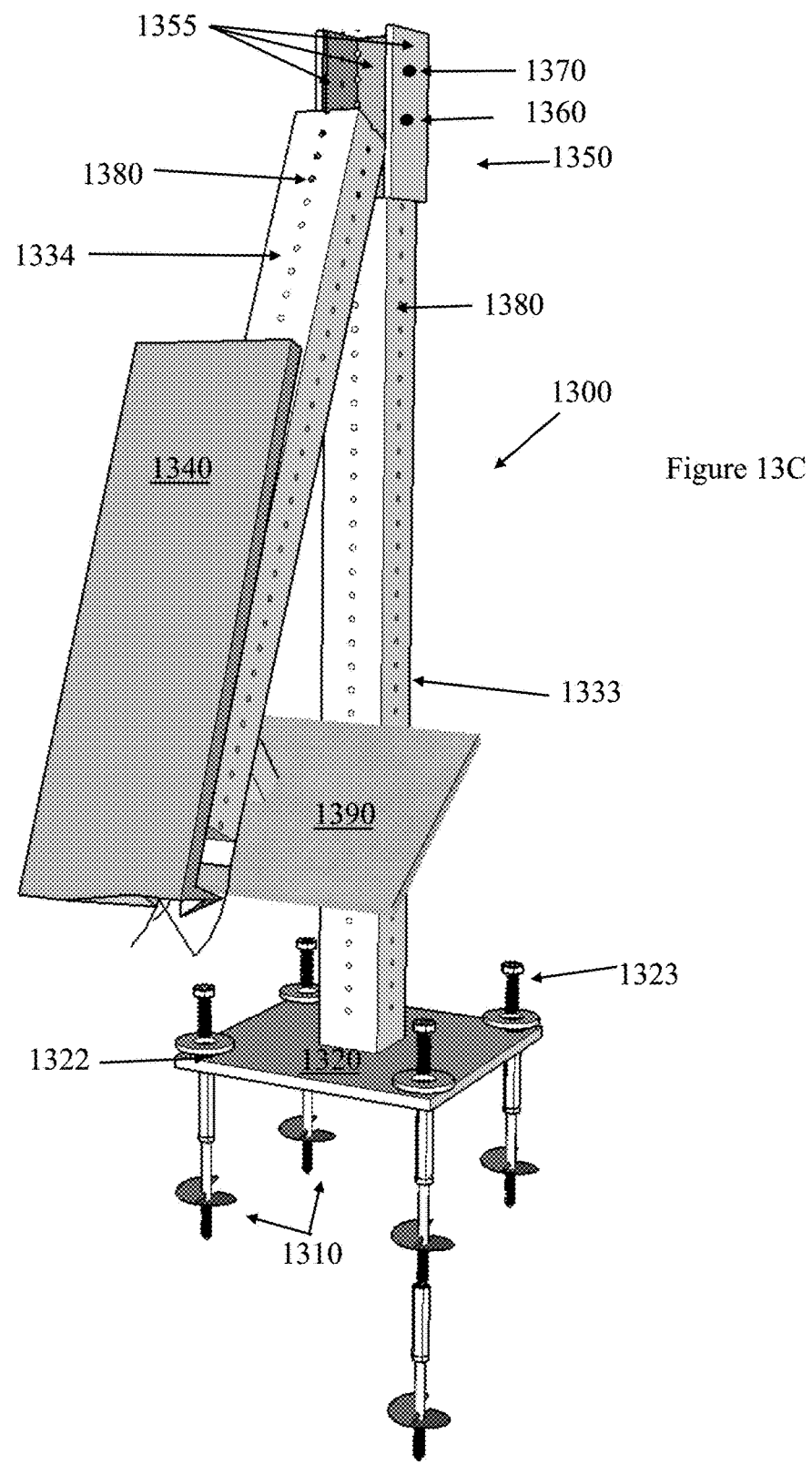
FIG. 13C illustrates a first side perspective view of an implementation of the example lighting system illustrated in FIG. 13A in which the post has been collapsed.
Figure 13D:
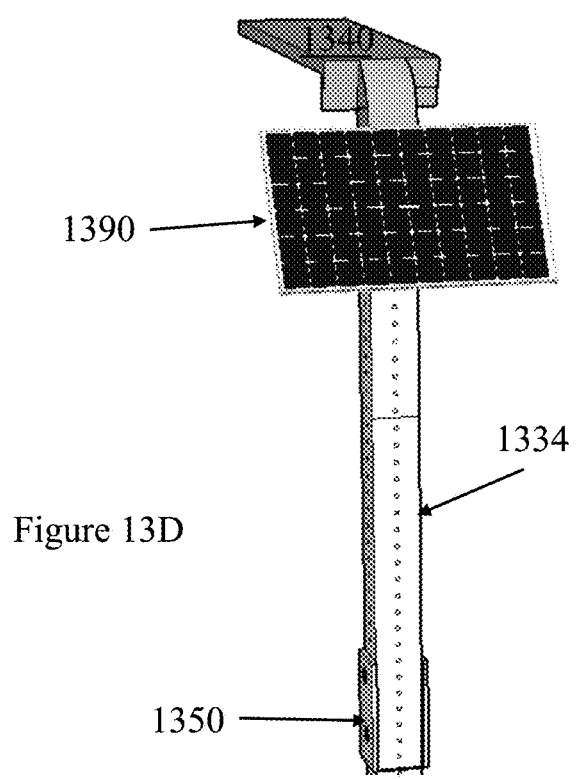
FIG. 13D illustrates a back perspective view of an implementation of a portion proximate a second end of the example lighting system illustrated in FIG. 13A.
Figure 13E:
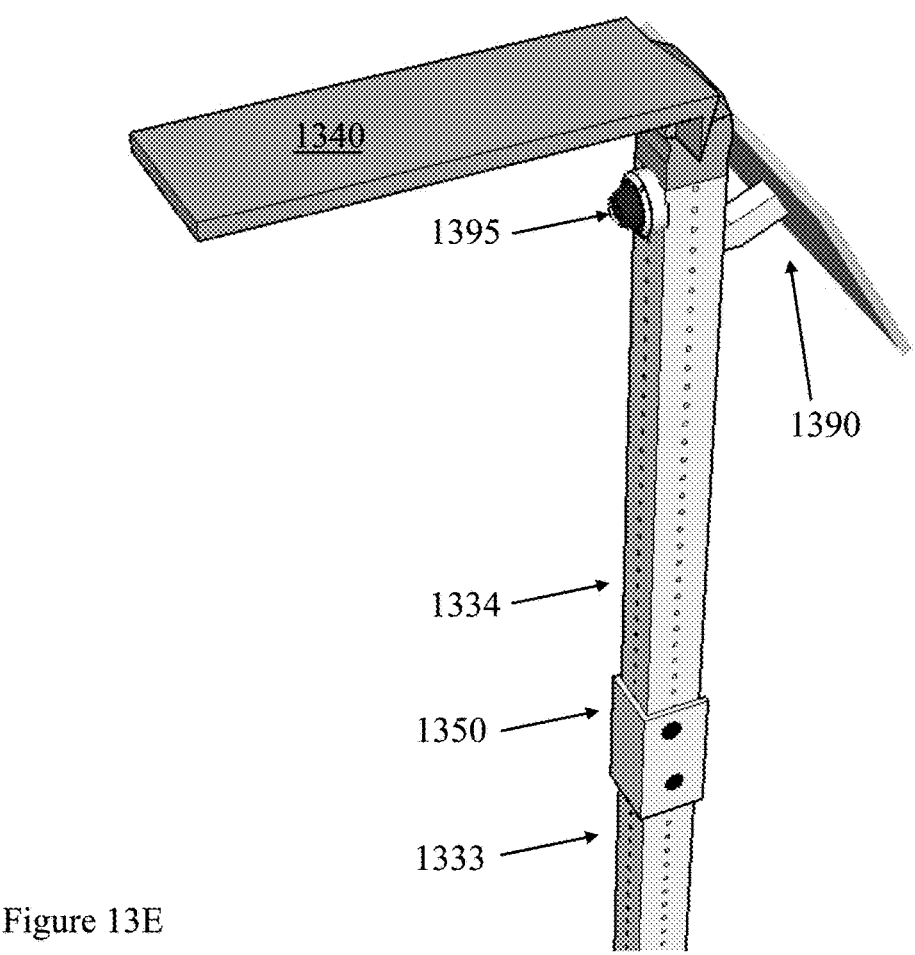
FIG. 13E illustrates a first side perspective view of an implementation of a portion proximate a second end of the example lighting system illustrated in FIG. 13A.
Figure 13F:
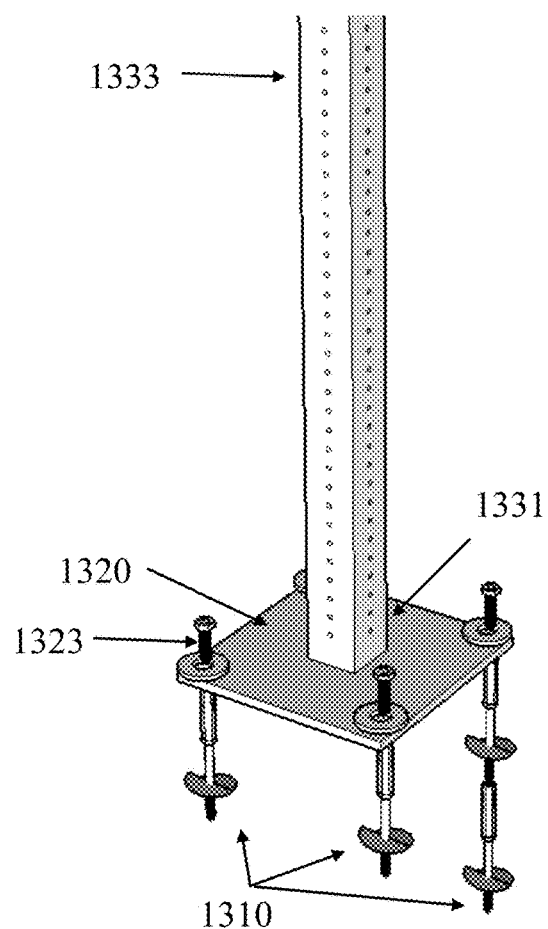
FIG. 13F illustrates a first side perspective view of an implementation of a portion proximate a first end of the example lighting system illustrated in FIG. 13A.

In some implementations, the anchored post system may be utilized for specific applications such as lighting. For example, lighting may be rapidly deployed to and/or removed from an area (e.g., outdoor arena) for a concert, tournament, festival, disaster preparedness staging (e.g., post disaster staging, lighting during blackouts, etc.), etc. using the described lighting system. A modular lighting system may allow customization of lighting (e.g., direction light emitted, heights of posts, additional objects coupled to the post such as speakers, etc.). FIG. 13A illustrates a first side perspective view of a lighting system 1300 and FIG. 13B illustrates a second side perspective view of the lighting system 1300. FIG. 13C illustrates an implementation of lighting system 1300 in which the post has been collapsed. FIGS. 13D-F illustrate implementations of portions of lighting system 1300.

Lighting system 1300 may provide light to an area proximate a location in which the lighting system is secured. The lighting system 1300 may allow a temporary or permanent light fixture to be installed in a location. For example, lighting system 1300 may be installed at an outdoor event to provide lighting during the event. The lighting system or portions thereof may be removed or remain secured to the location. For example, a base, post and light source may be removed and anchor(s) may remain secured in the location. Since, in some implementations, a top surface of the anchor may be disposed even with or below a top surface of the ground, the anchor may remain in place without substantially inhibiting activity at the location (e.g., mowing may continue since the blade may not contact the anchor; sports may be played and/or walking over the location may continue played since the anchor may not pose a trip hazard, etc.). The anchor may then be used at a later date to reinstall the same or a different lighting system and/or in combination with other described systems (e.g., sports goals, nets, canopies, signs, etc.).

As illustrated, a lighting system 1300 may include anchor(s) 1310, a base 1320, post 1330, and a light source 1340. Anchor(s) 1310, such as one or more of the described anchors, may be utilized with the lighting system 1300. In some implementations, an anchor 1310 may include more than one anchor linked together (e.g., a second end of a second anchor may be coupled to a second coupling member of a first anchor). For example, when installing tall posts, heavy object(s), to accommodate weather conditions (e.g., snow loads, wind loads, etc.), etc., an anchor that includes more than one anchor linked together may be utilized to inhibit damage to and/or substantial movement of the post (e.g., falling, bending, etc.). The anchor(s) 1310 may be secured in a location by coupling a driver to each of the anchor(s) (e.g., a first coupling member of the anchor), actuating the driver to apply a torque to the anchor(s) (e.g., where actuation of the driver causes rotation of the anchor into the ground), and driving the anchor(s) into the location (e.g., such that an annular flange and/or a top surface of the anchor is disposed approximately even with and/or below a top surface of the location).

The base 1320 may then be coupled to the anchor(s) 1310 by disposing the base above the anchors such that the anchors are proximate the first openings 1322 in the base. First fasteners 1323 (e.g., bolt, screw, an/or other appropriate fasteners) may be coupled to the anchors 1310 secured in the location via the first openings 1322 in the base 1320. In some implementations, the base 1320 may be positioned in a location prior to securing the anchors 1310 to a location and the base may be utilized to guide the positioning of the anchors (e.g., such that the anchors approximately align with the first openings in the base). For example, the base may be placed in a location and anchors may be driven into the location through the first opening(s) in the base. As illustrated, in some implementations, the base 1320 may be positioned approximately parallel to a top surface of a location and/or the base may be at least partially embedded in a location (e.g., coupling the first fastener(s) 1323 with the anchor(s) 1310 may drive the base at least partially into the location).

The base 1320 may include a post opening 1234. The post opening 1234 may a recess in or through the base. The post opening 1234 may include a threaded portion to couple with threads on the post 1330 to couple the post and the base.

A post 1330 may be coupled to the base 1320. The post may include a first end 1331 and a second opposing end 1332. Any appropriate post may be utilized (e.g., single section, more than one section, vertical post, angled post, height adjustable, collapsible, and/or perforated), as appropriate. As illustrated, the post 1330 may include at least two sections, a first section 1333 and a second section 1334. Each section may include a first end and an opposing second end. The first end of the first section 1333 (e.g., proximate a first end of the post) may include a portion to be received by a post opening 1324 of the base. For example, at least a portion of the first end of the first section may be disposed in the base opening 1324 of the base 1320. In some implementations, at least a portion of threads proximate the first end of the first section may engage with at least a portion of the threads in a threaded portion of the base opening 1324 of the base 1320. In some implementations, the first end of the first section may be otherwise coupled to the base (e.g., welded, glued, etc.).

The second end of the first section 1331 of the post 1330 may be coupled to the second section 1332 of the post proximate a first end of a second section. For example, the second end of the first section 1331 may include threads to engage with threads of the second section (e.g., proximate the first end of the second section). In some implementations, a collar 1350 may facilitate coupling the first section 1331 and the second section 1332. For example, the collar 1350 may be a conduit section that receives a second end of the first section and a first end of a second section of the post to couple the ends. The conduit collar may include threads to engage threads on the first section and/or second section. In some implementations, the collar, the first section and/or second section may include openings that allow a collar fastener (e.g., pin, bolt, screw) to secure the section(s) to the collar via the collar fastener.

As illustrated in FIGS. 13A-E, the collar 1350 may include one or more plates 1355 extending from a second end of the first section 1331. The collar 1350 may include three plates, 1356, 1357, 1358. The first plate 1356 and the second plate 1357 may be disposed on opposing sides of the collar. A third plate 1358, a stop plate, may be coupled proximate a first end to the first plate 1356 and coupled proximate a second end to the second plate 1357.

The collar 1350 may include one or more openings of facilitate coupling the sections of the post to the collar. As illustrated, the collar 1350 includes a first opening 1360 and a second opening 1370. The first opening 1360 may have a size and/or shape to receive a first fastener 1365 and/or the second opening 1252 may have a size and/or shape to receive a second fastener 1375. In some implementations, the first opening and the second opening of the collar may be disposed on the same plate and/or different plates. In some implementations, first openings and second openings may be disposed on the first and the second plate and operate in conjunction with each other (e.g., a first fastener may extend to be disposed in the first openings in the first plate and the second plate and/or the second fastener may extend to be disposed in the second openings in the first plate and the second plate).

As illustrated, to rotatably couple the first section 1331 and the second section 1332, the first fastener 1360 may extend through a first opening 1360 in the collar 1350 and be at least partially disposed in the second section (e.g., via an opening in the second section). In some implementations, the second section may include an opening that extends through the second section and allows a first fastener 1365 to pass through the opening and contact the second plate of the collar (e.g., the first fastener may contact the second plate and/or be disposed at least partially in a first opening in the second plate). As illustrated, to inhibit rotation of the first section 1331 and the second section 1332, the second fastener 1375 may extend through a second opening 1370 in the collar 1350 and be at least partially disposed in the second section. For example, the second section may include an opening that extends at least partially through the second section and the second fastener may be at least partially disposed in the second opening. The first fastener and/or the second fastener may extend through the second section and couple with a second plate of the collar (e.g., an opposing wall and/or an opposing section of a wall), in some implementations.

When first fastener and the second fastener are disposed in position (e.g., an opening of the collar and the second section), the second section may be inhibited from rotating with respect to the first section. When the second fastener is not coupled with the second section, the second section may rotate with respect to the first section. In some implementations, the second section may be allowed to at least partially rotate when the first fastener is not coupled to the second section and the second fastener is coupled to the second section. In some implementations, a third plate 1358 of the collar 1350 may limit rotation of the second section. As illustration, during rotation of the second section 1332, the second section may contact the third plate 1358 of the collar 1350 and further rotation may be inhibited. Thus, the post may be collapsed by rotating the second section with respect to the first section from an expanded position (e.g., a first position in which the second section is coupled such that it extends from the first section, as illustrated in FIG. 13A) to a collapsed position (e.g., a second position in which the second section is disposed next to and approximately parallel to the first position, as illustrated in FIG. 13C). The post may be expanded by rotating the post from the second or collapsed position, illustrated in FIG. 13C, to the first or expanded position, illustrated in FIG. 13A. A second fastener may be utilized to secure the post in the expanded position. Allowing the post to be collapsed may facilitate transport of the lighting system and/or moving the lighting system (e.g., since the lighting system may be shorter in height when collapsed).

In some implementations, the post or portions thereof may include one or more apertures 1380 disposed across a height, width, and/or length of the post. For example, the post or portions thereof may be perforated. The aperture(s) may facilitate coupling objects (e.g., light sources and/or other objects) to the post and thus the lighting system. An object fastener (e.g., any appropriate fastener) may be disposed at least partially in the aperture and at least partially in the object or an opening of the object to couple the object to the post.

The light emitted by the lighting system 1300 may be from the light source 1340. The light source 1340 may include any appropriate light source, such as but not limited to an LED light source, a metal halide light source, a high pressure sodium light source, and/or a mercury vapor light source. The lighting system 1300 may include one or more light sources 1340 coupled to the post 1330. The light source(s) 1340 may be coupled proximate a second end 1332 of the post and/or any other appropriate position. For example, a light source may be positioned to illuminate for a particular application (e.g., spot lighting, general lighting, ground lighting, aerial lighting etc.). The light source may be coupled to the post via an object fastener that couples with an aperture of the post. Utilizing a fastener to couple the light source to the post may facilitate repair and/or maintenance (e.g., since light sources can be removed and/or replaced rather than replacing an entire lighting system and/or may increase versatility (e.g., a light source may be replaced by a different object rather than replacing the entire lighting system with a differently configured lighting system and/or anchored post system). The light source may be powered by an internal power source and/or may be coupled to a power source (e.g., battery and/or solar panel).

In some implementations, utilizing a solar panel to provide power to light source(s) may reduce the need to couple power lines to the lighting system (e.g., easing installation and/or maintenance), increase location safety (e.g., no power lines to trip over or overhead), and/or reduce operational costs. Utilizing a solar panel may facilitate lighting set up in temporary locations (e.g., outdoor event, disaster event staging, etc.), since power may be provided without running electrical wiring (e.g., which may require specialized contractors which may increase installation time and cost).

As illustrated, in some implementations, a power source, such as a solar panel 1390, may be coupled to the post 1330. For example, object fastener(s) may couple the solar panel 1260 to the post 1330 and thus the lighting system 1300. The object fastener may allow rotation of the solar panel to adjust placement (e.g., which may affect the amount of energy generated).

In various implementations, one or more other objects may be coupled to the post (e.g., in addition to and/or in place of the light source). As illustrated, objects such as one or more cameras 1395 may be coupled to the post 1330. The camera 1395' may be coupled proximate the light source 1340 to allow at least partial illumination of the field of view of the camera.

In some implementations, one or more objects such as one or more sensors (e.g., motion, light, etc.) coupled to the post may trigger operation of one or more of the components (e.g., lights, camera, alarm, etc.). For example, a motion sensor may trigger recording of the camera and/or the light source to illuminate an area. In some implementations, a sensor coupled to the goal may trigger actions in other objects of the post system and/or lighting system such as automatically resetting a shot clock and/or adding points to a scoreboard. In some implementations, sensors may detect hazardous weather conditions and trigger sounds and/or lights (e.g., via speakers and/or light sources).

In some implementations, objects may include a basketball goal or portions thereof (e.g., as illustrated in 4A-4D). For example, a backboard and goal may be coupled to the lighting system and/or post system to allow play in dark conditions and/or to increase lighting in a court (e.g., for image capturing). A basketball goal on the post and/or lighting system may be coupled to other objects, as appropriate.

In some implementations, objects may include power source(s), camera(s) (e.g., still image and/or videos), alarm(s) (e.g., audio and/or visual), speaker(s), communication equipment, a canopy, a sign, and/or any other appropriate object. For example, a described system (e.g., the lighting system and/or the anchored post system) may include communication equipment, such as but not limited to access points and/or antennas. The communication equipment may facilitate communication with lighting system(s), anchored post systems, and/or operators (e.g., controlling operations of components of the system, such as lighting, audio streams through speakers, etc.). For example, the communication equipment may allow remote communication with objects (e.g., speakers, alarms, lighting, etc.) coupled to the lighting system. The communication equipment may generate communication areas such as Wi-Fi Hotspots, in some implementations.

Although various implementations have been described one or more features of an implementation may be used in combination or replacement of one or more features of a different implementation, as appropriate. For example, in some implementations a single anchor is illustrated in combination with a system and one or more linking anchors may be utilized in combination with or in place of a single anchor. As another example, a goal and/or net may be utilized with the lighting system as described. As another example, a canopy may be utilized with either post system and/or the lighting system. As another example, the anchoring, post, and other described systems may be provided as a kit for the user. The user may select portions from one or more of the systems to create a new system for a desired application.

Although in various implementations, the anchoring system is described as being driven into a location such as the ground, the anchoring system may be driven into other locations, such as concrete, gravel, and/or asphalt. For example, a pilot hole may be driven into the location. A drill may create the pilot hole in the location. The anchor may then be driven into the pilot hole in the location. Thus, the anchor may be utilized in locations, in which self-driving may be difficult, such as in concrete and/or asphalt. In some implementations, the anchoring system may be able to withstand greater force in concrete and/or asphalt than in a location such as the soil. In some implementations, the ground may include a portion of the earth and one or more overlays, such as artificial turf, mulch, concrete, and/or asphalt. For example, the ground may include a layer of asphalt over a portion of the earth. The anchor may be at least partially disposed in the layer of asphalt and the earth, in some implementations.

Although various shapes and sizes of the posts of an object have been described, other shapes and/or sizes may be utilized. For example a post may have a height and a cross-section. The shape of the cross-section may be approximately circular, approximately oval, approximately rectangular, and/or any other regular or irregular polygon as appropriate. In some implementations, larger or smaller posts than have been specifically describe may be utilized. For example, a post may be sized based on the intended application of the anchor and/or the object. The posts may include one or more coupleable segments, in some implementations.

Although directional orientations have been described in various implementations, the directional orientations have been included to describe specific implementations and other directional orientations may be utilized with the described systems and processes. For example, an anchor may be driven laterally into a location. The anchor may be driven such that a first end is oriented up and the second end is oriented down, in some implementations; however, the first end may be oriented downwards in some implementations.

In some implementations, a first anchor may be coupled to a second anchor that is not a linkable anchor. For example, an end of the first anchor may include threads that are couplable to the second coupling member of the second anchor to couple the first anchor and the second anchor. The second anchor may or may not be capable of directly coupling with one or more third anchors.

In some implementations, when linking anchors are utilized, the anchors may be coupled before, during, and/or after driving one or more of the anchors to be linked into a location. For example, two or more anchors may be linked and the linked anchors may be driven into a location (e.g., the driver may be coupled to the first coupling member of the top anchor of the linked anchors, the driver may be actuated to drive the linked anchors into the location, and the driver may be uncoupled from the top anchor). In some implementations, a first anchor may be driven (e.g., by a coupled driver) at least partially into a ground and then a second anchor may be coupled to the first anchor. The second anchor may then be driven at least partially into the location, which causes the first anchor to be further driven into the location (e.g., by a driver coupled to the second anchor). One or more additional anchors may be similarly linked to the first and second anchor.

Although users have been described as a human, a user may be a person or a group of people.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a driver" includes a combination of two or more drivers; and, reference to "a coupling member" includes different types and/or combinations of coupling members. Reference to "an anchor" may include a combination of two or more anchors. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An anchored post system comprising:
   one or more first anchors, wherein each first anchor is capable of coupling to a second anchor, and wherein each of the first anchors comprises:
      a body, wherein the body comprises:
         a first end, wherein the first end of each of the first anchors comprises:
            an outer surface;
            a first coupling member disposed on the outer surface of the first end, wherein the first coupling member is adapted to couple with a first driver to allow the first driver to drive each first anchor in a location;
            a recess disposed in the first end; and
            a second coupling member disposed in the recess of the first end, wherein the second coupling member comprises a first threaded portion, wherein the first threaded portion is capable of coupling with at least one first fastener; and wherein the first threaded portion is capable of coupling with at least part of a second end of a third anchor;
         an opposing second end, where the second end of each of the first anchors comprises:
            a tapered portion; and
            a second threaded portion;
            wherein the second end is capable of coupling with a second coupling member of the second anchor via the second threaded portion of the first anchor;
         a shaft disposed between the first end and the second end, wherein the shaft comprises a length and a cross-section; and
         at least one plate comprising a slanted portion; wherein the at least one plate at least partially circumscribes the cross-section of the shaft;
   one or more of the first fasteners, wherein each first fastener comprises:
      a first end, wherein the first end is adapted to couple with a second driver to allow the second driver to couple a first fastener and a first anchor;
      an opposing second end, wherein the second end comprises a threaded portion capable of coupling with the first threaded portion of each of the first anchors;
   a base, wherein the base comprises one or more first openings, and wherein each of the first openings are adapted to receive at least a portion of at least one of the first fasteners, and wherein the base is adapted to coupled to the location by allowing at least one of the first fasteners disposed at least partially in a first opening of the base to couple with at least one of the first anchors secured to the location; and
   a post capable of coupling with one or more objects, wherein the post comprises a first end and an opposing second end, wherein the post is coupled to the base proximate the first end of the post.

2. The anchored post system of claim 1 wherein the post comprises more than one section, wherein the sections are coupled together to form the post.

3. The anchored post system of claim 1 wherein the post is collapsible, and wherein the post comprises:
   at least one first section, wherein each first section comprises:
      a first end, wherein the first section is coupled to the base proximate the first end of the first section; and
      an opposing second end;
      a collar extending from a second end of the first section, wherein the collar comprises at least two collar openings;
   one or more second sections, wherein at least one second section is disposed in the collar;
   a first collar fastener disposed through at least one of the collar openings and at least a portion of the second section, wherein the first collar fastener allows rotation of the second section about the first collar fastener such that the post is collapsible; and
   a second collar fastener disposable through at least one of the collar openings and at least a portion of the second section, wherein the second collar fastener inhibits rotation of the second section about the first collar fastener when the second collar fastener is disposed through at least one of the collar openings.

4. The anchored post system of claim 1 wherein the post is at least partially perforated with apertures, and wherein at least one object is coupled to the post via at least one of the apertures.

5. The anchored post system of claim 1 wherein at least one of the objects coupled to the post comprises at least one of a light source, a solar panel, a camera, an alarm, communication access point, a canopy, or a sign.

6. The anchored post system of claim 1 wherein each of the first anchors comprises a second opening disposed proximate the second end of each first anchor; and wherein when the second end of each first anchor is disposed in a recess in a first end of the second anchor, each first anchor and the second anchor are coupled via a fastener disposed at least partially through a first opening in the first end of the second anchor and the second opening of each first anchor.

7. The anchored post system of claim 1 further comprising one or more lateral support members coupled to the post.

8. A lighting system comprising one or more lighting members, wherein each light member comprises:
   one or more first anchors, wherein each first anchor is capable of coupling to a second anchor, and wherein each of the first anchors comprises:
      a body, wherein the body comprises:
         a first end, wherein the first end of each of the first anchors comprises:
            an outer surface;
            a first coupling member disposed on the outer surface of the first end, wherein the first coupling member is adapted to couple with a first driver to allow the first driver to drive the each first anchor in a location;

a recess disposed in the first end; and a second coupling member disposed in the recess of the first end, wherein the second coupling member comprises a first threaded portion, wherein the first threaded portion is capable of coupling with at least one first fastener; and wherein the first threaded portion is capable of coupling with at least part of a second end of a third anchor;

an opposing second end, where the second end of each of the first anchors comprises:
a tapered portion; and
a second threaded portion;
wherein the second end is capable of coupling with a second coupling member of the second anchor via the second threaded portion of the first anchor;

a shaft disposed between the first end and the second end, wherein the shaft comprises a length and a cross-section; and at least one plate comprising a slanted portion; wherein the plate at least partially circumscribes the cross-section of the shaft;

one or more of the first fasteners, wherein each first fastener comprises:
a first end, wherein the first end is adapted to couple with a second driver to allow the second driver to couple a first fastener and a first anchor;
an opposing second end, wherein the second end comprises a threaded portion capable of coupling with the first threaded portion of each of the first anchors;

a base, wherein the base comprises one or more first openings, and wherein each of the first openings are adapted to receive at least a portion of at least one of the first fasteners, and wherein the base is adapted to coupled to the location by allowing at least one of the first fasteners disposed at least partially in a first opening of the base to couple with at least one of the first anchors secured to the location; and a post capable of coupling with one or more objects, wherein the post comprises a first end and an opposing second end, wherein the post is coupled to the base proximate the first end of the post.

9. The lighting system of claim 8 wherein the post is capable of coupling with one or more objects.

10. The lighting system of claim 9 wherein at least one of the objects comprises a solar panel, a camera, an alarm, a speaker, communication access point, or a backboard of a basketball goal.

11. The lighting system of claim 8 wherein the post is at least partially perforated with apertures, and wherein at least one object is coupled to the post via at least one of the apertures.

12. The lighting system of claim 8 further comprising at least one power supply capable of providing power to one or more of the light sources, wherein at least one of the power supplies is coupled to the post.

13. The lighting system of claim 8 wherein one or more of the light sources comprises at least one of an LED light source, a metal halide light source, a high pressure sodium light source, or a mercury vapor light source.

14. The lighting system of claim 8 wherein the lighting system further comprises a plurality of lighting members, and further comprising at least one object coupled to at least two of the lighting members, and wherein at least one of the objects comprises at least one of a canopy or a sign.

15. The lighting system of claim 8 wherein the post is collapsible, and wherein the post comprises:
at least one first section, wherein each first section comprises:
a first end, wherein the first section is coupled to the base proximate the first end of the first section; and
an opposing second end;
a collar extending from a second end of the first section, wherein the collar comprises at least two collar openings;
one or more second sections, wherein at least one second section is disposed in the collar;
a first collar fastener disposed through at least one of the collar openings and at least a portion of the second section, wherein the first collar fastener allows rotation of the second section about the first collar fastener such that the post is collapsible; and
a second collar fastener disposable through at least one of the collar openings and at least a portion of the second section, wherein the second collar fastener inhibits rotation of the second section about the first collar fastener when the second collar fastener is disposed in at least one of the collar openings.

16. The lighting system of claim 8 wherein at least one of the first anchors comprises at least one second plate coupled to the shaft.

17. The lighting system of claim 8 wherein each of the first anchors comprises a second opening disposed proximate the second end; and wherein when the second end of each first anchor is disposed in a recess in a first end of the second anchor, each first anchor and the second anchor are coupled via a fastener disposed at least partially through a first opening in the first end of the second anchor and the second opening of each first anchor.

18. The anchored post system of claim 1 further comprising one or more additional posts capable of coupling with one or more objects, wherein each additional post comprises a first end and a second opposing end, and wherein at least one of the additional posts is capable of coupling to the base proximate the second end of the post, and at least one object is capable of coupling with at least one of the additional posts and the post.

19. The anchored post system of claim 1 wherein the post further comprises:
a first section;
at least a second section;
and a collar disposed between the first section and at least one of the second sections, wherein the collar comprises a portion that allows the second section to be coupled to the first section at more than one angle relative to the first section.

* * * * *